US012640621B2

(12) United States Patent
Ichioka

(10) Patent No.: US 12,640,621 B2
(45) Date of Patent: May 26, 2026

(54) ELECTRIC WORK MACHINE

(71) Applicant: MAKITA CORPORATION, Anjo (JP)

(72) Inventor: Yusuke Ichioka, Anjo (JP)

(73) Assignee: MAKITA CORPORATION, Anjo (JP)

( * ) Notice: Subject to any disclaimer, the term of this patent is extended or adjusted under 35 U.S.C. 154(b) by 251 days.

(21) Appl. No.: 18/415,820

(22) Filed: Jan. 18, 2024

(65) Prior Publication Data

US 2024/0266914 A1      Aug. 8, 2024

(30) Foreign Application Priority Data

Feb. 7, 2023      (JP) ................................. 2023-016671

(51) Int. Cl.
*H02K 7/14*          (2006.01)
*H02K 3/52*          (2006.01)
(52) U.S. Cl.
CPC ............. *H02K 7/145* (2013.01); *H02K 3/522* (2013.01)
(58) Field of Classification Search
CPC ...... H02K 7/14; H02K 7/145; H02K 2203/09; H02K 1/16
See application file for complete search history.

(56) References Cited

U.S. PATENT DOCUMENTS

2020/0177047 A1 *   6/2020   Kutsuna ................. H02K 3/522
2022/0006347 A1 *   1/2022   Fujii ......................... H02K 9/06
2022/0320939 A1 *  10/2022   Naito ..................... H02K 7/003
2023/0067680 A1 *   3/2023   Klosterman ......... H02K 5/1732

FOREIGN PATENT DOCUMENTS

JP            2020089190 A      6/2020

* cited by examiner

*Primary Examiner* — Oluseye Iwarere
*Assistant Examiner* — Masoud Vaziri
(74) *Attorney, Agent, or Firm* — J-TEK LAW PLLC; Jeffrey D. Tekanic; Scott T. Wakeman

(57) ABSTRACT

An electric work machine (1) includes: a motor (21) having a rotor (23), which rotates about rotational axis (AX), and a stator (24), which is disposed around the rotor; and an output portion (25), which rotates when a rotational force is generated by the motor. The stator comprises: a stator core (33); an insulator (34), which is fixed to the stator core; a plurality of coils (35), which is fixed to the insulator; external terminals (63), to which power-supply lines are respectively connected; coil terminals (64), which are respectively connected to the coils; short-circuiting members (65), which are integral with the external terminals and the coil terminals and electrically connect the external terminals and the coil terminals to each other; and an insulating member (66), which supports the external terminals and the short-circuiting members. The insulating member is disposed more radially inward than an outer-circumferential surface of the stator core.

20 Claims, 36 Drawing Sheets

366 369

336

324

369

57

72U

72V

72W

369

57

34

33

57 369

55

58 372

35 55

UP

LEFT FRONT

REAR RIGHT

DOWN

ELECTRIC WORK MACHINE

CROSS-REFERENCE TO RELATED APPLICATION

This application claims priority to Japanese patent application no. 2023-016671 filed on Feb. 7, 2023, the contents of which are fully incorporated herein by reference.

TECHNICAL FIELD

The techniques disclosed in the present specification relate to an electric work machine, such as a power tool or outdoor power equipment, and more particularly relate to techniques for making a motor therefor more compact.

BACKGROUND ART

US 2020/0177047 A1 discloses a power tool comprising a motor that is related to the present teachings.

SUMMARY OF THE INVENTION

In the field of electric work machines, there is always a demand to make the motor more compact. If the motor is enlarged and thereby the electric work machine is enlarged, then there is a possibility that it will become difficult for the user of the electric work machine to use the electric work machine smoothly and ergonomically.

One non-limiting object of the present teachings is to disclose techniques for making a motor of an electric work machine more compact.

In one aspect of the present teachings, an electric work machine may comprise: a motor comprising a rotor, which rotates about a rotational axis, and a stator, which is disposed around the rotor; and an output portion, which rotates when a rotational force is generated by the motor. The stator may comprise: a stator core; an insulator, which is fixed to the stator core; a plurality of coils, which is fixed to the insulator; external terminals, to which power-supply lines are connected; coil terminals, which are connected to the coils; short-circuiting members, which are integral with the external terminals and the coil terminals and connect the external terminals and the coil terminals to each other; and an insulating member, which supports the external terminals and the short-circuiting members. The insulating member may be disposed more radially inward than an outer-circumferential surface of the stator core.

According to the techniques disclosed in the present specification, a motor of an electric work machine can be made more compact.

DETAILED DESCRIPTION OF THE INVENTION

Figure 1:
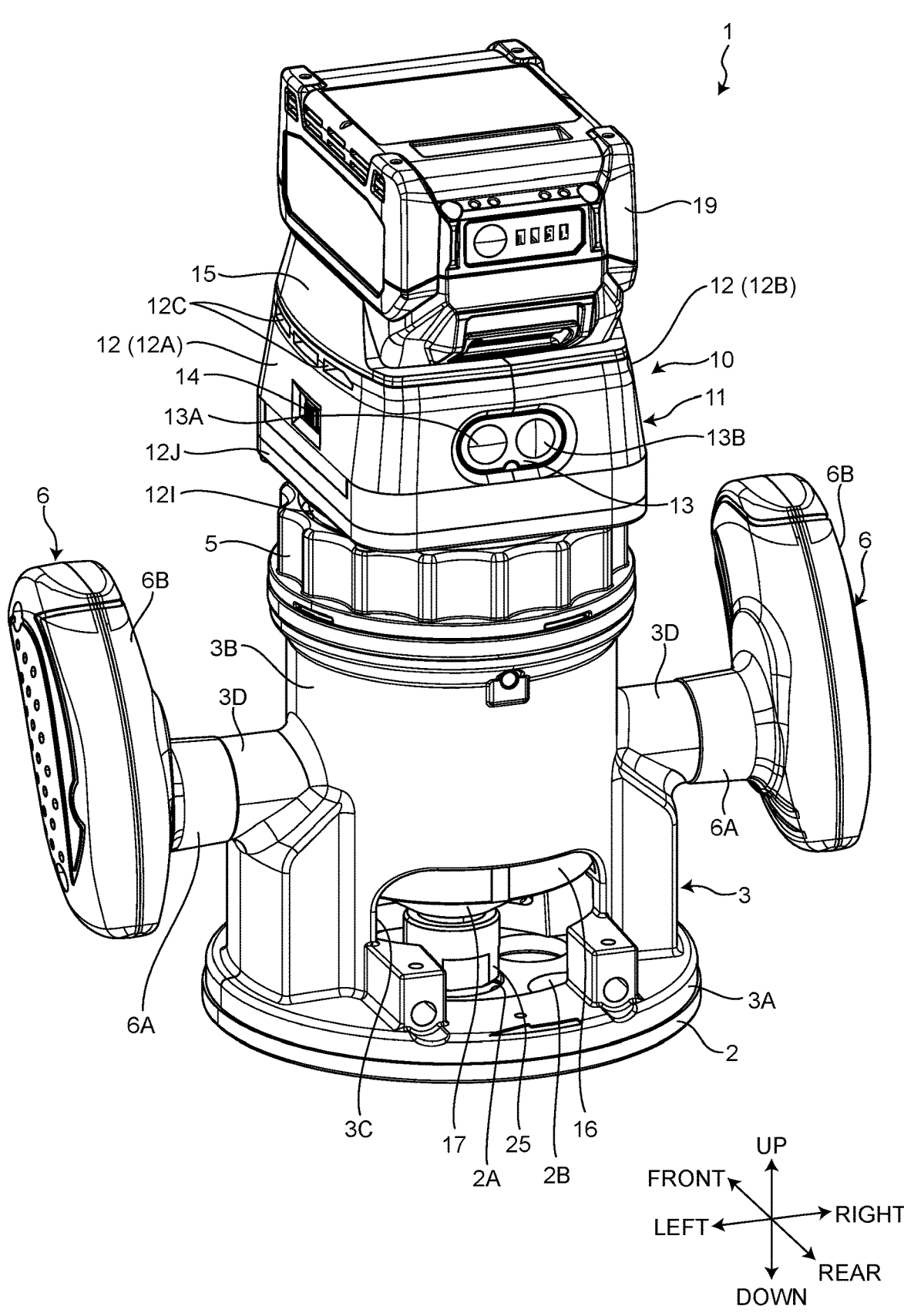
FIG. 1 is an oblique view, viewed from the upper-left rear, that shows an electric work machine according to a first representative, non-limiting embodiment of the present teachings.

As was mentioned above, an electric work machine may comprise: a motor comprising a rotor, which rotates about a rotational axis, and a stator, which is disposed around the rotor; and an output portion, which rotates when a rotational force is generated by the motor. The stator may comprise: a stator core; an insulator, which is fixed to the stator core; a plurality of coils, which is fixed to the insulator; external terminals, to which power-supply lines are (respectively) connected; coil terminals, which are (respectively) connected to the coils; short-circuiting members, which are integral with the external terminals and the coil terminals and electrically connect the external terminals and the coil terminals to each other; and an insulating member, which supports the external terminals and the short-circuiting members. The insulating member may be disposed more radially inward than an outer-circumferential surface of the stator core. In other words, the entirety of the insulating member falls within a virtual circle corresponding to the outer-circumferential surface of the stator core. Stated differently, a largest outer dimension of the insulating member in a plane perpendicular to the rotational axis of the rotor is smaller than a smallest outer dimension of the stator core (e.g., smaller than the outer diameter of the stator core).

According to the above-mentioned configuration, because the insulating member is disposed (entirely) more radially inward than the outer-circumferential surface of the stator core, the motor can be made more compact. In particular, the motor can be made more compact in a radial direction.

In one or more embodiments, the insulating member may comprise a base part, which supports the short-circuiting members and has a ring shape, and a support part, which protrudes in an axial direction from the base part and supports the external terminals. The axial direction is parallel to or coincident with the rotational axis of the rotor.

According to the above-mentioned configuration, because the support part, which supports the external terminals, protrudes in the axial direction from the base part (i.e. instead of in the radial direction), the motor can be made more compact in the radial direction.

In one or more embodiments, the support part may comprise three retaining parts, which (respectively) retain the external terminals and nuts. The power-supply lines and the external terminals may be fixed to each other by bolts, which are (respectively) coupled to the nuts.

According to the above-mentioned configuration, the power-supply lines, the external terminals, and the support part of the insulating member are fixed to each other by bolts.

In one or more embodiments, each of the external terminals may have a first surface, which faces radially inward, and a second surface, which faces radially outward. Each of the nuts may have an opposing surface, which opposes the (respective) first surface. The nuts may be (respectively) retained on (in) the retaining parts such that the opposing surfaces and the rotational axis of the rotor are parallel to each other.

According to the above-mentioned configuration, the motor can be made more compact in the radial direction.

In one or more embodiments, the external terminals may be (respectively) retained on the retaining parts such that the first surfaces and the second surfaces are each parallel to the rotational axis.

According to the above-mentioned configuration, the motor can be made more compact in the radial direction.

In one or more embodiments, there may be one support part. Three of the retaining parts may be provided on the one support part.

According to the above-mentioned configuration, three external terminals are aggregated on the one support part.

In one or more embodiments, there may be three of the support parts. One of the retaining parts may be provided on each one of the support parts. The three support parts may be disposed spaced apart in a circumferential direction of the stator core.

According to the above-mentioned configuration, the three external terminals are distributed in the circumferential direction around the rotational axis.

In one or more embodiments, the external terminals may be disposed more radially inward than the outer-circumferential surface of the stator core.

According to the above-mentioned configuration, the motor can be made more compact in the radial direction.

In one or more embodiments, the short-circuiting members may be disposed partially around the rotational axis. The external terminals may protrude in the axial direction from the short-circuiting members.

According to the above-mentioned configuration, the motor can be made more compact in the radial direction.

In one or more embodiments, each of the external terminals may have a first surface, which faces radially inward, and a second surface, which faces radially outward. The first surface and the second surface each may be parallel to the rotational axis.

According to the above-mentioned configuration, the motor can be made more compact in the radial direction.

In one or more embodiments, the coil terminals may be disposed more radially inward than the outer-circumferential surface of the stator core.

According to the above-mentioned configuration, the motor can be made more compact in the radial direction.

In one or more embodiments, the short-circuiting members may be disposed partially around the rotational axis. The coil terminals may protrude in an axial direction from the short-circuiting members.

According to the above-mentioned configuration, the motor can be made more compact in the radial direction.

In one or more embodiments, the external terminals and the coil terminals each may be disposed more radially inward than the outer-circumferential surface of the stator core. In a radial direction, a (first) distance between the rotational axis and the external terminals may be shorter than a (second) distance between the rotational axis and the coil terminals.

According to the above-mentioned configuration, the motor can be made more compact in the radial direction.

In one or more embodiments, the short-circuiting members may be disposed partially around the rotational axis. The external terminals may protrude toward one side in the axial direction from the short-circuiting members. The coil terminals may protrude toward the other side in the axial direction from the short-circuiting members.

According to the above-mentioned configuration, the motor can be made more compact in the radial direction. In addition, the power-supply lines and the external terminals are connected to each other without difficulty, and the coils and the coil terminals are connected to each other without difficulty.

In one or more embodiments, the short-circuiting members may be disposed more radially inward than the outer-circumferential surface of the stator core.

According to the above-mentioned configuration, the motor can be made more compact in the radial direction.

In one or more embodiments, the short-circuiting members may be disposed in the interior of the base part.

According to the above-mentioned configuration, contact between the short-circuiting members and the electrically conductive members around the short-circuiting members is curtailed.

In one or more embodiments, the insulating member may be fixed to the insulator.

According to the above-mentioned configuration, the location of the insulating member is fixed.

In one or more embodiments, an electric work machine may comprise: a motor comprising a rotor, which rotates about a rotational axis, and a stator, which is disposed around the rotor; and an output portion, which rotates when a rotational force is generated by the motor. The stator may comprise: a stator core; an insulator, which is fixed to the stator core; a plurality of coils, which is fixed to the insulator; external terminals, to which power-supply lines are (respectively) connected; coil terminals, which are (respectively) connected to the coils; short-circuiting members, which are integral with the external terminals and the coil terminals and electrically connect the external terminals and the coil terminals to each other; and an insulating member, which supports the external terminals and the short-circuiting members. The external terminals, the coil terminals, and the short-circuiting members each may be disposed more radially inward than the outer-circumferential surface of the stator core. In other words, the entirety of the external terminals, the coil terminals, and the short-circuiting members falls within a virtual circle corresponding to the outer-circumferential surface of the stator core. Stated differently, a largest outer dimension of the external terminals, the coil terminals, and the short-circuiting members in a plane perpendicular to the rotational axis of the rotor is smaller than a smallest outer dimension of the stator core (e.g., smaller than the outer diameter of the stator core). In a radial direction, a (first) distance between the rotational axis and the external terminals may be shorter than a (second) distance between the rotational axis and the coil terminals.

According to the above-mentioned configuration, because the external terminals, the coil terminals, and the short-circuiting members are each disposed more radially inward than the outer-circumferential surface of the stator core, the motor can be made more compact. In particular, the motor can be made more compact in the radial direction. In addition, because the (first) distance between the rotational axis and the external terminals is shorter than the (second) distance between the rotational axis and the coil terminals, the motor can be made more compact in the radial direction.

In one or more embodiments, the short-circuiting members may be disposed partially around the rotational axis. The external terminals may protrude toward one side in the axial direction from the short-circuiting members. The coil terminals may protrude toward the other side in the axial direction from the short-circuiting members.

According to the above-mentioned configuration, the motor can be made more compact in the radial direction. In addition, the power-supply lines and the external terminals are (electrically) connected to each other without difficulty, and the coils and the coil terminals are (electrically) connected to each other without difficulty.

In one or more embodiments, the insulating member may be disposed more radially inward than the outer-circumferential surface of the stator core.

According to the above-mentioned configuration, the motor can be made more compact in the radial direction.

An embodiment according to the present disclosure will be explained below, with reference to the drawings, but the present disclosure is not limited to the embodiment. Structural elements of the embodiment explained below can be combined where appropriate. In addition, there are also situations in which some of the structural elements may not be used.

In the embodiment, positional relationships among the various parts are explained using the terms "left," "right," "front," "rear," "up," and "down." These terms indicate relative position or direction, with the center of the electric work machine 1 as a reference.

The electric work machine 1 comprises the motor 21. In the embodiment, a direction parallel to rotational axis AX of the motor 21 is called an "axial direction" where appropriate. A radial direction of rotational axis AX of the motor 21 is called a "radial direction" where appropriate. A direction that goes around rotational axis AX of the motor 21 is called a "circumferential direction" or a "rotational direction" where appropriate.

In the radial direction, a location that is proximate to or a direction that approaches rotational axis AX of the motor 21 is called "inward in the radial direction" or simply "radially inward" where appropriate, and a location that is distant from or a direction that leads away from rotational axis AX of the motor 21 is called "outward in the radial direction" or simply "radially outward" where appropriate. A location on one side or a direction on one side of the circumferential direction is called one side in the circumferential direction where appropriate, and a location on the other side or a direction on the other side of the circumferential direction is called the other side in the circumferential direction where appropriate.

DETAILED DESCRIPTION OF THE INVENTION

First Embodiment

A first representative, non-limiting embodiment of the present teachings will now be explained with reference to FIGS. 1-25.

Electric Work Machine

Figure 2:
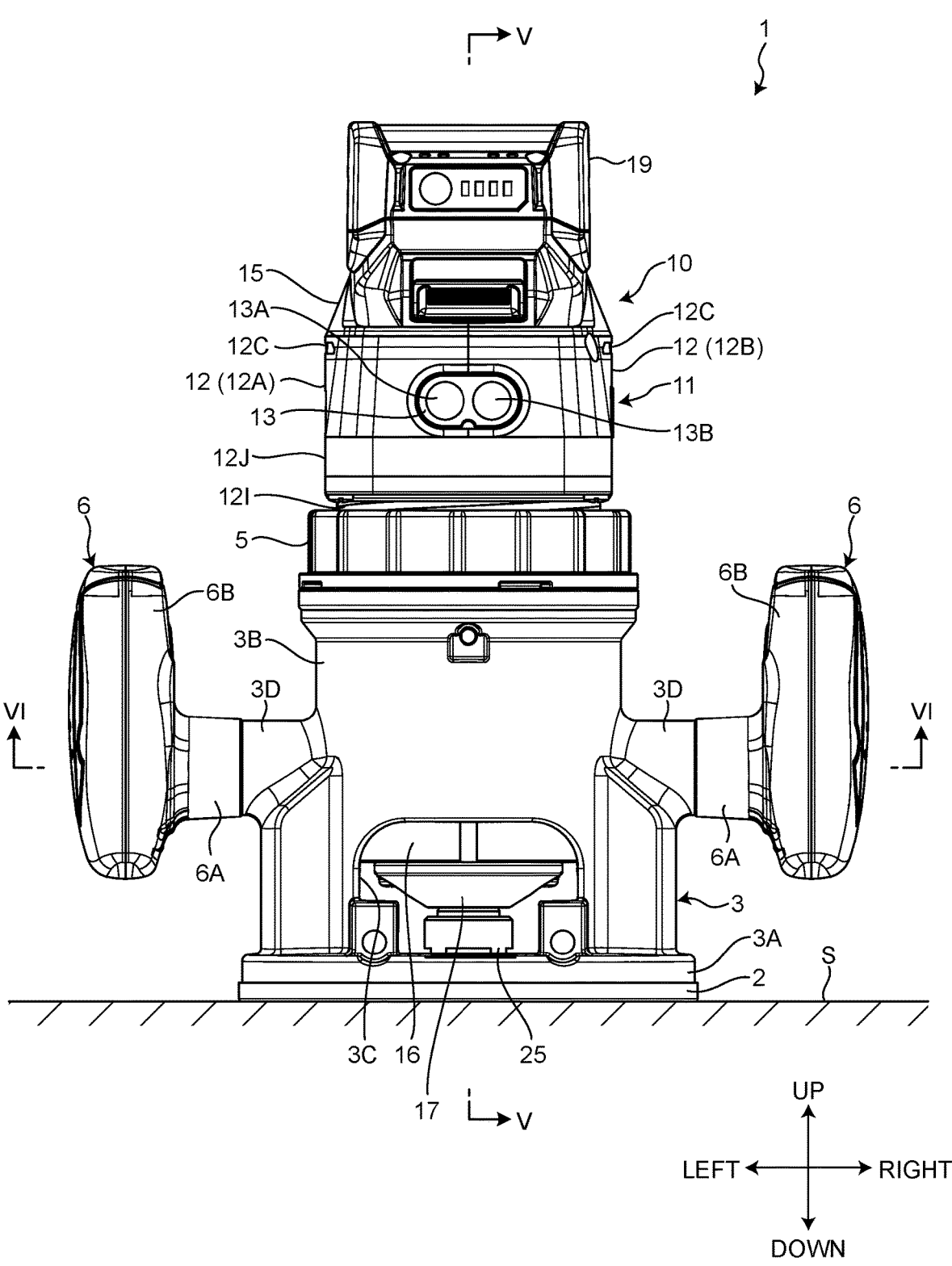
FIG. 2 is a drawing, viewed from the rear, of the electric work machine according to the first embodiment.
Figure 3:
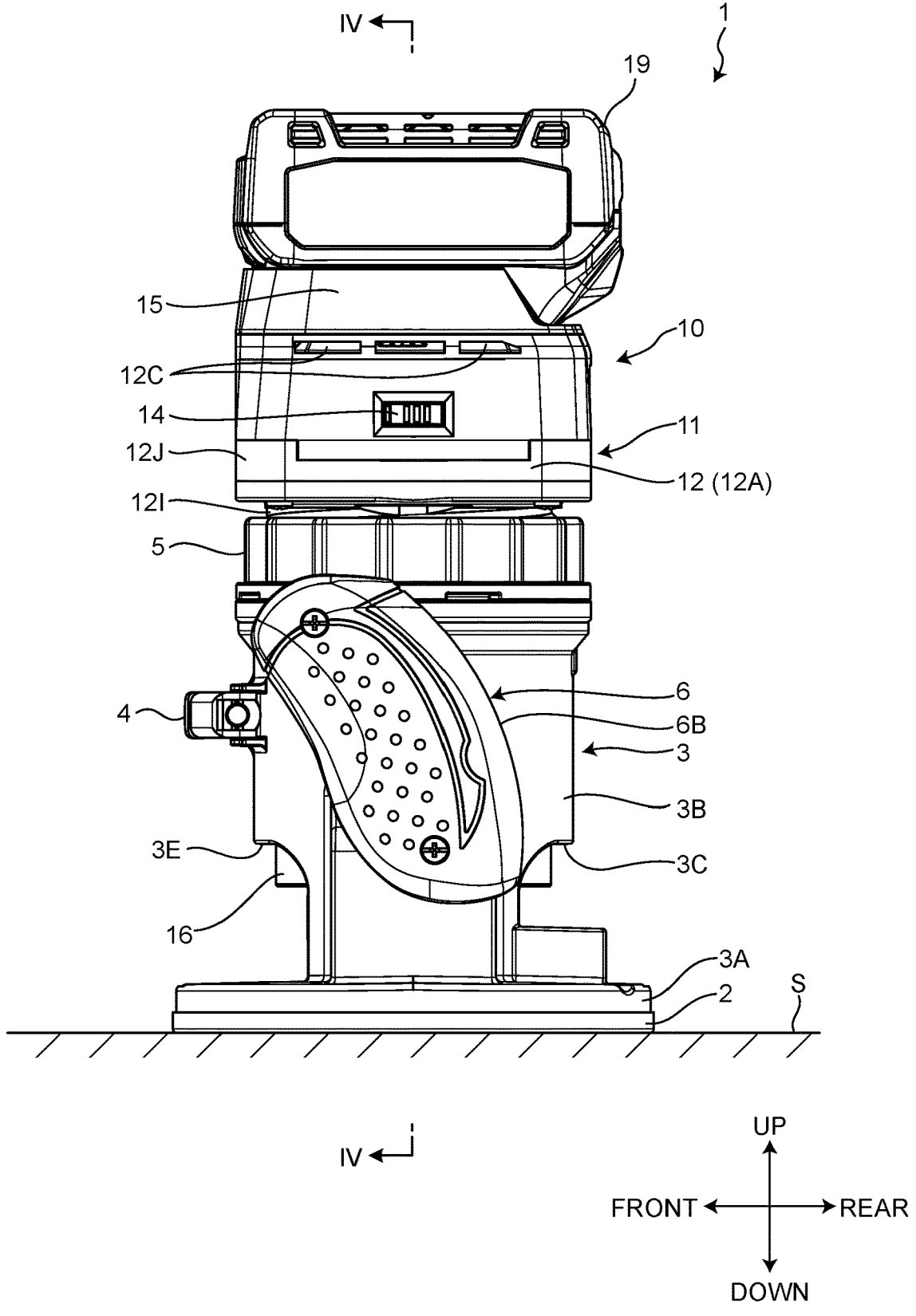
FIG. 3 is a drawing, viewed from the left, of the electric work machine according to the first embodiment.
Figure 4:
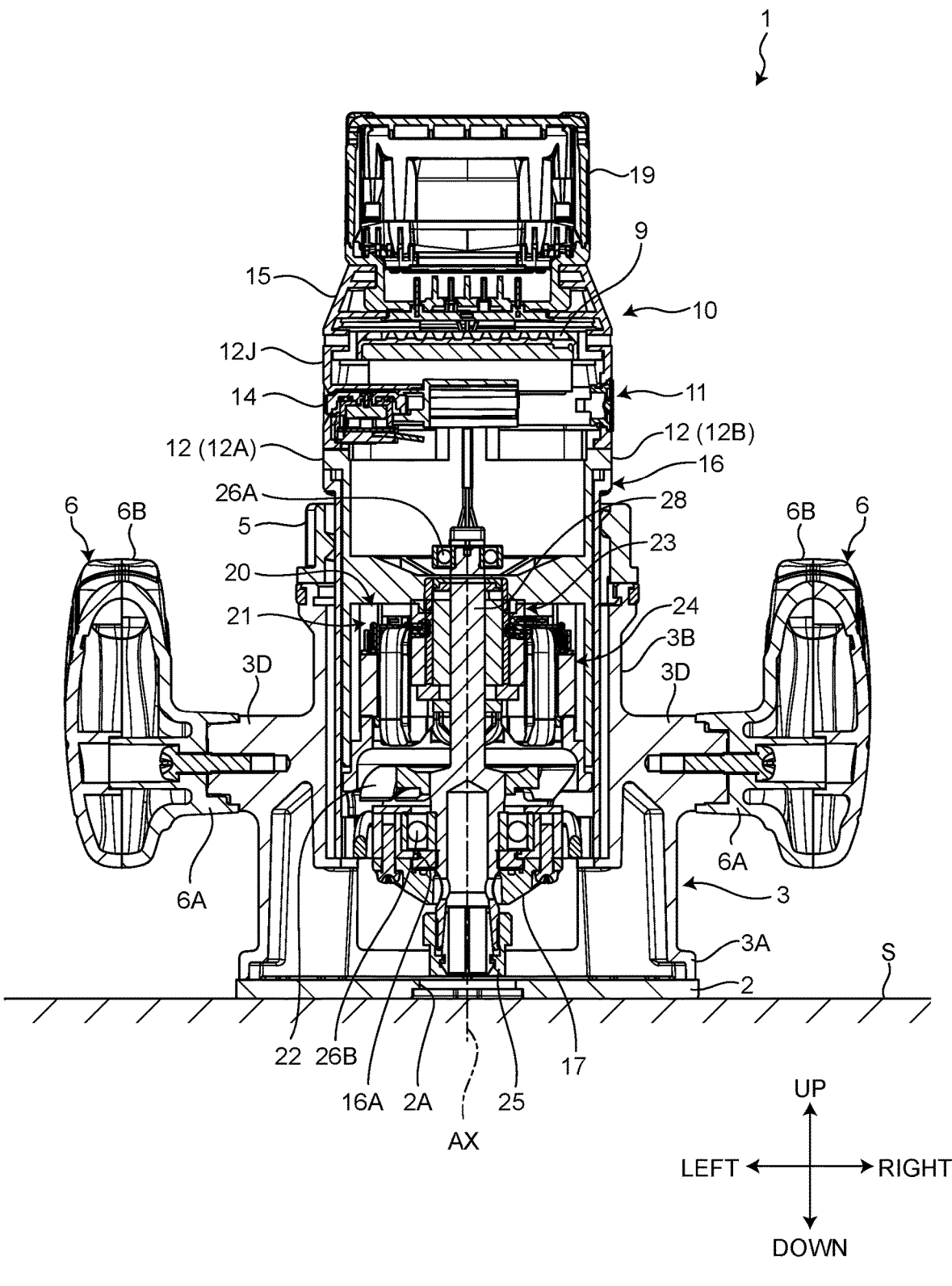
FIG. 4 is a cross-sectional view that shows the electric work machine according to the first embodiment.
Figure 5:
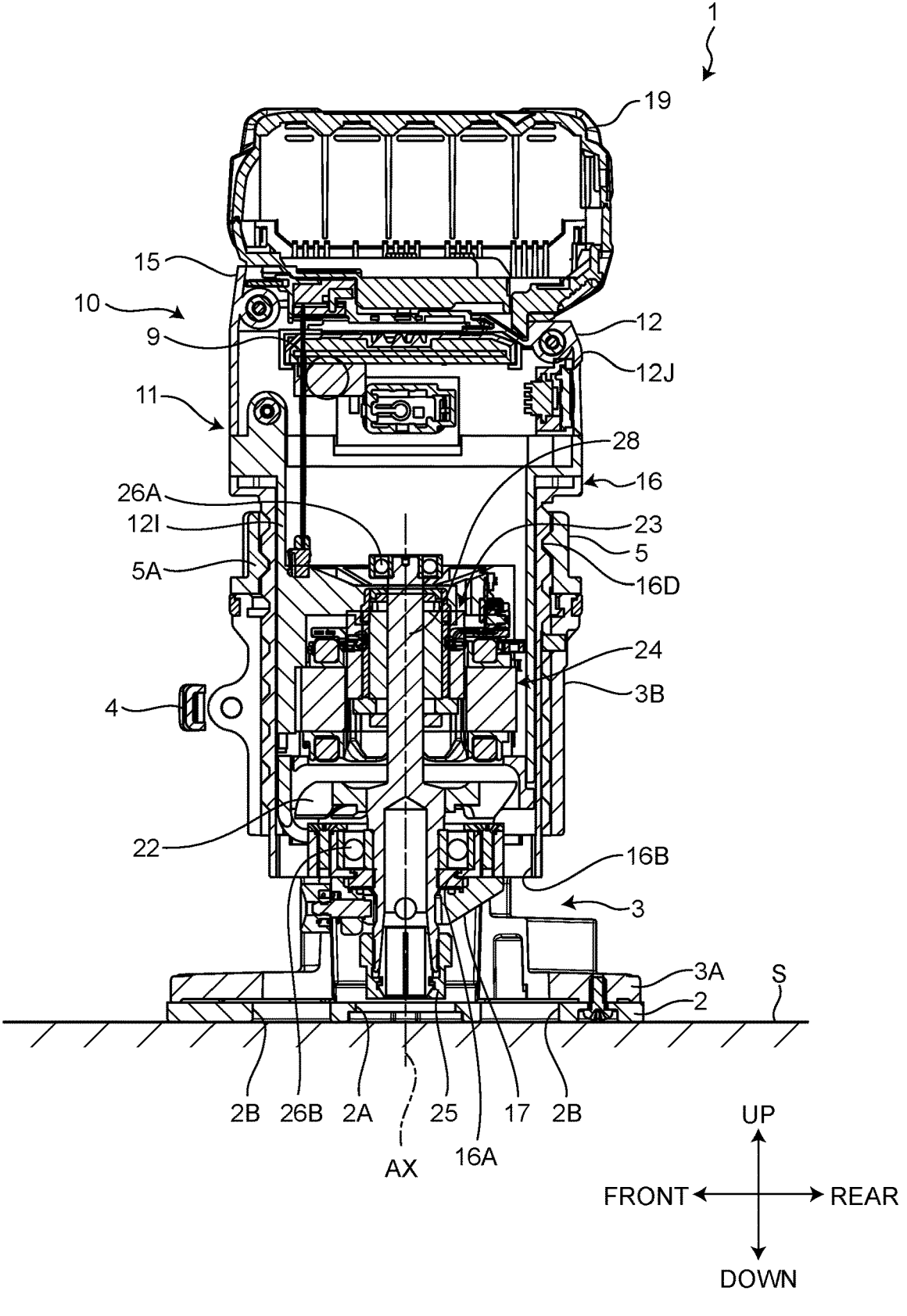
FIG. 5 is a cross-sectional view that shows the electric work machine according to the first embodiment.
Figure 6:
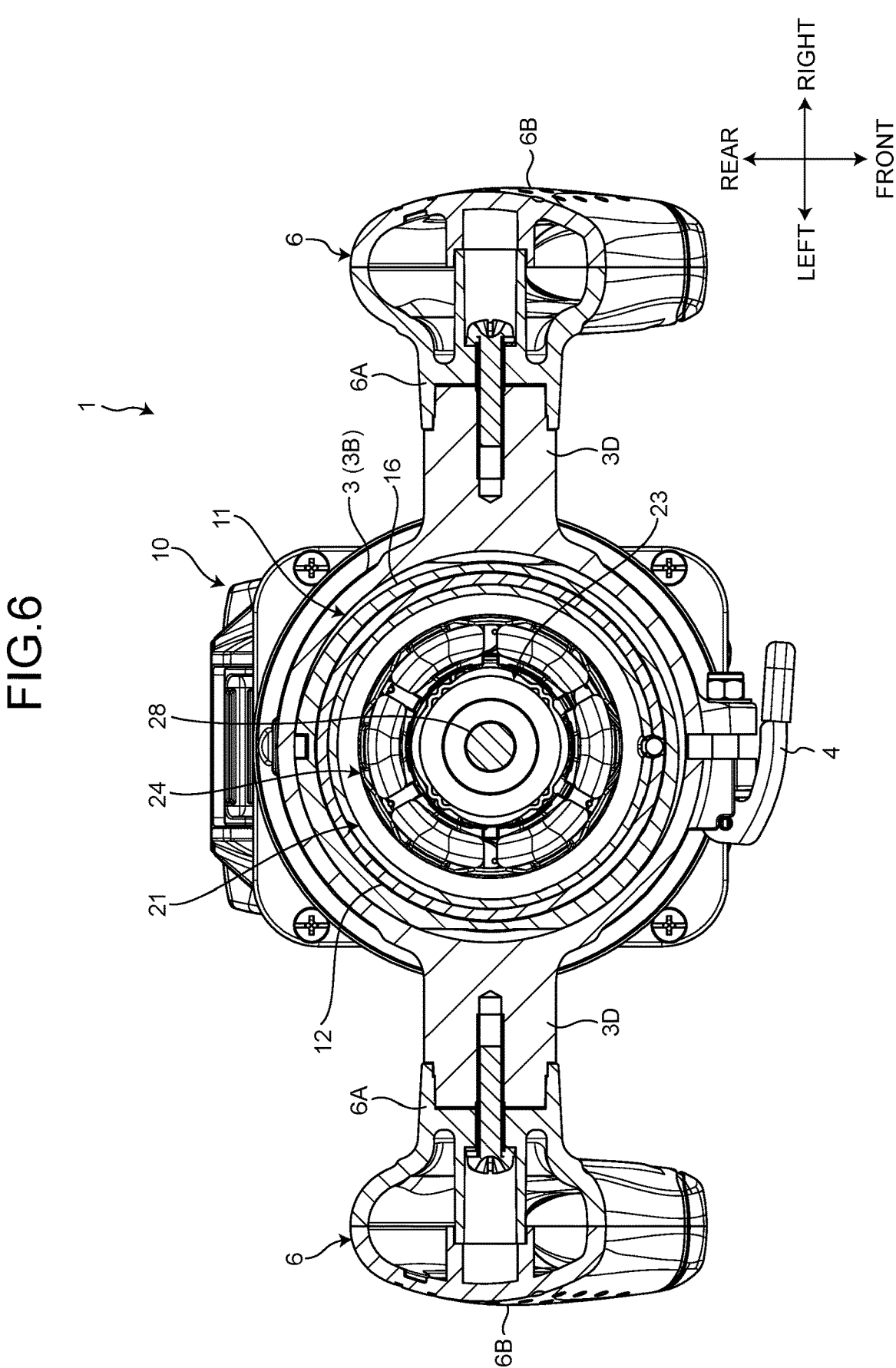
FIG. 6 is a cross-sectional view that shows the electric work machine according to the first embodiment.
Figure 7:
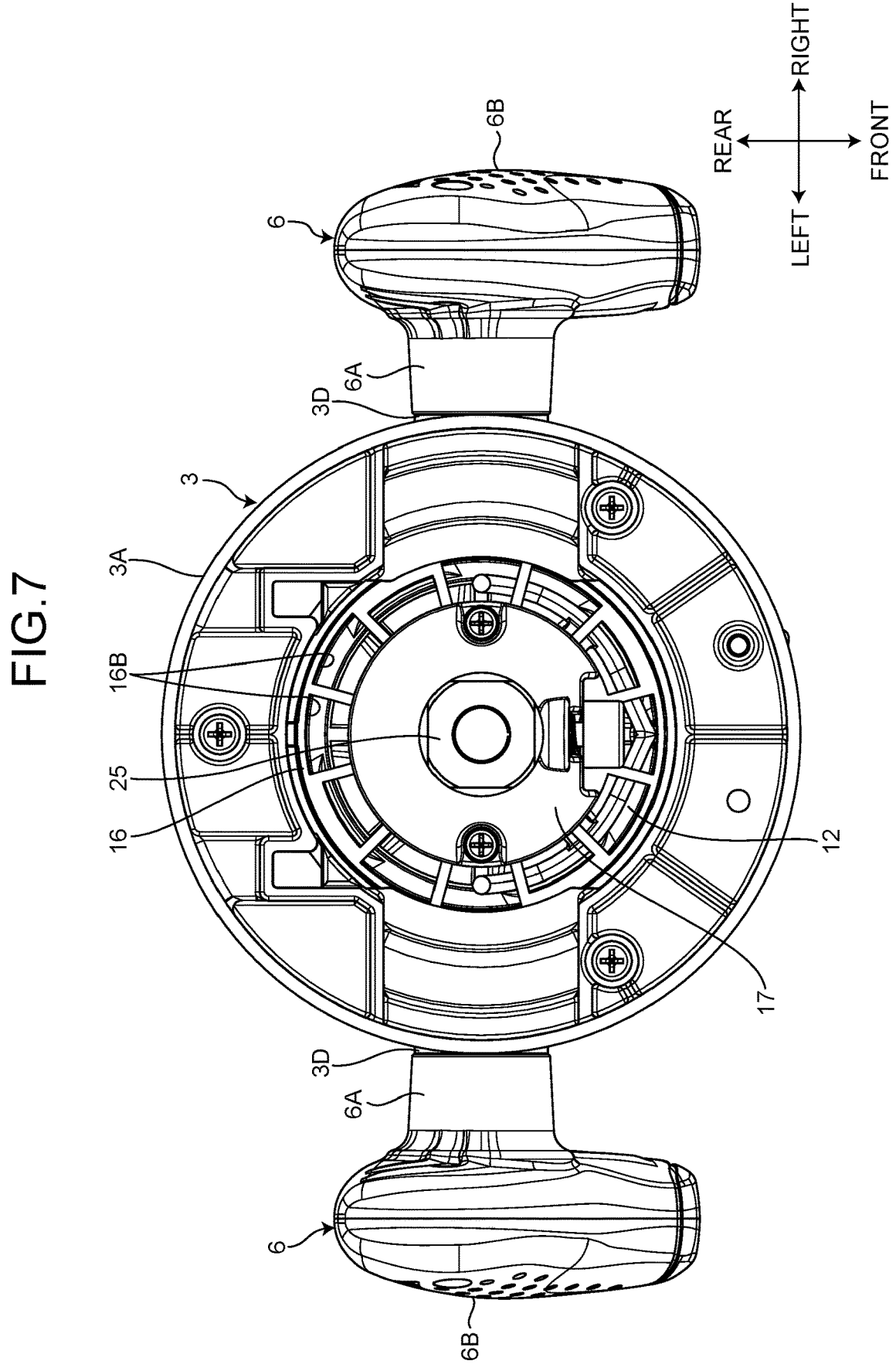
FIG. 7 is a drawing, viewed from below, of a portion of the electric work machine according to the first embodiment.

FIG. 1 is an oblique view, viewed from the upper-left rear, that shows the electric work machine 1 according to the present embodiment. FIG. 2 is a drawing, viewed from the rear, of the electric work machine 1 according to the present embodiment. FIG. 3 is a drawing, viewed from the left, of the electric work machine 1 according to the present embodiment. FIGS. 4-6 are respective cross-sectional views that show the electric work machine 1 according to the present embodiment. More specifically, FIG. 4 corresponds to a cross-sectional auxiliary view taken along line IV-IV in FIG. 3. FIG. 5 corresponds to a cross-sectional auxiliary view taken along line V-V in FIG. 2. FIG. 6 corresponds to a cross-sectional auxiliary view taken along line VI-VI in FIG. 2. FIG. 7 is a drawing, viewed from below, of a portion of the electric work machine 1 according to the present embodiment.

In the embodiment, the electric work machine 1 is a router. The electric work machine 1 comprises a window part 3E (see FIG. 3). A user grips the electric work machine 1 with an orientation in which the window part 3E faces the side opposite the user, i.e. the side that faces away from the user. In the explanation below, the side where the window part 3E exists is referred to as the forward side, and the opposite side, where a window part 3C exists, is referred to as the rearward side. The up-down and left-right directions are defined by directions viewed from the user located on the rearward side of the electric work machine 1.

The electric work machine 1 comprises: a base 2, which has a disk shape and makes contact with an upper surface of a workpiece S; a main-body support part 3, which is coupled to the base 2 on the upward side of the base 2; and a tool main body 10, which is supported on the main-body support part 3 in a manner movable up and down. A motor assembly 20, which serves as the drive source of the electric work machine 1, is housed in a main-body housing 11 of the tool main body 10.

The main-body housing 11 comprises: a motor housing 12, which is made of a resin (polymer) and has a left-right, split-in-half structure; and a bracket 16, which is made of a resin (polymer) and covers the outer circumference of the motor housing 12. The motor housing 12 comprises a right-half part 12B and a left-half part 12A, which are separated left and right. The motor housing 12 comprises: a circular-tube part 121, which is at a lower portion and has a circular-tube shape; and a flared (bulged) part 12J, which is on the upward side of the circular-tube part 121 and flares sideward. The bracket 16 is formed into a circular-tube shape that covers the outer circumference of the circular-tube part 121.

The main-body support part 3 comprises: a base-coupling part 3A, which is coupled to the base 2 and has a circular-tube shape; and a circular-tube part 3B, which covers the outer circumference of the bracket 16 on the upward side of the base-coupling part 3A and has a substantially circular-tube shape. The thickness of the base-coupling part 3A in the up-down direction is small, and the base-coupling part 3A is formed with a thickness substantially the same as that of the base 2. Through holes 2A, 2B, which pass through in the up-down direction and have a circular shape, are provided in the base 2. The through hole 2A is provided at the center of the base 2 with a size such that a tip cutting tool (bit) 25 can pass therethrough. A plurality of the through holes 2B is provided around the through hole 2A; for example, six of the through holes 2B are provided equiangularly spaced apart by 60° in the circumferential direction. The through holes 2A, 2B are exposed at the upward side of the base-coupling part 3A.

The window part 3C, which is formed such that the interior of the circular-tube part 3B is visible, is provided at a rear portion of the circular-tube part 3B. The window part 3E, which is formed such that the interior of the circular-tube part 3B is visible, is provided at a front portion of the circular-tube part 3B. By looking through the window parts 3C, 3E, the user can visually confirm, from the outer side, the tip cutting tool 25 and the base 2, which includes the through holes 2A, 2B. A pair of left and right grip-support parts 3D, which face the left- and right-outer sides and protrude substantially horizontally, is provided at left- and right-side portions of the circular-tube part 3B. A grip 6 is mounted on each of the grip-support parts 3D. Each of the grips 6 comprises: an arm part 6A, which is coupled to the corresponding grip-support part 3D and has a substantially columnar shape; and a grip part 6B, which is provided on (at) a tip (end portion) of the arm part 6A. Each of the grip parts 6B is tilted toward the downward side as it goes from the forward side toward the rearward side and has a longitudinal direction in the tilt direction. By gripping the pair of left and right grip parts 6B, the user can move the electric work machine 1 horizontally along the upper surface of the workpiece S.

A lock lever 4 is provided in an openable and closeable manner at a front portion of the circular-tube part 3B. When the lock lever 4 is open, the main-body housing 11 is movable up and down relative to the main-body support part 3. By moving the main-body housing 11 up and down, the cutting depth of the tip cutting tool 25 relative to the workpiece S can be changed. On the other hand, when the lock lever 4 has been closed, as shown in the drawing, the main-body housing 11 is fixed at a prescribed height at which it has been moved up and down relative to the main-body support part 3.

A height-adjusting dial 5, which is configured to change (adjust) the height of the main-body housing 11, is provided on the upward side of the main-body support part 3 and the downward side of the flared part 12J of the motor housing 12. The height-adjusting dial 5 is supported on an upper-end portion of the main-body support part 3 in a manner rotatable in the horizontal direction. A helical protruding part 5A, which extends helically in the circumferential direction and protrudes radially inward, is provided on an inner-circumferential surface of the height-adjusting dial 5. A helical recessed portion 16D, which extends helically in the circumferential direction and is recessed radially inward, is provided in an outer-circumferential surface of the bracket 16. The helical protruding part 5A and the helical recessed portion 16D engage with each other. The bracket 16 is rotationally locked relative to the main-body support part 3. When the height-adjusting dial 5 is rotated in the horizontal direction, the rotationally locked bracket 16 is shifted in the up-down direction by the engagement between the helical protruding part 5A and the helical recessed portion 16D. Thereby, the main-body housing 11 can be moved up and down relative to the main-body support part 3.

The motor assembly 20, which comprises the motor 21 and a fan 22, is placed in the interior of the circular-tube part 121 of the motor housing 12. The motor 21 is an inner-rotor-type DC brushless motor and comprises a rotor 23 and a stator 24. The rotor 23 comprises a rotor shaft 28. The rotor shaft 28 rotates about rotational axis AX, which extends in the up-down direction at the center of the circular-tube part 121. An upper portion of the rotor shaft 28 is supported on an upper bearing 26A in a rotatable manner. A lower portion of the rotor shaft 28 is supported on a lower bearing 26B in a rotatable manner.

The stator 24 is fixed along the inner-circumferential surface of the motor housing 12 radially outward of the rotor 23.

The fan 22 generates an airflow, which cools the motor 21. The fan 22 is mounted on the rotor shaft 28. The fan 22 is located between the rotor 23 and the lower bearing 26B in the up-down direction. The fan 22 rotates, when the motor 21 is driven (energized), about rotational axis AX integrally with the rotor shaft 28. When the fan 22 rotates, air flows from the upward side toward the downward side. A plurality of air-suction holes 12C, which pass through the flared part 12J in the left-right direction, is provided in left- and right-side surfaces of the flared part 12J. A plurality of air-exhaust holes 16B, which pass through the bracket 16 in the up-down direction and are lined up along the inner-circumferential surface of the bracket 16 in the circumferential direction, is provided at a lower portion of the bracket 16. When the fan 22 rotates, air from the exterior of the motor housing 12 is introduced into the interior of the motor housing 12 via the air-suction holes 12C. The introduced air flows toward the downward side and is exhausted via the air-exhaust holes 16B to the exterior of the main-body housing 11. The motor 21 and a controller 9, which is housed in the flared part 12J, are cooled by the airflow.

The rotor shaft 28 is inserted into a through hole 16A, which passes through the center of a lower portion of the bracket 16 in the up-down direction, and protrudes downward. A flange 17, which has a substantially conical shape, is mounted on the downward side of the bracket 16. The rotor shaft 28 protrudes more downward than the flange 17. The tip cutting tool 25, which rotates when a rotational force is generated by the motor 21, is mounted on a tip portion of the rotor shaft 28. The tip cutting tool 25 cuts the workpiece S when the motor 21 is driven. The tip cutting tool 25 is the output portion of the electric work machine 1, which rotates when the rotational force is generated by the motor 21. Alternatively, the output portion may be an output shaft, a spindle, a tool chuck, etc.

A battery-mounting part 15 is provided on an upper surface of the flared part 12J of the motor housing 12, which is the upper portion of the tool main body 10. A battery pack 19, which serves as a power supply, is mounted on the battery-mounting part 15 in a detachable manner. The battery pack 19 is a lithium-ion battery, in which a plurality of battery cells is housed in a case, and can be used repetitively by charging it using a separately prepared charger. The battery pack 19 is mounted on the battery-mounting part 15 by sliding the battery pack 19 rearward and is removed from the battery-mounting part 15 by sliding the battery pack 19 forward. The battery pack 19 can also be used as a power supply in common with other rechargeable power tools such as screwdrivers, electric drills, and the like.

The controller 9, which is principally for controlling the operation of the motor 21, is placed in the interior of the flared part 12J of the motor housing 12, which is on the downward side of the battery-mounting part 15. Because the controller 9 houses a control board in a shallow-bottomed rectangular case and is resin molded, the controller 9 has a substantially flat-plate shape. The controller 9 is housed in the flared part 12J with an orientation such that its thickness direction is in the up-down direction. A lower surface of the controller 9 is located slightly more upward than the air-suction holes 12C. A control circuit, which comprises a microcontroller, a drive circuit, which comprises FETs, an auto-stop circuit; and the like, is installed in the controller 9. The control circuit transmits control signals based on rotational-position information concerning the rotor 23 detected by a sensor board, which is not shown. The drive circuit switches the electric current supplied to the motor 21. The auto-stop circuit detects the electric-power-supply state of the battery pack 19 and, in accordance with the detection result, cuts off the supply of electric power to the motor 21 so that an over-discharged or overcurrent state does not occur.

A switch panel 13 is provided on a rear surface of the flared part 12J of the motor housing 12. A standby switch 13A and a lock-on switch 13B, which are manipulated by being pressed, are provided on the switch panel 13. The standby switch 13A enters the ON state by being pressed once. When the standby switch 13A enters the ON state, the electric work machine 1 transitions from a paused state to a standby state. In the standby state, electric power is supplied from the battery pack 19 to the controller 9. The lock-on switch 13B enters the ON state by being pressed once. When the electric work machine 1 is in the standby state and the lock-on switch 13B enters the ON state, the electric work machine 1 transitions to a drive state. In the drive state, the supply of electric power from the battery pack 19 to the motor 21 is maintained, and the drive of the motor 21 is maintained.

When the electric work machine 1 is in the drive state and the standby switch 13A or the lock-on switch 13B is pressed once, the controller 9 stops the supply of electric power from the battery pack 19 to the controller 9 and the motor 21. Thereby, the electric work machine 1 transitions to the paused state. In addition, when the electric work machine 1 is in the standby state and a prescribed time has elapsed without the lock-on switch 13B being pressed, the controller 9 sets the standby switch 13A to the OFF state. Thereby, the electric work machine 1 transitions from the standby state to the paused state. A speed-changing dial 14, which is rotatable in the horizontal direction, is provided at a left-side portion of the flared part 12J. By rotating the speed-changing dial 14, the rotational speed of the motor 21 can be adjusted. The controller 9, which is electrically connected to the battery pack 19 as described above, the motor 21, the switch panel 13, and the speed-changing dial 14 each are mounted on the motor housing 12. These electrical components are not directly mounted on the bracket 16.

Motor Assembly

Figure 8:
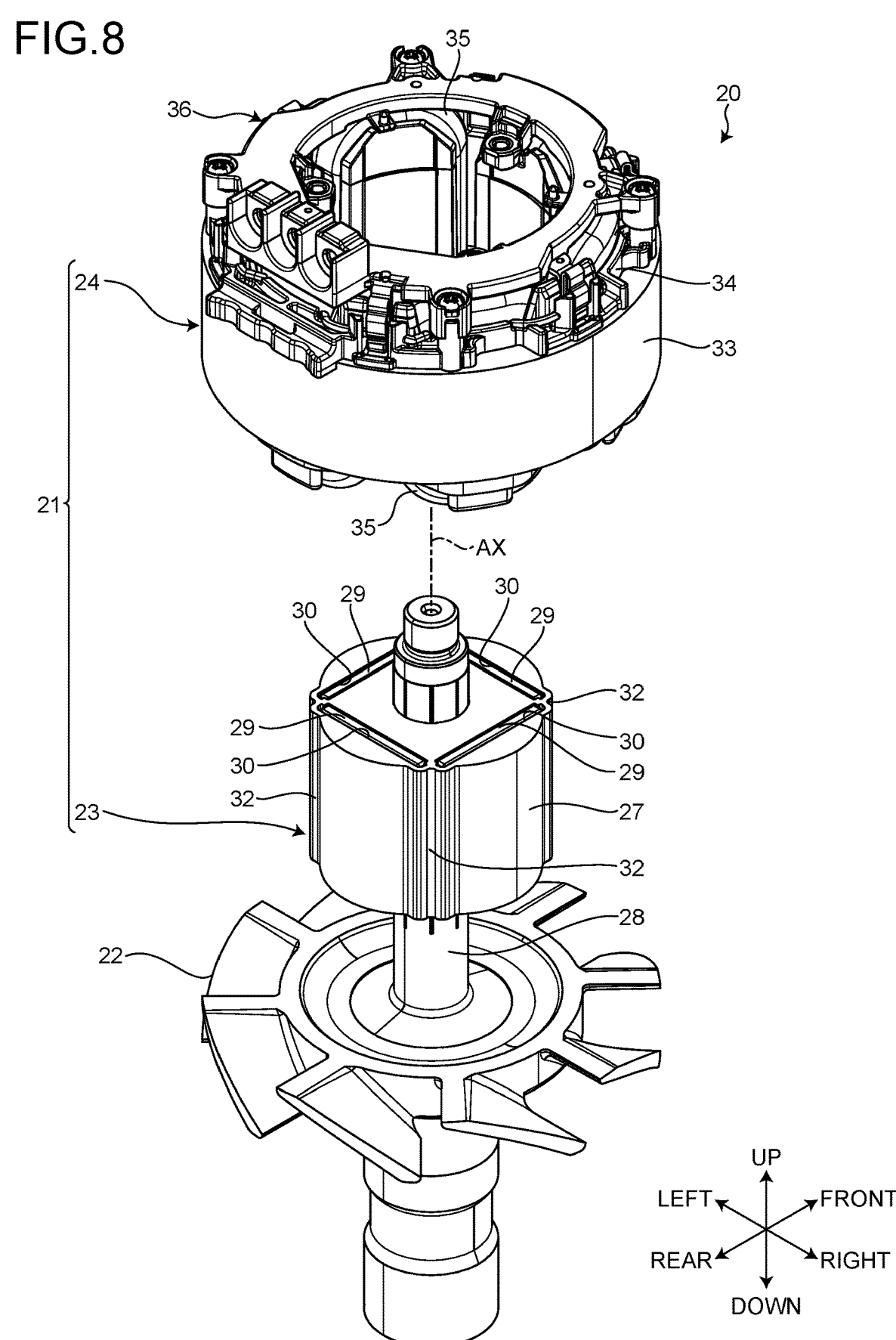
FIG. 8 is an exploded, oblique view, viewed from the upper-right rear, that shows a motor assembly according to the first embodiment.

FIG. 8 is an exploded, oblique view, viewed from the upper-right rear, that shows the motor assembly 20 according to the present embodiment. The motor assembly 20 comprises the motor 21 and the fan 22.

In the embodiment, rotational axis AX of the motor 21 extends in the up-down direction. In the embodiment, the axial direction and the up-down direction are parallel to each other. In the explanation below, one side in the axial direction is referred to as the upward side as appropriate, and other side in the axial direction is referred to as the downward side as appropriate.

The motor 21 is driven by electric power supplied from the battery pack 19. The motor 21 comprises the rotor 23 and the stator 24. The rotor 23 rotates relative to the stator 24. The motor 21 is an inner-rotor-type DC brushless motor. The stator 24 is disposed around the rotor 23. The rotor 23 rotates about rotational axis AX.

The rotor 23 comprises a rotor core 27, the rotor shaft 28, and permanent magnets 29.

The rotor core 27 comprises a plurality of stacked steel plates. The steel plates are plates made of a metal, the main component of which is iron. The rotor core 27 is disposed so as to surround rotational axis AX.

The rotor shaft 28 extends in the axial direction. The rotor shaft 28 is disposed in the interior of the rotor core 27. The rotor core 27 and the rotor shaft 28 are fixed to each other. An upper portion of the rotor shaft 28 protrudes upward from the upper-end surface of the rotor core 27. A lower portion of the rotor shaft 28 protrudes downward from the lower-end surface of the rotor core 27. As described above, the upper portion of the rotor shaft 28 is supported on (in) the upper bearing 26A in a rotatable manner. The lower portion of the rotor shaft 28 is supported on (in) the lower bearing 26B in a rotatable manner.

The permanent magnets 29 are supported in the rotor core 27. In the embodiment, four of the permanent magnets 29 are disposed around rotational axis AX. The rotor core 27 and the permanent magnets 29 are fixed to each other. Neodymium-iron-boron magnets are illustrative examples of the permanent magnets 29. The permanent magnets 29 have a plate shape. The permanent magnets 29 are disposed in the interior of the rotor core 27. The motor 21 is an interior-permanent-magnet (IPM: interior permanent magnet) motor. The rotor core 27 has magnet holes 30. The magnet holes 30 extend in the axial direction. The permanent magnets 29 are respectively disposed in the magnet holes 30. Gaps between the outer surfaces of the permanent magnets 29 and the inner surfaces of the magnet holes 30 are filled with a resin (polymer).

Recessed portions 32 are formed in an outer-circumferential surface of the rotor core 27. The recessed portions 32 extended in the axial direction. An upper-end portion of each of the recessed portions 32 is connected to the upper-end surface of the rotor core 27. A lower-end portion of each of the recessed portions 32 is connected to the lower-end surface of the rotor core 27. A plurality of the recessed portions 32 is provided in the outer-circumferential surface of the rotor core 27. In the embodiment, four of the recessed portions 32 are provided around rotational axis AX. The plurality of recessed portions 32 is disposed equispaced in the circumferential direction. The recessed portions 32 are provided to curtail the occurrence of noise caused by the rotation of the rotor core 27. It is noted that the recessed portions 32 may be omitted.

The fan 22 generates an airflow for cooling the motor 21. The fan 22 is disposed more downward than the stator 24 and the rotor core 27. The fan 22 is fixed to a lower portion of the rotor shaft 28. At least a portion of the fan 22 is disposed at a location that opposes the lower-end surface of the rotor core 27. The fan 22 rotates when the rotational force is generated by the motor 21. When the rotor shaft 28 rotates, the fan 22 rotates together with the rotor shaft 28.

Figure 9:
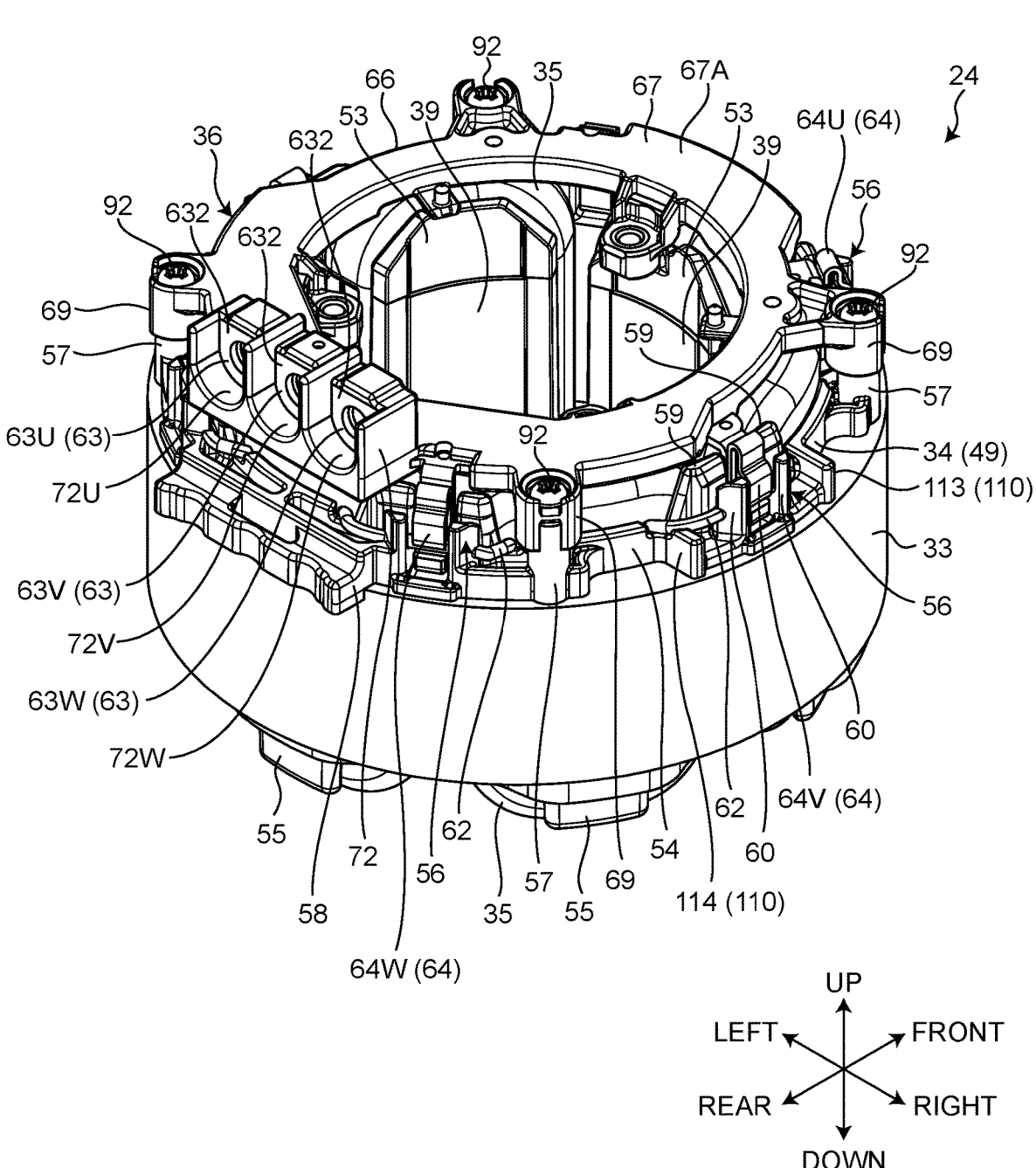
FIG. 9 is an oblique view, viewed from the upper-right rear, that shows a stator according to the first embodiment.
Figure 10:
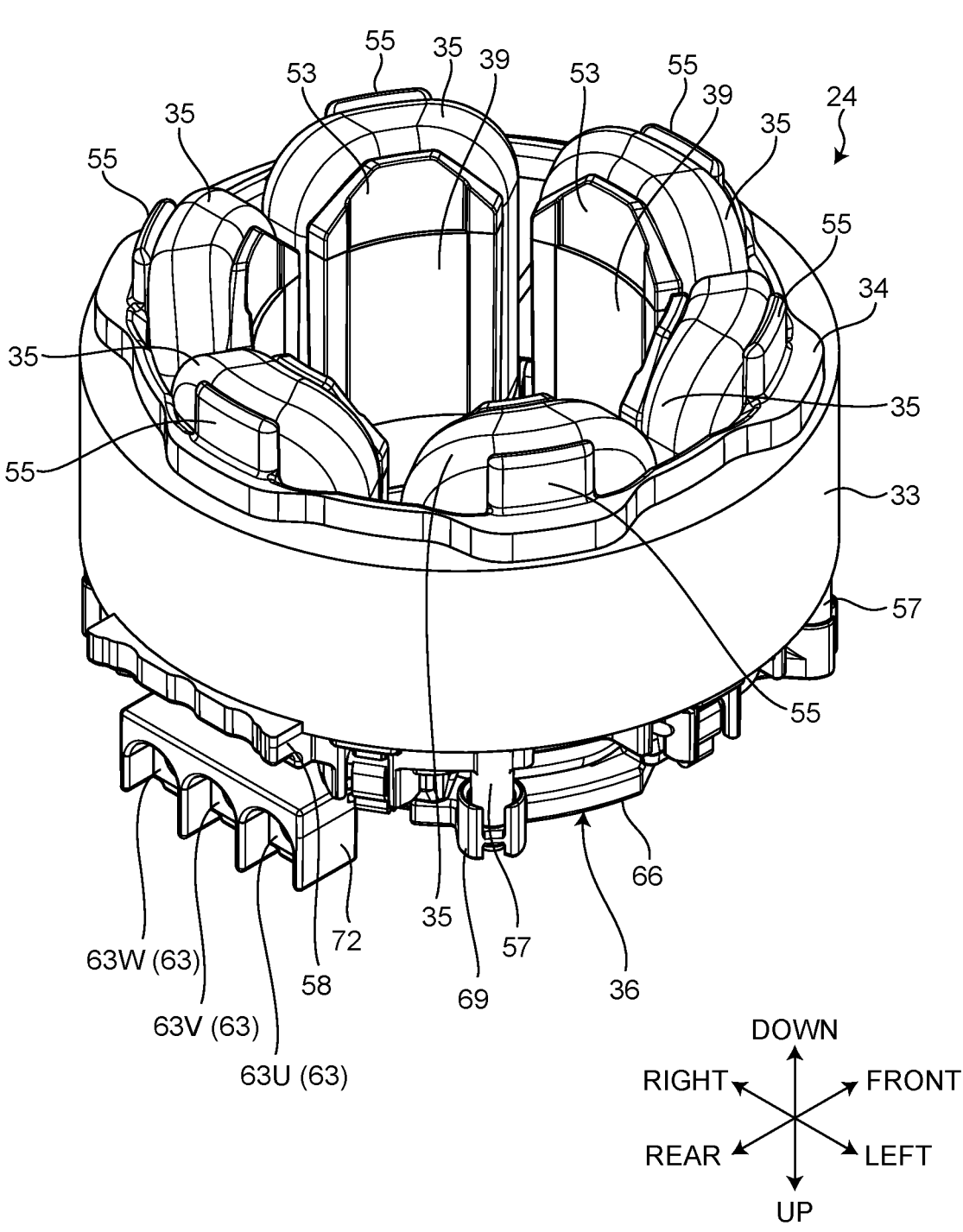
FIG. 10 is an oblique view, viewed from the lower-left rear, that shows the stator according to the first embodiment.
Figure 11:
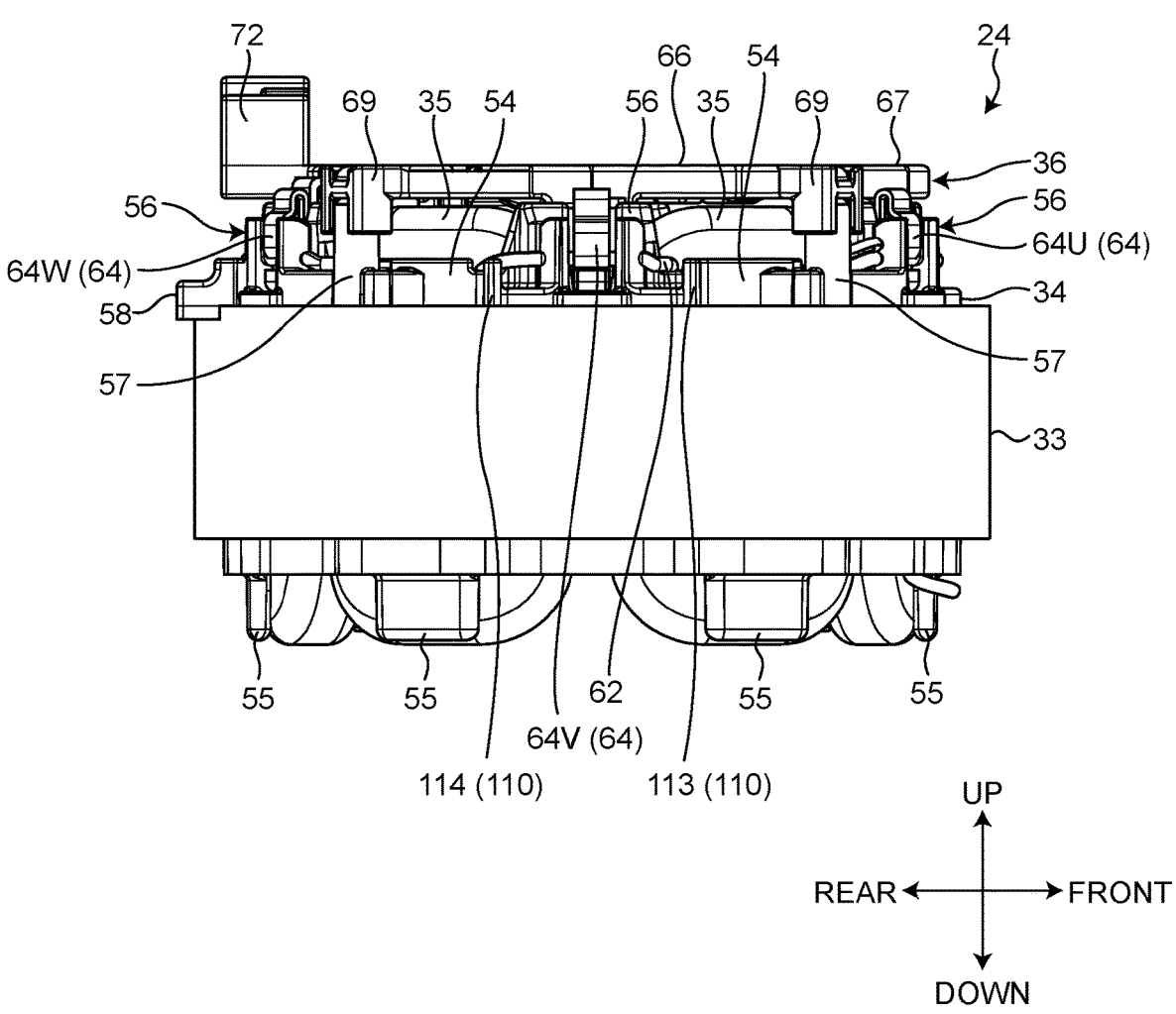
FIG. 11 is a drawing, viewed from the right, of the stator according to the first embodiment.
Figure 12:
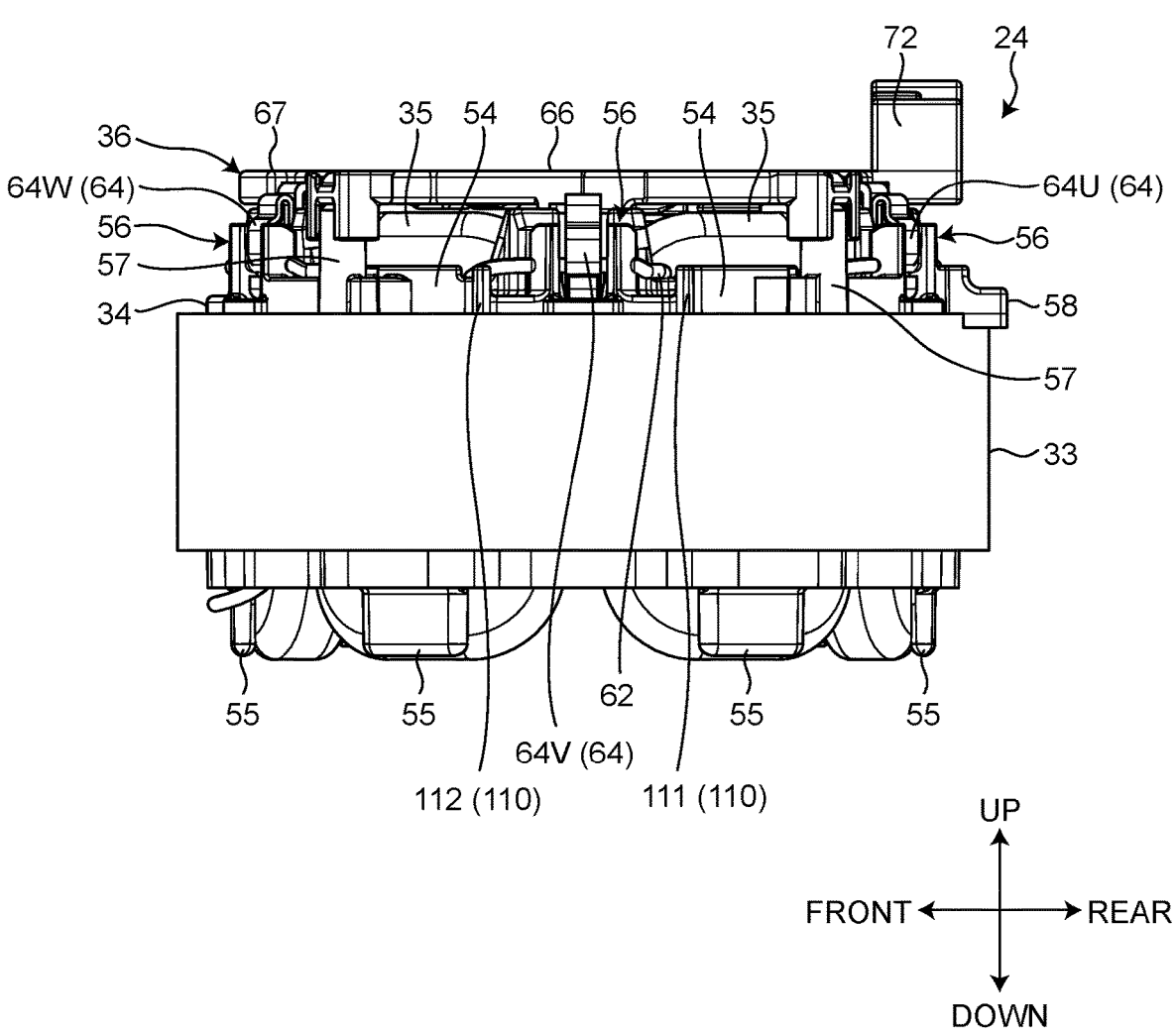
FIG. 12 is a drawing, viewed from the left, of the stator according to the first embodiment.
Figure 13:
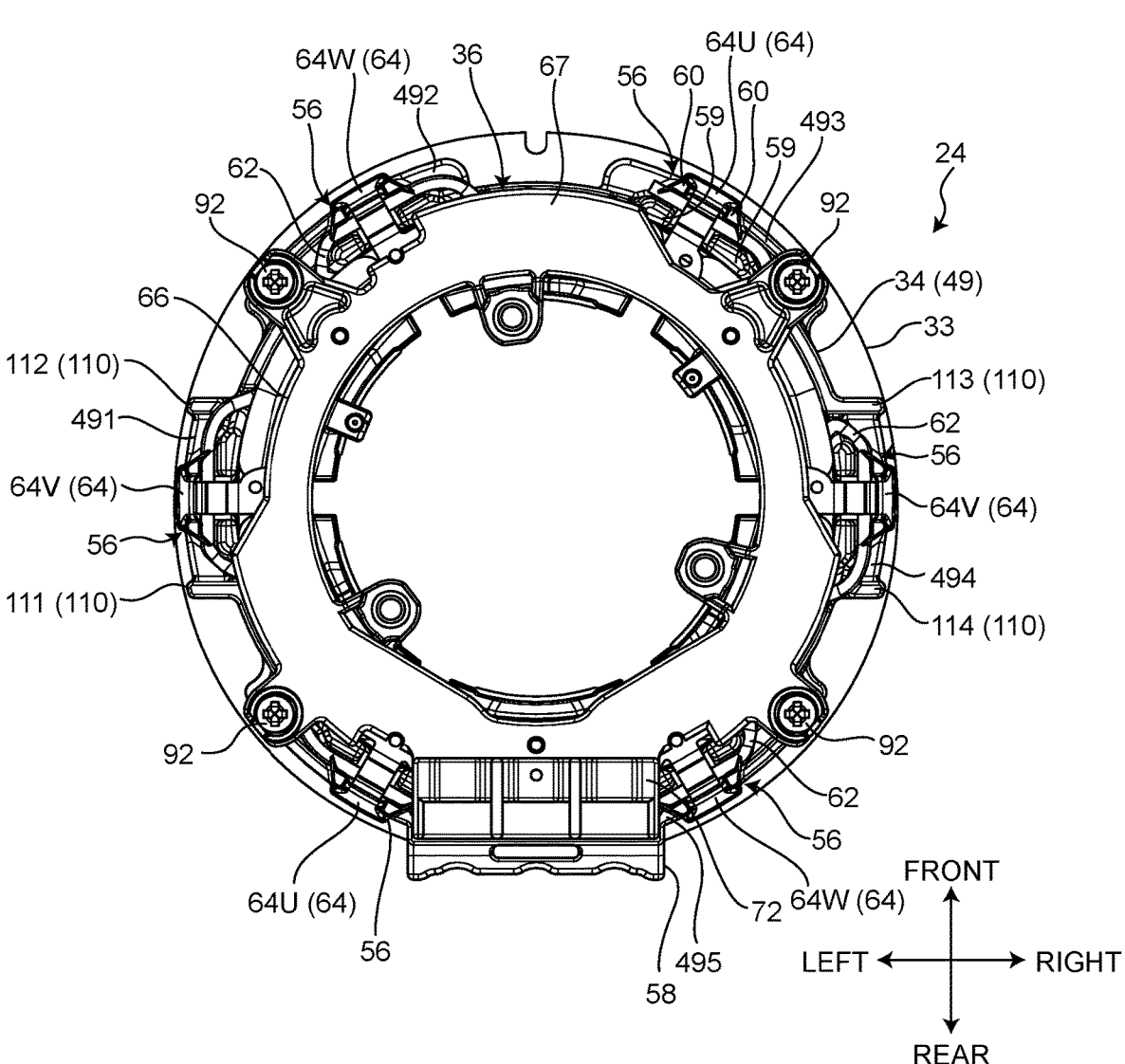
FIG. 13 is a drawing, viewed from above, of the stator according to the first embodiment.
Figure 14:
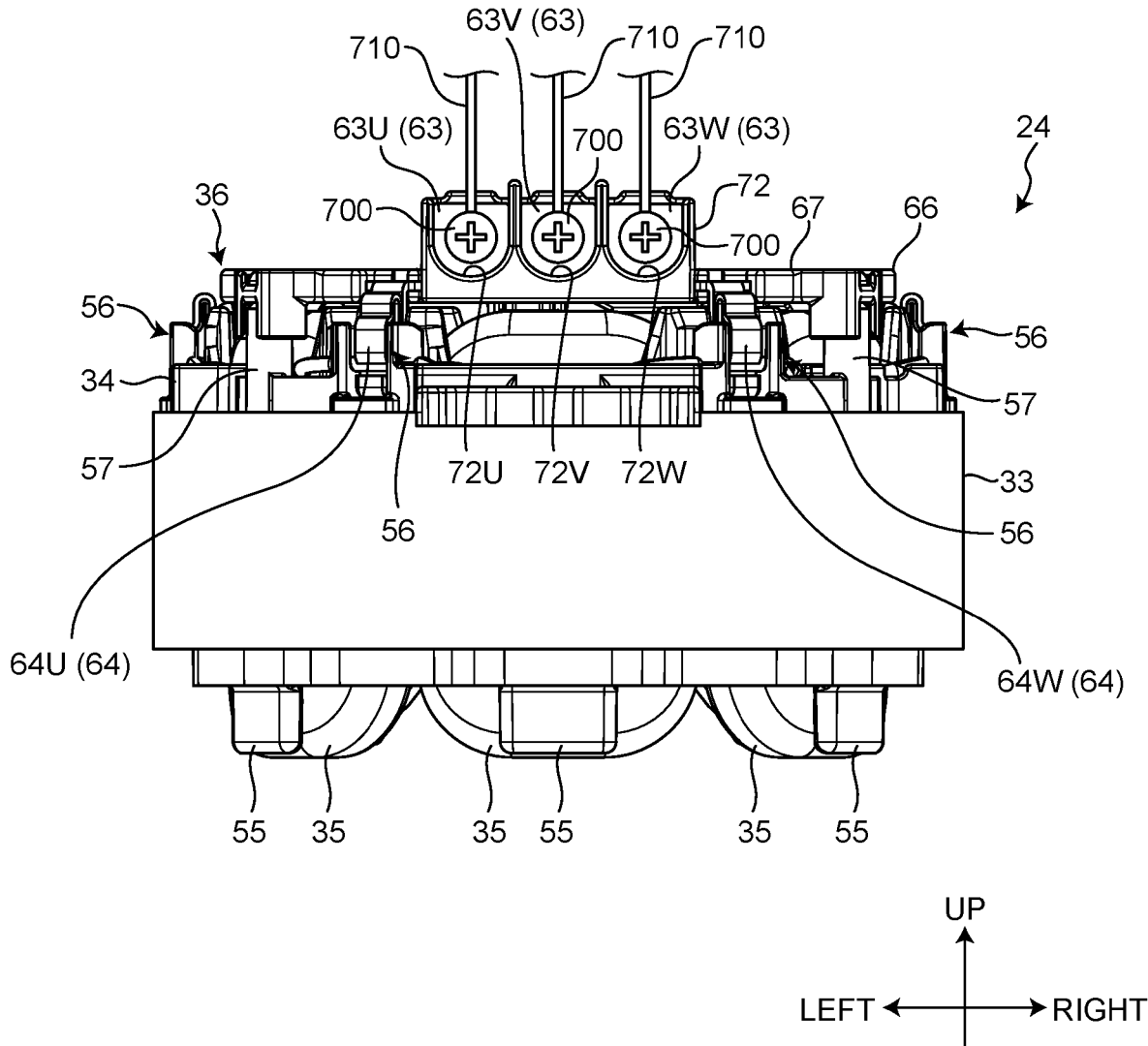
FIG. 14 is a drawing, viewed from the rear, of the stator according to the first embodiment.
Figure 15:
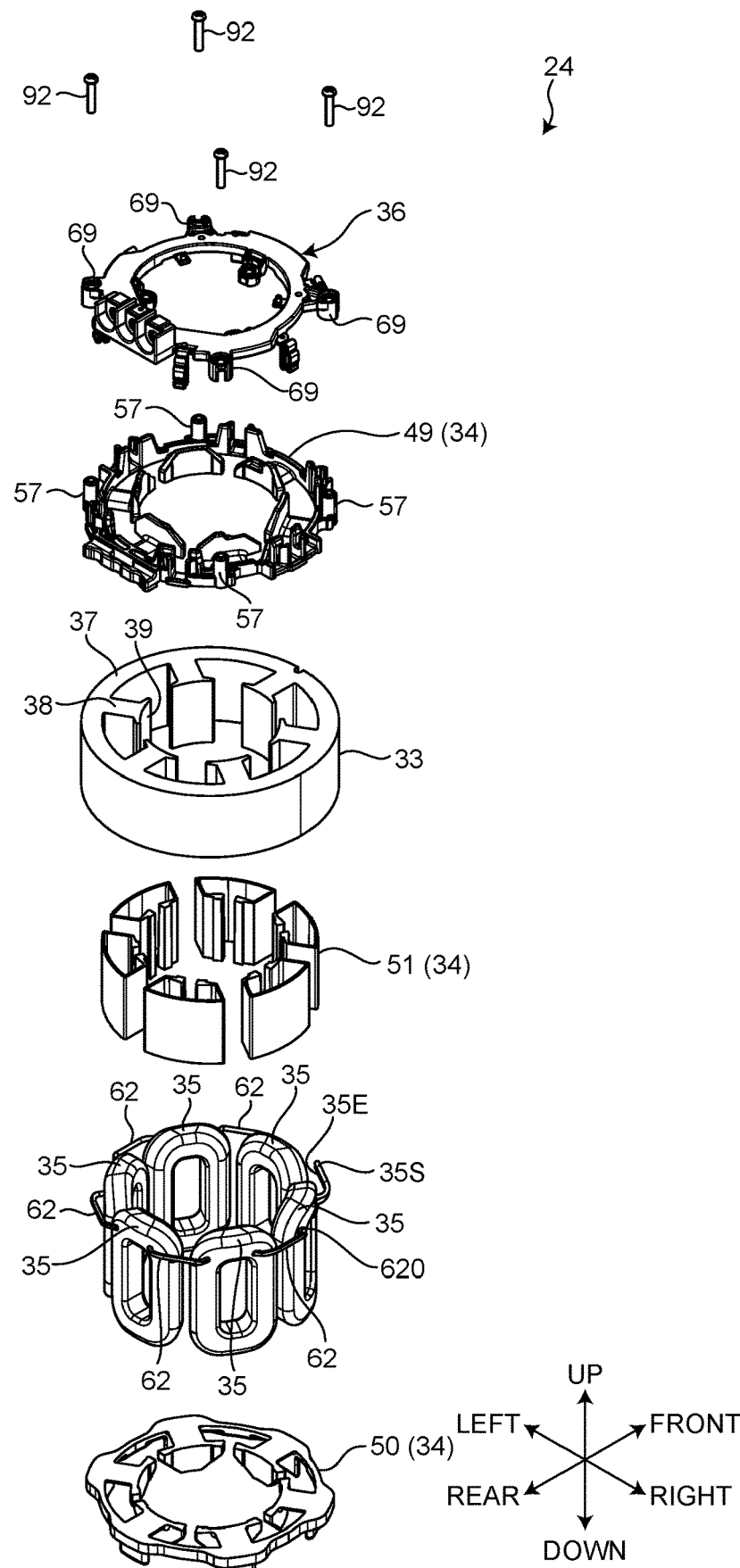
FIG. 15 is an exploded, oblique view, viewed from the upper-right rear, that shows the stator according to the first embodiment.

FIG. 9 is an oblique view, viewed from the upper-right rear, that shows the stator 24 according to the present embodiment. FIG. 10 is an oblique view, viewed from the lower-left rear, that shows the stator 24 according to the present embodiment. FIG. 11 is a drawing, viewed from the right, of the stator 24 according to the present embodiment. FIG. 12 is a drawing, viewed from the left, of the stator 24 according to the present embodiment. FIG. 13 is a drawing, viewed from above, of the stator 24 according to the present embodiment. FIG. 14 is a drawing, viewed from the rear, of the stator 24 according to the present embodiment. FIG. 15 is an exploded, oblique view, viewed from the upper-right rear, that shows the stator 24 according to the present embodiment.

As shown in FIGS. 8-15, the stator 24 comprises a stator core 33, an insulator 34, coils 35, and a short-circuiting (bus bar) unit 36.

The stator core 33 comprises a plurality of stacked steel plates. The steel plates are plates made of a metal, the main component of which is iron. The stator core 33 is disposed around the rotor core 27 of the rotor 23. The insulator 34 is an electrically insulating member made of a synthetic resin (polymer). The insulator 34 is fixed to the stator core 33. The insulator 34 is integrally molded with the stator core 33. The insulator 34 is fixed to the stator core 33 by, for example, insert molding. A plurality of the coils 35 is provided. In the embodiment, six of the coils 35 are provided. The coils 35 are fixed to the insulator 34. The short-circuiting unit 36 is fixed to the insulator 34.

Figure 16:
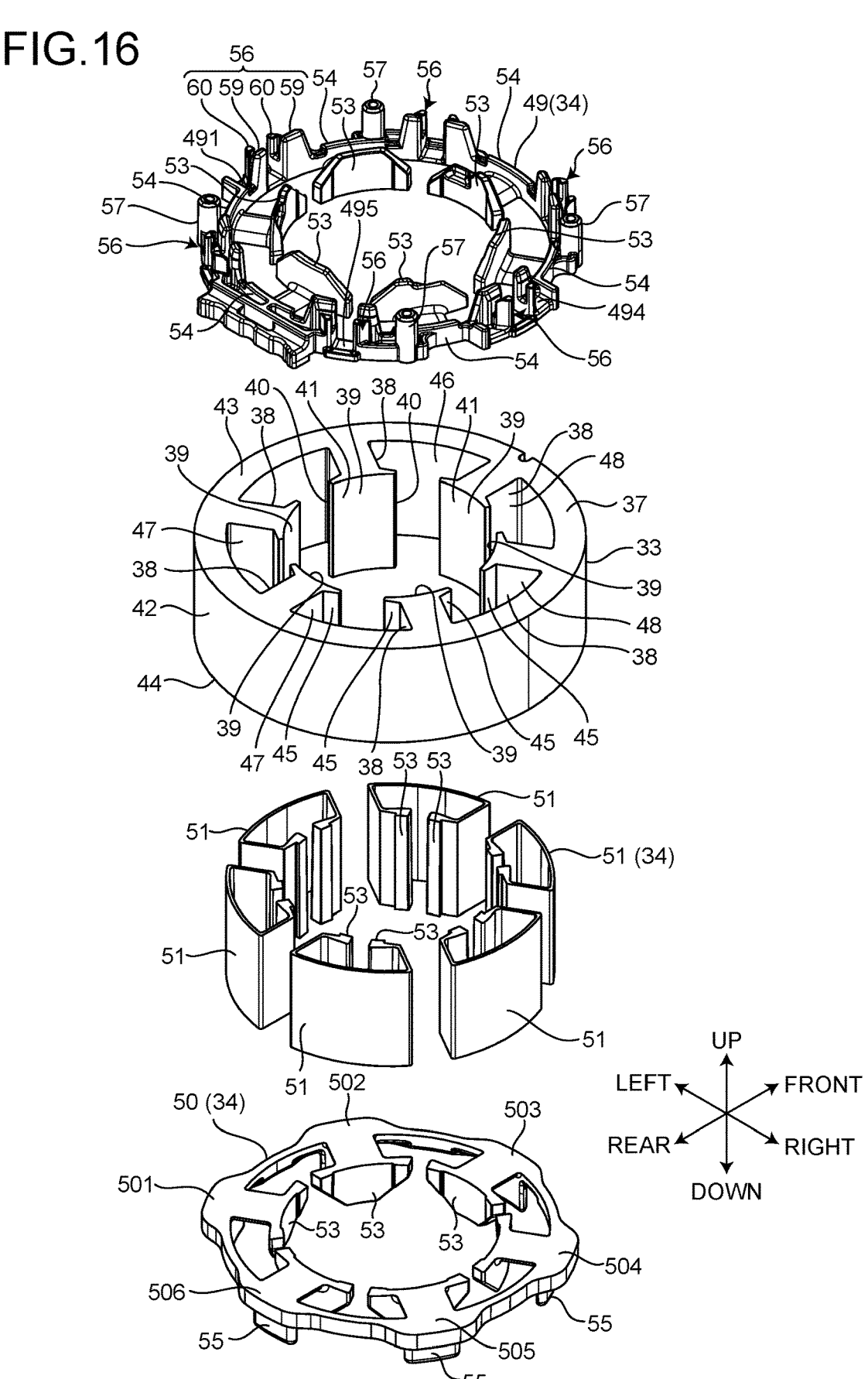
FIG. 16 is an exploded, oblique view, viewed from the upper-right rear, that shows a stator core and an insulator according to the first embodiment.

FIG. 16 is an exploded, oblique view, viewed from the upper-right rear, that shows the stator core 33 and the insulator 34 according to the present embodiment.

The stator core 33 comprises an outer-tube part 37, tooth parts 38, and inner-wall parts 39. The outer-tube part 37 is disposed so as to surround rotational axis AX. The tooth parts 38 protrude radially inward from the inner surface of the outer-tube part 37. A plurality of the tooth parts 38 is provided in the circumferential direction. In the embodiment, six of the tooth parts 38 are provided. The plurality of tooth parts 38 is disposed spaced apart in the circumferential direction. The inner-wall parts 39 are connected to radially inward end portions of the coils 35. In the circumferential direction, the dimension of the inner-wall parts 39 is larger than the dimension of the tooth parts 38. In the circumferential direction, the locations of the centers of the tooth parts 38 and the locations of the centers of the inner-wall parts 39 coincide with each other. Each of the inner-wall parts 39 comprises projecting parts 40, which project from an inner-end portion of the corresponding coil 35 toward one side in the circumferential direction and toward the other side in the circumferential direction.

The surfaces of the stator core 33 include inner surfaces 41, an outer-circumferential surface 42, an upper-end surface 43, a lower-end surface 44, opposing surfaces 45, opposing surfaces 46, side surfaces 47, and side surfaces 48.

The inner surfaces 41 face radially inward. The inner surfaces 41 are disposed on the inner-wall parts 39. The inner surfaces 41 oppose the rotor core 27. Within a plane orthogonal to rotational axis AX, the inner surfaces 41 have an arcuate shape.

The outer-circumferential surface 42 faces radially outward. The outer-circumferential surface 42 is disposed on the outer-tube part 37.

The upper-end surface 43 faces upward. The upper-end surface 43 includes the upper-end surface of the outer-tube part 37, the upper-end surfaces of the tooth parts 38, and the upper-end surfaces of the inner-wall parts 39. The upper-end surface 43 is orthogonal to rotational axis AX.

The lower-end surface 44 faces downward. The lower-end surface 44 includes the lower-end surface of the outer-tube part 37, the lower-end surfaces of the tooth parts 38, and the lower-end surfaces of the inner-wall parts 39. The lower-end surface 44 is orthogonal to rotational axis AX.

The opposing surfaces 45 face radially outward. The opposing surfaces 45 are disposed on the inner-wall parts 39.

The opposing surfaces 46 face radially inward. The opposing surfaces 46 are disposed on the outer-tube part 37.

The side surfaces 47 face toward one side in the circumferential direction. The side surfaces 47 are disposed on the tooth parts 38.

The side surfaces 48 face toward the other side in the circumferential direction. The side surfaces 48 are disposed on the tooth parts 38.

The insulator 34 is fixed to the stator core 33. The insulator 34 is disposed so as to cover at least a portion of the surfaces of the stator core 33. The insulator 34 comprises a covering part 49, a covering part 50, and covering parts 51. The covering part 49 covers at least a portion of the upper-end surface 43. The covering part 50 covers at least a portion of the lower-end surface 44. The covering parts 51 cover the opposing surfaces 45, the opposing surfaces 46, the side surfaces 47, and the side surfaces 48. The covering part 49, the covering part 50, and the covering parts 51 are integral.

As shown in FIG. 13 and FIG. 16, the covering part 49 includes a covering region 491, a covering region 492, a covering region 493, a covering region 494, and a covering region 495. The covering region 491, the covering region 492, the covering region 493, the covering region 494, and the covering region 495 cover respective portions of the upper-end surface of the outer-tube part 37. The covering region 491, the covering region 492, the covering region 493, the covering region 494, and the covering region 495 are disposed spaced apart in the circumferential direction on the upper-end surface of the outer-tube part 37.

The covering region 491 is disposed at a left portion of the upper-end surface of the outer-tube part 37. The covering region 492 is disposed at a left-front portion of the upper-end surface of the outer-tube part 37. The covering region 493 is disposed at a right-front portion of the upper-end surface of the outer-tube part 37. The covering region 494 is disposed at a right portion of the upper-end surface of the outer-tube part 37. The covering region 495 is disposed at a rear portion of the upper-end surface of the outer-tube part 37. In the circumferential direction, the dimension of the covering region 495 is larger than the dimension of the covering region 491, the dimension of the covering region 492, the dimension of the covering region 493, and the dimension of the covering region 494.

As shown in FIG. 16, the covering part 50 includes a covering region 501, a covering region 502, a covering region 503, a covering region 504, a covering region 505, and a covering region 506. The covering region 501, the covering region 502, the covering region 503, the covering region 504, the covering region 505, and the covering region 506 cover respective portions of the lower-end surface of the outer-tube part 37. The covering region 501, the covering region 502, the covering region 503, the covering region 504, the covering region 505, and the covering region 506 are disposed spaced apart in the circumferential direction on the lower-end surface of the outer-tube part 37.

The covering region 501 is disposed at a left-rear portion of the lower-end surface of the outer-tube part 37. The covering region 502 is disposed at a left-front portion of the lower-end surface of the outer-tube part 37. The covering region 503 is disposed at a front portion of the lower-end surface of the outer-tube part 37. The covering region 504 is disposed at a right-front portion of the lower-end surface of the outer-tube part 37. The covering region 505 is disposed at a right-rear portion of the lower-end surface of the outer-tube part 37. The covering region 506 is disposed at a rear portion of the lower-end surface of the outer-tube part 37. In the circumferential direction, the dimension of the covering region 501, the dimension of the covering region 502, the dimension of the covering region 503, the dimension of the covering region 504, the dimension of the covering region 505, and the dimension of the covering region 506 are equal to each other.

The insulator 34 comprises coil-stop parts 53, coil-stop parts 54, coil-stop parts 55, wire-support parts 56, screw-boss parts 57, a protruding part 58, and ribs 110.

The coil-stop parts 53 are disposed so as to surround the inner-wall parts 39. The coil-stop parts 53 are disposed more radially inward than the coils 35. The coil-stop parts 53 are provided across the covering part 49, the covering part 50, and the covering parts 51. In both the axial direction and the circumferential direction, the dimension of the coil-stop parts 53 is larger than the dimension of the inner-wall parts 39. The coil-stop parts 53 protrude upward and downward from each of the inner-wall parts 39. The coil-stop parts 53 protrude toward one side in the circumferential direction and toward the other side in the circumferential direction from each of the inner-wall parts 39. At least a portion of each of the coil-stop parts 53 protrudes upward from the upper-end surface 43 of the stator core 33. At least a portion of each of the coil-stop parts 53 protrudes downward from the lower-end surface 44 of the stator core 33.

The coil-stop parts 54 are disposed more radially outward than the coil-stop parts 53. The coil-stop parts 54 are disposed more radially outward than the coils 35. The coil-stop parts 54 are provided on the covering part 49. The coil-stop parts 54 are disposed so as to protrude upward from the upper-end surface 43 of the stator core 33. In the axial direction, the distance between the upper-end surface 43 and the upper-end portions of the coil-stop parts 54 is smaller than the distance between the upper-end surface 43 and the upper-end portions of the coil-stop parts 53. That is, the amount by which the coil-stop parts 54 protrude from the upper-end surface 43 is smaller than the amount by which the coil-stop parts 53 protrude from the upper-end surface 43.

The coil-stop parts 55 are disposed more radially outward than the coil-stop parts 53. The coil-stop parts 55 are disposed more radially outward than the coils 35. The coil-stop parts 55 are provided on the covering part 50. The coil-stop parts 55 are disposed such that they protrude downward from the lower-end surface 44 of the stator core 33. In the axial direction, the distance between the lower-end surface 44 and the lower-end portions of the coil-stop parts 55 is larger than the distance between the lower-end surface 44 and the lower-end portions of the coil-stop parts 53. That is, the amount by which the coil-stop parts 55 protrude from the lower-end surface 44 is larger than the amount by which the coil-stop parts 53 protrude from the lower-end surface 44.

The wire-support parts 56 are provided on the covering part 49. The number of the wire-support parts 56 provided is the same as the number of the coils 35. The wire-support parts 56 are disposed more radially outward than the coils 35. Each of the wire-support parts 56 comprises a pair of projecting parts 59, which project upward from the covering part 49, and a pair of projecting parts 60, which project upward from the covering part 49. The pair of projecting parts 59 is disposed in the circumferential direction. The pair of projecting parts 60 is disposed in the circumferential direction. The projecting parts 60 are disposed more radially outward than the projecting parts 59. In the axial direction, the distance between the upper-end surface 43 and the upward end portions of the projecting parts 59 is larger than the distance between the upper-end surface 43 and the upward end portions of the projecting parts 60. That is, the amount by which the projecting parts 59 project from the upper-end surface 43 is larger than the amount by which the projecting parts 60 project from the upper-end surface 43.

One of the wire-support parts 56 is provided in each of the covering region 491, the covering region 492, the covering region 493, and the covering region 494. Two of the wire-support parts 56 are provided in the covering region 495.

The screw-boss parts 57 are provided on the covering part 49. The screw-boss parts 57 protrude upward from the covering part 49. A plurality of the screw-boss parts 57 is disposed around rotational axis AX. In the present embodiment, four of the screw-boss parts 57 are provided spaced apart in the circumferential direction. One of the screw-boss parts 57 is provided in each of the covering region 492 and the covering region 493. Two of the screw-boss parts 57 are provided in the covering region 495. A screw hole is formed in each of the screw-boss parts 57.

The ribs 110 are provided at portions of the covering part 49. The ribs 110 protrude upward from the surface of the covering part 49. In the present embodiment, the covering region 491 and the covering region 494 each has two of the ribs 110. The ribs 110 extend in the left-right direction. In the covering region 491, the ribs 110 are disposed on both sides in the circumferential direction of the corresponding wire-support part 56. In the covering region 494, the ribs 110 are disposed on both sides in the circumferential direction of the corresponding wire-support part 56.

In the present embodiment, the ribs 110 include a rib 111 and a rib 112, which are disposed in the covering region 491, and a rib 113 and a rib 114, which are disposed in the covering region 494. The rib 111 is disposed more rearward than the corresponding wire-support part 56 in the covering region 491. The rib 112 is disposed more forward than the corresponding wire-support part 56 in the covering region 491. The rib 113 is disposed more forward than the corresponding wire-support part 56 in the covering region 494. The rib 114 is disposed more rearward than the corresponding wire-support part 56 in the covering region 494.

The protruding part 58 protrudes radially outward from the covering region 495, which covers a rear portion of the upper-end surface of the outer-tube part 37. At least a portion of the protruding part 58 protrudes more radially outward than the outer-circumferential surface of the stator core 33. The protruding part 58 makes contact with at least a portion of the inner surface of the motor housing 12. The protruding part 58 functions as a rotational-lock mechanism that restrains (blocks, prevents) rotation of the motor 21 relative to the motor housing 12.

The coils 35 are fixed to the insulator 34. The coils 35 are mounted on the stator core 33 via the insulator 34. A plurality of the coils 35 is provided. In the embodiment, six of the coils 35 are provided. The coils 35 are wound respectively around the tooth parts 38 via the insulator 34.

In the state in which the coils 35 have been wound around the tooth parts 38 via the insulator 34, the coil-stop parts 53 are disposed more radially inward than the coils 35.

In the state in which the coils 35 have been wound around the tooth parts 38 via the insulator 34, the coil-stop parts 54 are disposed more radially outward than the coils 35.

In the state in which the coils 35 have been wound around the tooth parts 38 via the insulator 34, the coil-stop parts 55 are disposed more radially outward than the coils 35.

In the radial direction, a portion of each of the coils 35 is disposed between the corresponding coil-stop part 53 and the corresponding coil-stop part 54. In the radial direction, a separate portion of each of the coils 35 is disposed between the corresponding coil-stop part 53 and the corresponding coil-stop part 55. The plurality of coils 35 is fixed to the insulator 34. The coils 35 and the stator core 33 are insulated from each other by the insulator 34.

The plurality of coils 35 is formed by the winding of one wire 620. The coils that are adjacent in the circumferential direction are each connected to each other by a respective connection wire 62, which is a portion of the wire 620. Thus, the connection wires 62 are the respective portions of the wire 620 between each pair of circumferentially-adjacent coils 35. In the axial direction, each of the connection wires 62 is disposed between the center of the corresponding coil 35 and an upper-end portion of the corresponding coil 35.

The connection wires 62 are supported on the wire-support parts 56 of the insulator 34. In the present embodiment, each of the connection wires 62 is disposed between the corresponding projecting part 59 and the corresponding projecting part 60 in the radial direction.

Figure 17:
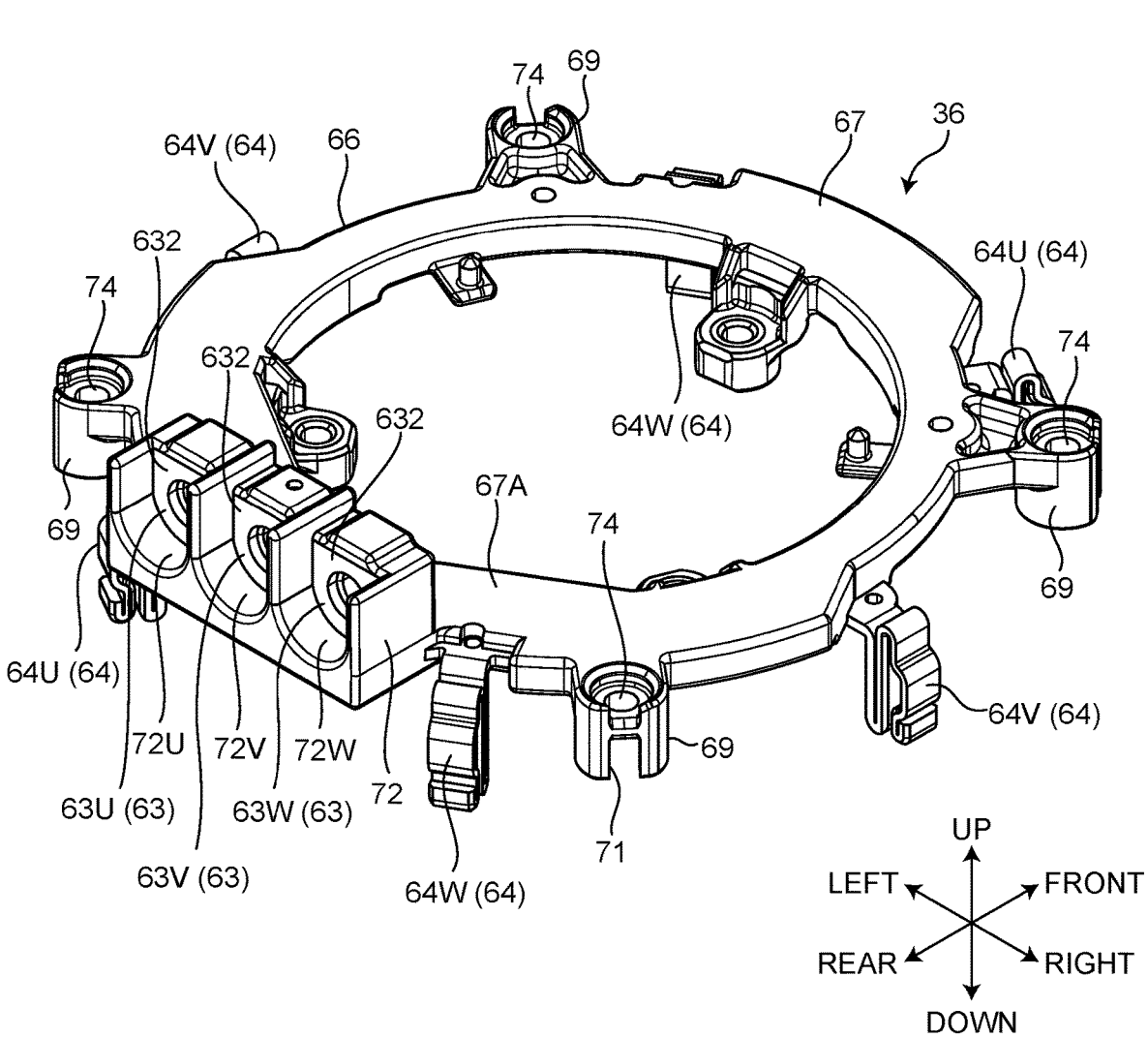
FIG. 17 is an oblique view, viewed from the upper-right rear, that shows a short-circuiting unit according to the first embodiment.
Figure 18:
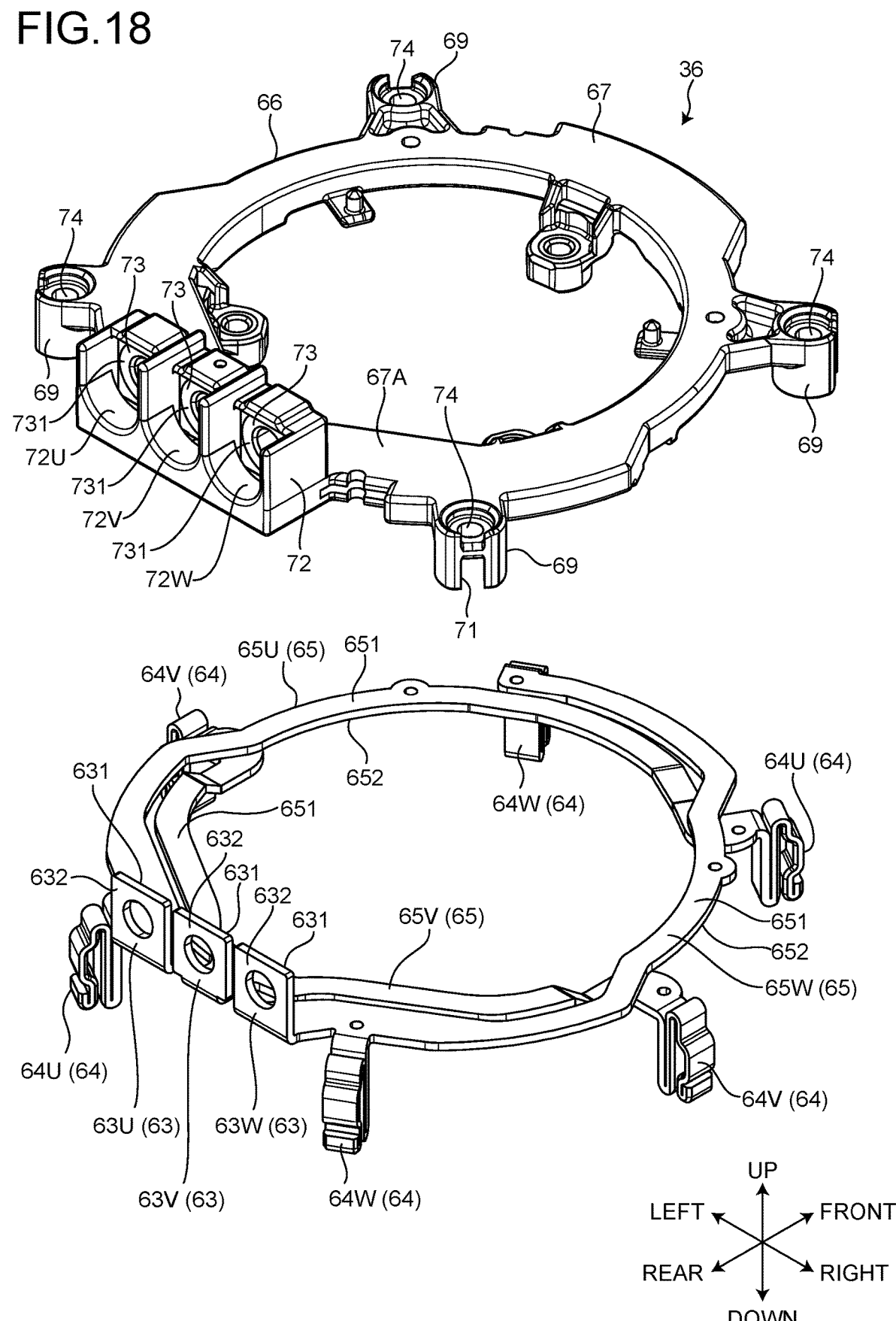
FIG. 18 is an exploded, oblique view, viewed from the upper-right rear, that shows the short-circuiting unit according to the first embodiment.

FIG. 17 is an oblique view, viewed from the upper-right rear, that shows the short-circuiting unit 36 according to the present embodiment. FIG. 18 is an exploded, oblique view, viewed from the upper-right rear, that shows the short-circuiting unit 36 according to the present embodiment.

A drive current from the battery pack 19 is supplied to the short-circuiting unit 36. The drive current from the battery pack 19 is supplied to the short-circuiting unit 36 via the controller 9 and the power-supply lines 710 (see FIG. 14). The drive current supplied from the battery pack 19 to the short-circuiting unit 36 is controlled by the controller 9. The short-circuiting unit 36 comprises external terminals 63, coil terminals 64, short-circuiting members 65, and an insulating member 66.

As shown in FIG. 14, the external terminals 63 are connected to the power-supply lines 710. The power-supply lines 710 connect the controller 9 and the external terminals 63. The external terminals 63 are connected to the battery pack 19 via the power-supply lines 710 and the controller 9. The drive current from the battery pack 19 is supplied to the external terminals 63 via the controller 9 and the power-supply lines 710. In the present embodiment, three of the external terminals 63 are provided.

The coil terminals 64 are connected to the coils 35 via the connection wires 62. The coil terminals 64 may be called fusing terminals. The coil terminals 64 are electrically conductive members. In the state in which the connection wires 62 are supported on the wire-support parts 56, the connection wires 62 are connected to the coil terminals 64. Each of the connection wires 62 is disposed on the inner side of a bent portion of the corresponding coil terminal 64. Each of the coil terminals 64 and the corresponding connection wire 62 are welded to each other. Owing to the coil terminals 64 and the connection wires 62 being respectively welded to each other, the coil terminals 64 are connected to the coils 35 via the connection wires 62.

A plurality of the coil terminals 64 is disposed around rotational axis AX. In the axial direction, the locations of the coil terminals 64 are the same. The number of coil terminals 64 provided is the same as the number of coils 35. In the present embodiment, six of the coil terminals 64 are provided.

The short-circuiting members 65 connect the external terminals 63 and the coil terminals 64. In the present embodiment, the short-circuiting members 65 are integral with the external terminals 63 and the coil terminals 64. The short-circuiting members 65 connect (short circuit) a pair of the connection wires 62 that oppose each other in the radial direction. The pair of connection wires 62 that oppose each other in the radial direction are spaced apart by 180° in the circumferential direction. The short-circuiting members 65 are electrically conductive members. The short-circuiting members 65 are disposed partially around rotational axis AX. Within a plane orthogonal to rotational axis AX, the short-circuiting members 65 are curved. A plurality of the short-circuiting members 65 is provided. In the present embodiment, three of the short-circuiting members 65 are provided. Each of the short-circuiting members 65 electrically connects (short circuits) one of the external terminals 63 with two of the coil terminals 64.

The insulating member 66 is made of a synthetic resin (polymer). The insulating member 66 is provided so as to surround rotational axis AX. The insulating member 66 supports the external terminals 63 and the short-circuiting members 65. The coil terminals 64 are supported on the insulating member 66 via the short-circuiting members 65. The insulating member 66 comprises a base part 67, screw-boss parts 69, positioning, recessed portions 71, and a support part 72.

The base part 67 has a ring shape. The base part 67 supports the short-circuiting members 65. A portion or the entirety of each of the short-circuiting members 65 is disposed in the interior of the base part 67. The base part 67 is integrally molded with the short-circuiting members 65. The short-circuiting members 65 are molded of the synthetic resin (polymer) that forms the base part 67. It is noted that the base part 67 may be fixed to the short-circuiting members 65 by, for example, insert molding. The three short-circuiting members 65 are insulated from each other by the base part 67.

The screw-boss parts 69 protrude radially outward from an outer-edge portion of the base part 67. A plurality of the screw-boss parts 69 is provided in the circumferential direction. In the embodiment, four of the screw-boss parts 69 are provided. Openings 74 are formed in the screw-boss parts 69.

The positioning, recessed portions 71 are disposed more radially outward than the base part 67. The positioning, recessed portions 71 are provided in the screw-boss parts 69. The positioning, recessed portions 71 are provided so as to recess upward from the lower-end surfaces of the screw-boss parts 69.

The support part 72 protrudes in the axial direction from the base part 67. The support part 72 supports the external terminals 63. In the present embodiment, the support part 72 protrudes upward from a rear portion of the base part 67. The support part 72 is disposed upward of the protruding part 58 of the insulator 34.

The support part 72 comprises three retaining parts 72U, 72V, 72W, which respectively retain the external terminals 63 and nuts 73. In the present embodiment, there is one support part 72. The three retaining parts 72U, 72V, 72W are provided on the one support part 72. The external terminals 63 are disposed respectively on the three retaining parts 72U, 72V, 72W. In addition, the support part 72 holds the three nuts 73. The nuts 73 are fixed to the support part 72. As shown in FIG. 14, the power-supply lines 710 and the external terminals 63 are fixed to each other by bolts or screws 700, which are coupled to the nuts 73.

The insulating member 66 is disposed more radially inward than the outer-circumferential surface of the stator core 33. That is, the insulating member 66 is provided such that it does not protrude more radially outward than the stator core 33. As shown in FIG. 11 and FIG. 12, a rear-end portion of the support part 72 is disposed more forward than the rear-end portion of the protruding part 58.

As in the insulating member 66, the external terminals 63, the coil terminals 64, and the short-circuiting members 65 are each disposed more radially inward than the outer-circumferential surface of the stator core 33. In the radial direction, the distance between rotational axis AX and the external terminals 63 is shorter than the distance between rotational axis AX and the coil terminals 64. That is, the external terminals 63 are disposed more radially inward than the coil terminals 64.

In the present embodiment, all members that constitute the short-circuiting unit 36 are disposed more radially inward than the outer-circumferential surface of the stator core 33. All members that constitute the short-circuiting unit 36 are provided such that they do not protrude more radially outward than the stator core 33.

The external terminals 63 protrude in the axial direction from the short-circuiting members 65. The coil terminals 64 protrude in the axial direction from the short-circuiting members 65. The external terminals 63 protrude upward from the short-circuiting members 65. The coil terminals 64 protrude downward from the short-circuiting members 65.

The external terminals 63 have a plate shape. Each of the external terminals 63 has a front surface 631 (first surface) and a rear surface 632 (second surface). The front surface 631 faces radially inward. The rear surface 632 faces radially outward. The front surface 631 and the rear surface 632 are parallel to each other. The front surface 631 and the rear surface 632 each is a flat surface. The front surface 631 and the rear surface 632 each are parallel to rotational axis AX. The external terminals 63 are retained on the retaining parts 72U, 72V, 72W of the support part 72 such that the front surfaces 631 and the rear surfaces 632 each are parallel to rotational axis AX.

Each of the nuts 73 has an opposing surface 731, which opposes the corresponding front surface 631. The opposing surfaces 731 face radially outward. The opposing surfaces 731 are flat surfaces. The opposing surfaces 731 are parallel to rotational axis AX. The nuts 73 are retained on the retaining parts 72U, 72V, 72W of the support part 72 such that the opposing surfaces 731 and rotational axis AX are parallel to each other.

An upper surface 67A is substantially a flat surface. The upper surface 67A of the base part 67 is substantially orthogonal to rotational axis AX. Side surfaces of the support part 72 and the upper surface 67A of the base part 67 are substantially orthogonal to each other.

The short-circuiting members 65 have a plate shape. Each of the short-circuiting members 65 has an upper surface 651 (one surface) and a lower surface 652 (other surface). The upper surface 651 faces upward. The lower surface 652 faces downward. The upper surface 651 and the lower surface 652 are substantially parallel to each other. The thickness of each of the short-circuiting members 65, which indicates the distance between the upper surface 651 and the lower surface 652 in the axial direction, is constant. The upper surface 651 and the lower surface 652 each are substantially orthogonal to rotational axis AX. The front surface 631 of the external terminal 63 and the upper surface 651 of the short-circuiting member 65 are substantially orthogonal to each other.

The insulating member 66 of the short-circuiting unit 36 is fixed to the insulator 34. The motor assembly 20 has screws 92, which fix the insulating member 66 of the short-circuiting unit 36 and the insulator 34 to each other. The screws 92 are coupled to the screw holes in the screw-boss parts 57 of the insulator 34 via the openings 74 in the screw-boss parts 69 of the insulating member 66. The insulating member 66 of the short-circuiting unit 36 and the insulator 34 are fixed to each other by the screws 92. At least a portion of the short-circuiting unit 36 is disposed more upward than the insulator 34.

Figure 19:
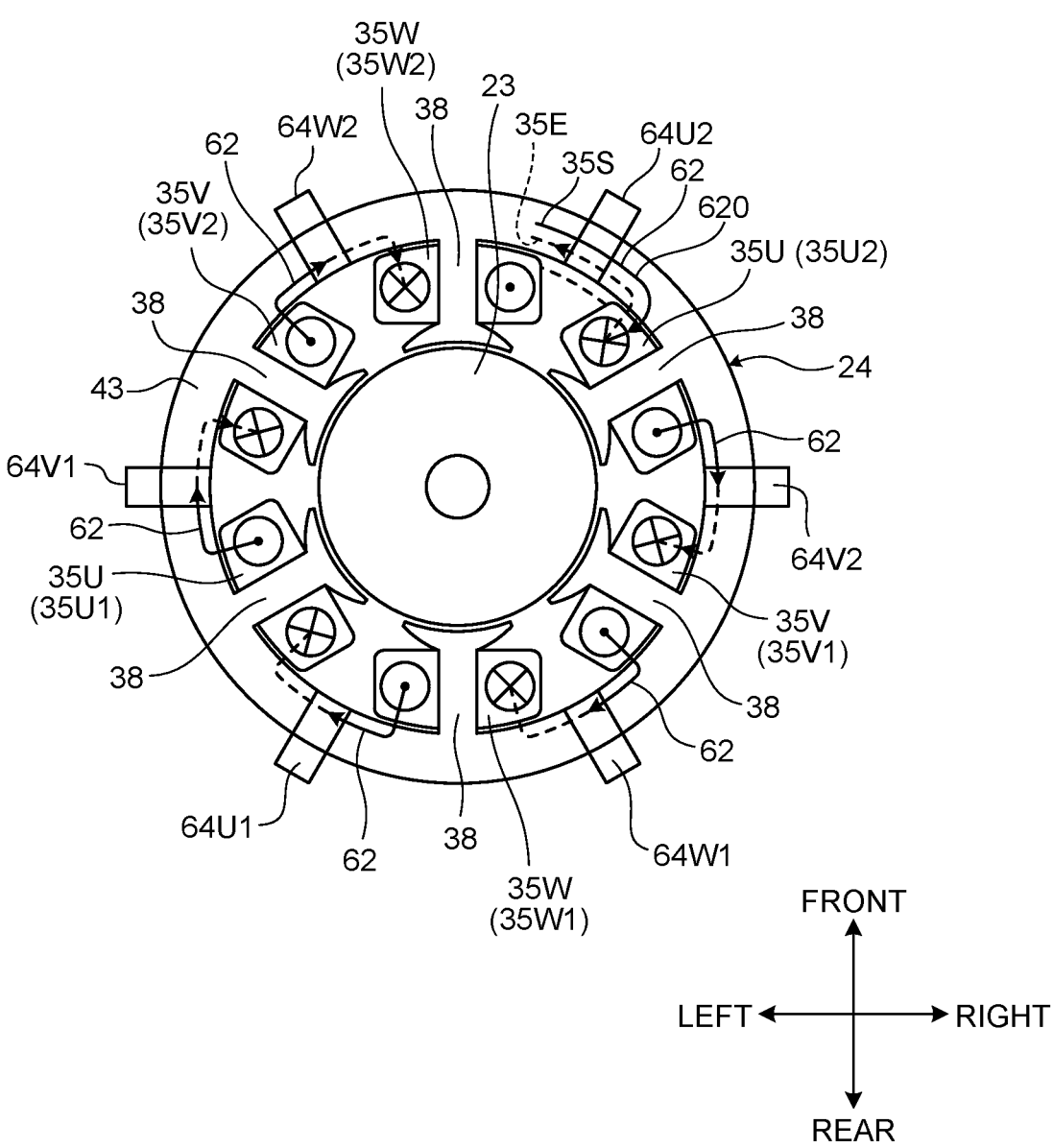
FIG. 19 schematically shows the stator according to the first embodiment.
Figure 20:
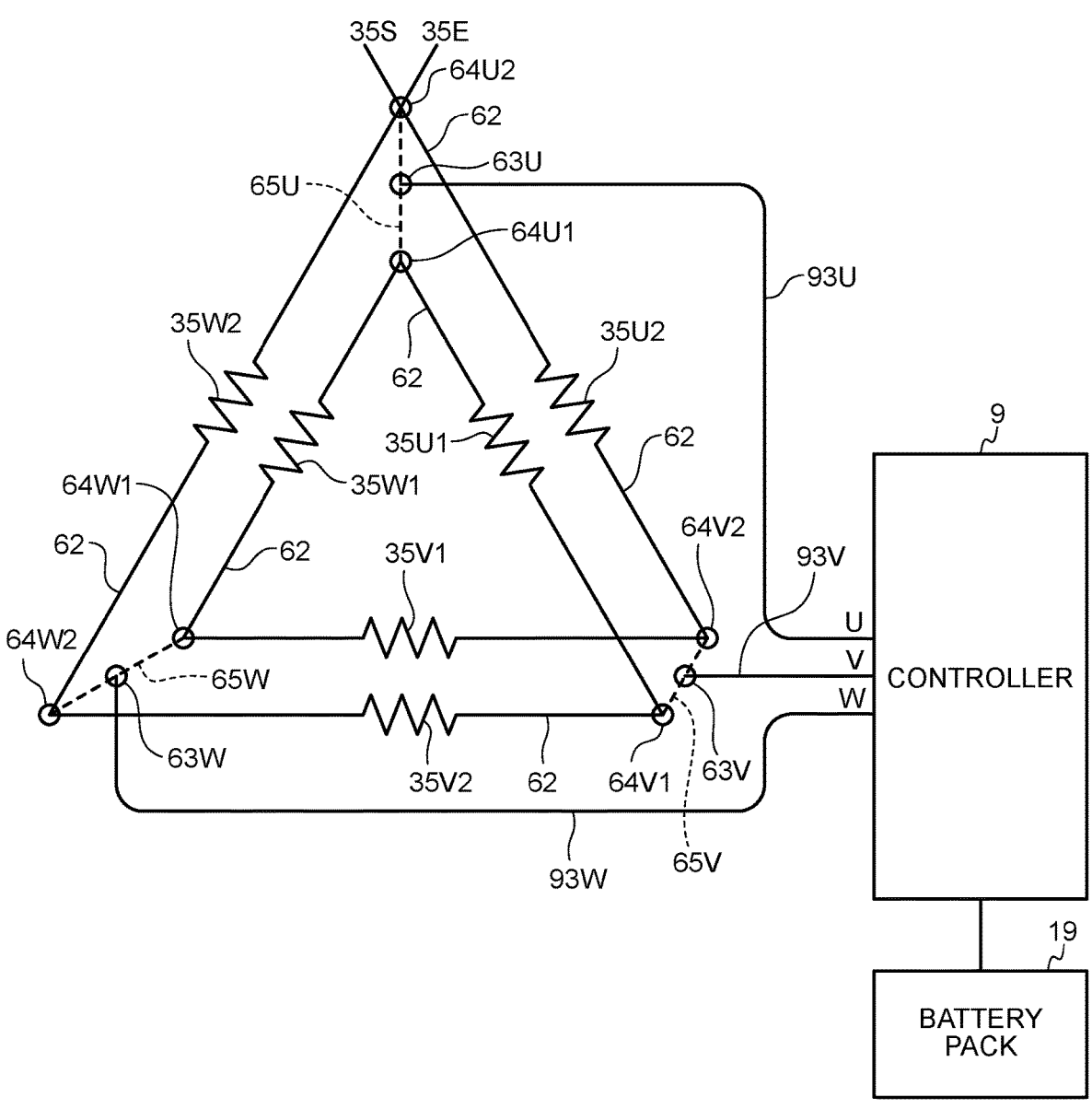
FIG. 20 schematically shows the wiring state of coils according to the first embodiment.
Figure 21:
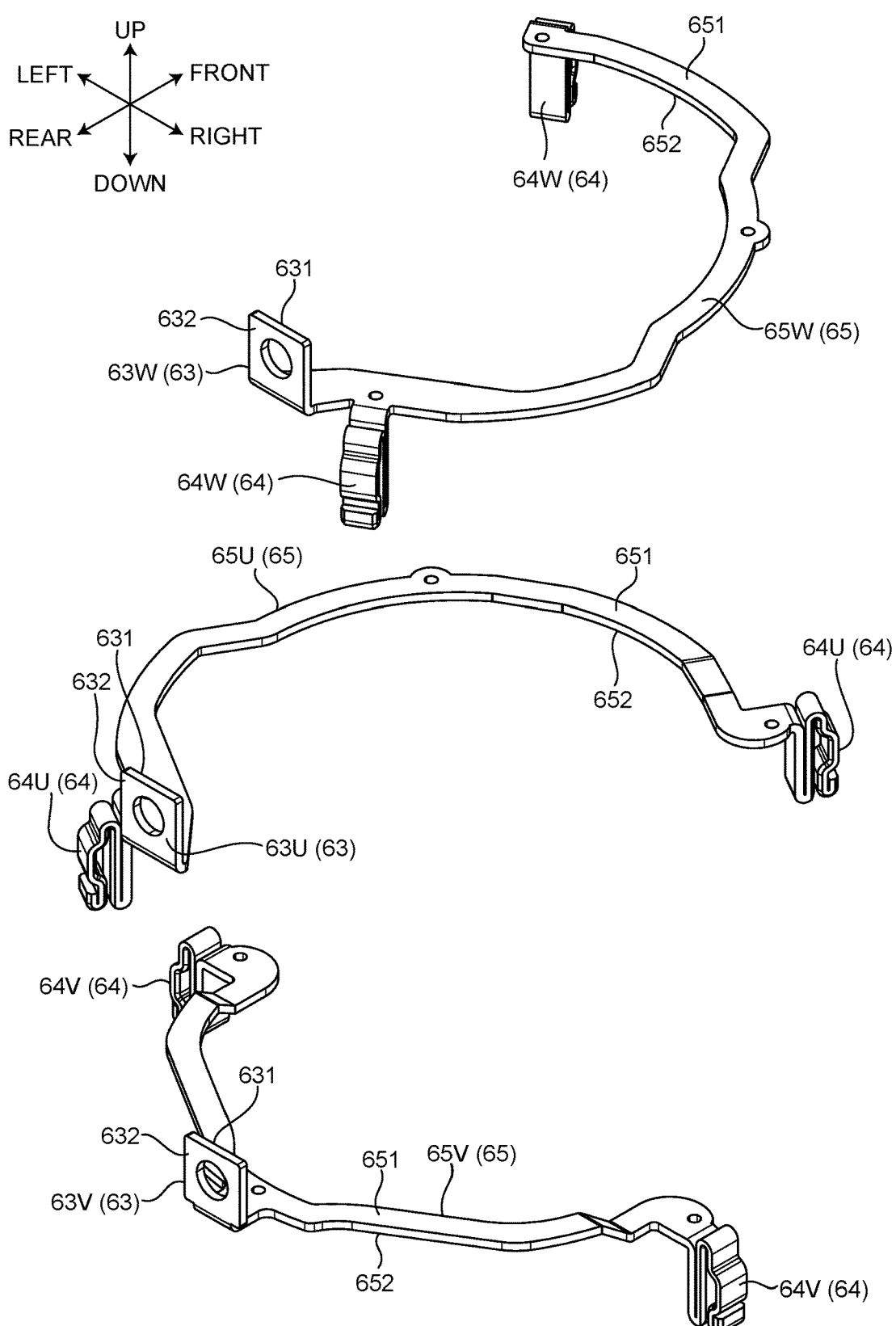
FIG. 21 is an exploded, oblique view, viewed from the upper-right rear, that shows short-circuiting members according to the first embodiment.
Figure 22:
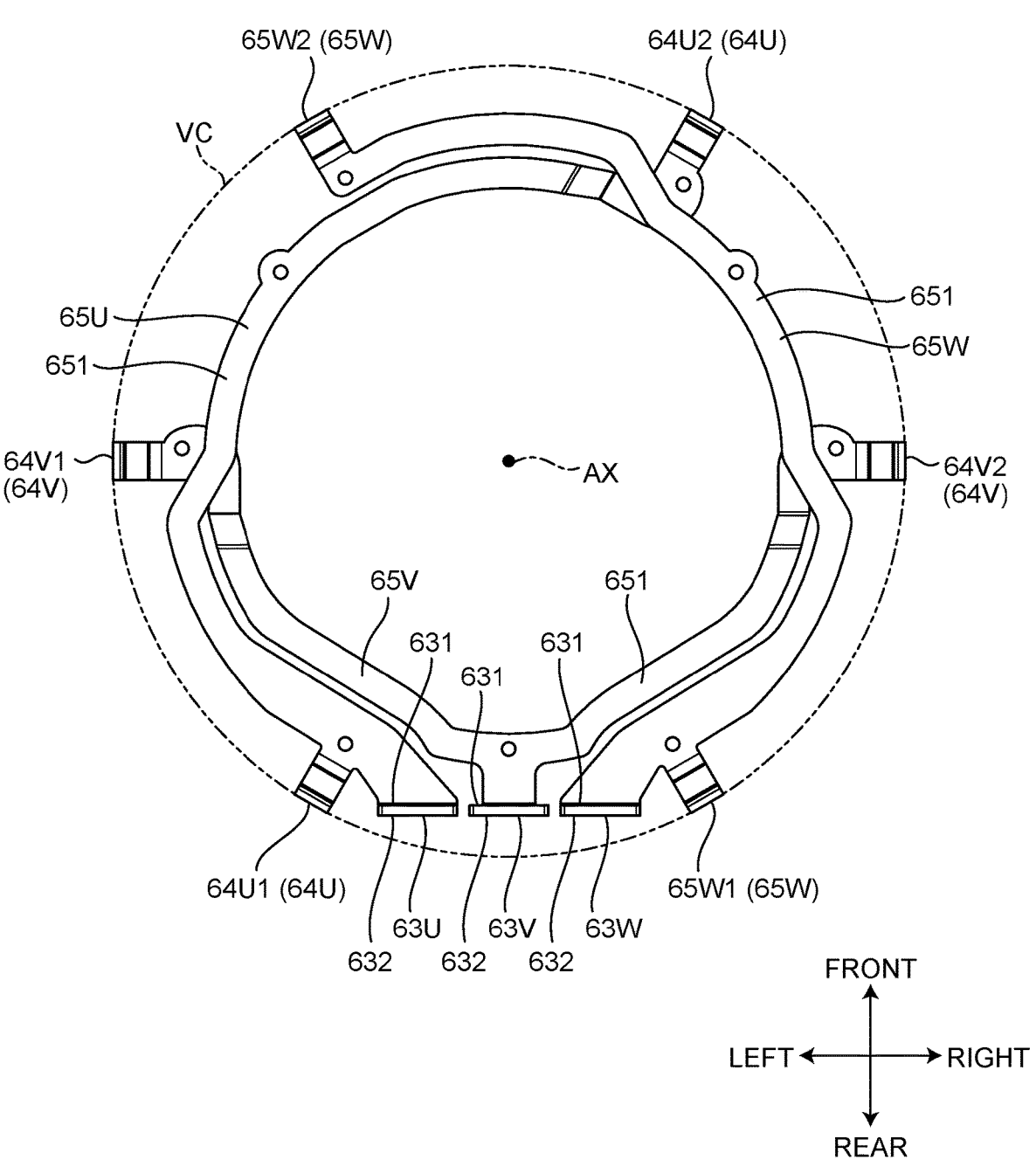
FIG. 22 is a drawing, viewed from above, of the short-circuiting members according to the first embodiment.

FIG. 19 schematically shows the stator 24 according to the present embodiment. FIG. 20 schematically shows the wiring state of the coils 35 according to the present embodiment. FIG. 21 is an exploded, oblique view, viewed from the upper-right rear, that shows the short-circuiting members 65 according to the present embodiment. FIG. 22 is a drawing, viewed from above, of the short-circuiting members 65 according to the present embodiment.

The plurality of coils 35 is formed by the winding of the one (single, continuous) wire 620. As shown in FIG. 19 and FIG. 20, the winding of the wire 620 on the tooth parts 38 is started from a winding-start portion 35S. By successively winding the wire 620 on each tooth part 38 adjoining in the circumferential direction, the six coils 35 are formed. The winding of the wire 620 ends at a winding-end portion 35E.

The drive current from the battery pack 19 is supplied to the external terminals 63 of the short-circuiting unit 36 via the controller 9 and the power-supply lines. The drive current supplied from the battery pack 19 to the external terminals 63 via the controller 9 and the power-supply lines flows through the short-circuiting members 65 and the coil terminals 64 and then is supplied to the coils 35 via the connection wires 62.

In the present embodiment, the drive current supplied from the battery pack 19 to the motor 21 includes a U-phase drive current, a V-phase drive current, and a W-phase drive current.

The power-supply lines include: a power-supply line 93U, to which the U-phase drive current is supplied; a power-supply line 93V, to which the V-phase drive current is supplied; and a power-supply line 93W, to which the W-phase drive current is supplied.

The external terminals 63 include: an external terminal 63U, to which the U-phase drive current is supplied; an external terminal 63V, to which the V-phase drive current is supplied; and an external terminal 63W, to which the W-phase drive current is supplied. The external terminal 63U is retained on the retaining part 72U. The external terminal 63V is retained on the retaining part 72V. The external terminal 63W is retained on the retaining part 72W.

The short-circuiting members 65 include: a short-circuiting member 65U, which is connected to the power-supply line 93U via the external terminal 63U; a short-circuiting member 65V, which is connected to the power-supply line 93V via the external terminal 63V; and a short-circuiting member 65W, which is connected to the power-supply line 93W via the external terminal 63W.

The coil terminals 64 include: a pair of coil terminals 64U (64U1, 64U2), which is connected to the short-circuiting member 65U; a pair of coil terminals 64V (64V1, 64V2), which is connected to the short-circuiting member 65V; and a pair of coil terminals 64W (64W1, 64W2), which is connected to the short-circuiting member 65W.

Figure 23:
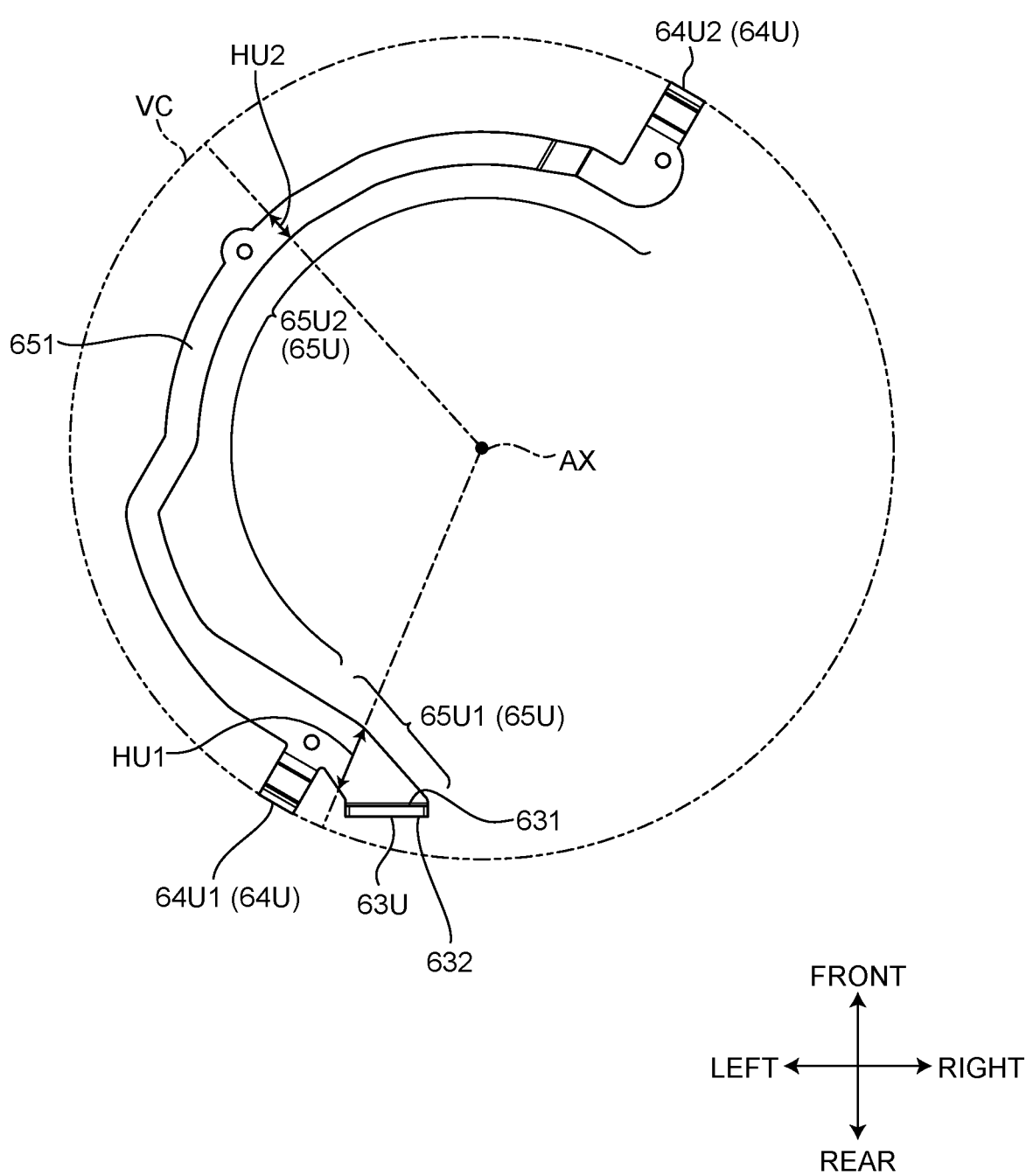
FIG. 23 is a drawing, viewed from above, of the U-phase short-circuiting member according to the first embodiment.
Figure 24:
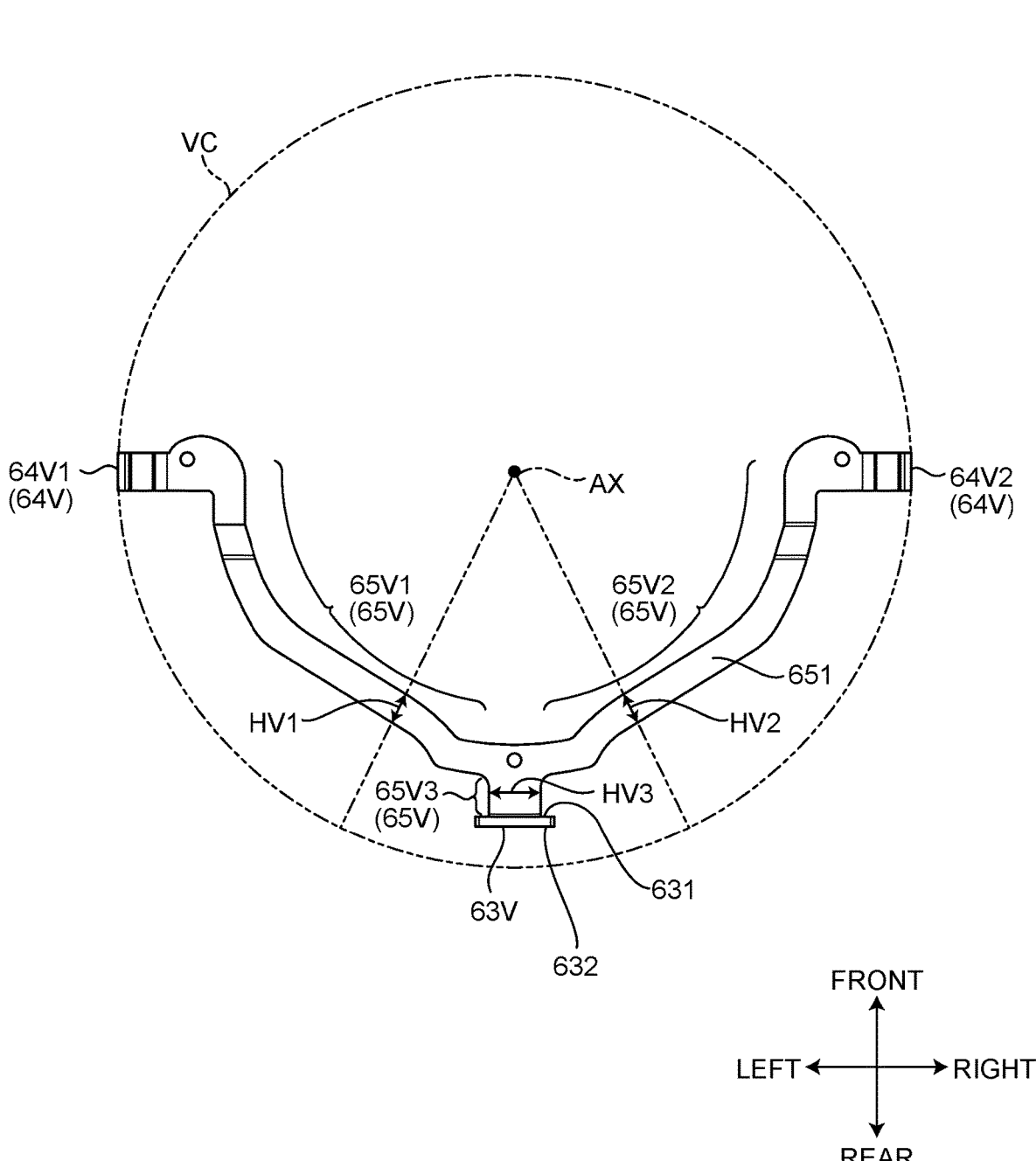
FIG. 24 is a drawing, viewed from above, of the V-phase short-circuiting member according to the first embodiment.
Figure 25:
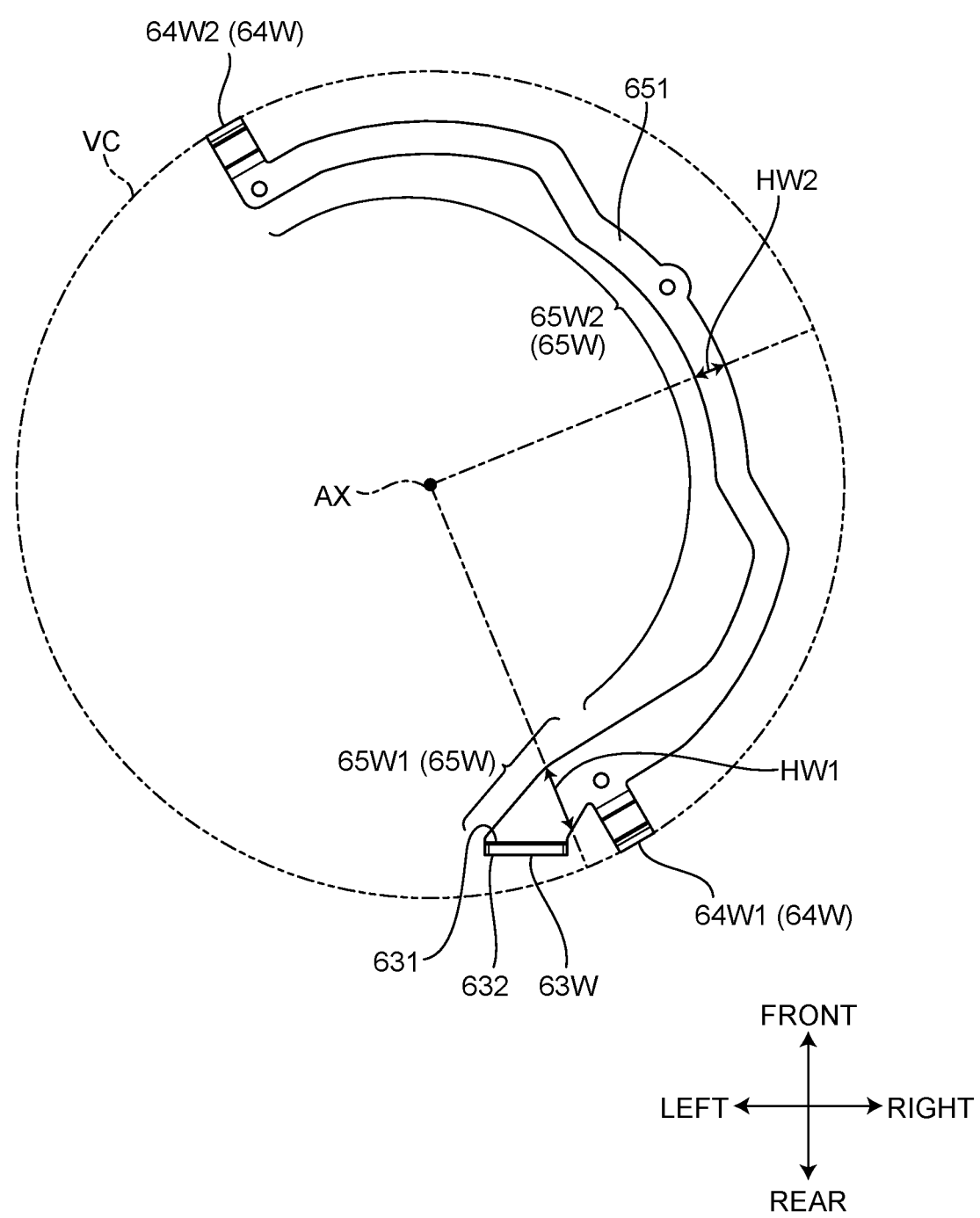
FIG. 25 is a drawing, viewed from above, of the W-phase short-circuiting member according to the first embodiment.

FIG. 23 is a drawing, viewed from above, of the U-phase short-circuiting member 65U according to the present embodiment. FIG. 24 is a drawing, viewed from above, of the V-phase short-circuiting member 65V according to the present embodiment. FIG. 25 is a drawing, viewed from above, of the W-phase short-circuiting member 65W according to the present embodiment. In FIGS. 22-25, virtual circle VC indicates the outer-circumferential surface of the stator core 33 within a plane orthogonal to rotational axis AX. The center of virtual circle VC is rotational axis AX.

The short-circuiting member 65U electrically connects the external terminal 63U, the coil terminal 64U1, and the coil terminal 64U2 to each other. The short-circuiting member 65V electrically connects the external terminal 63V, the coil terminal 64V1, and the coil terminal 64V2 to each other. The short-circuiting member 65W electrically connects the external terminal 63W, the coil terminal 64W1, and the coil terminal 64W2 to each other.

The external terminal 63U, the coil terminal 64U1, the coil terminal 64U2, and the short-circuiting member 65U are integral (a single member). The external terminal 63V, the coil terminal 64V1, the coil terminal 64V2, and the short-circuiting member 65V are integral (a single member). The external terminal 63W, the coil terminal 64W1, the coil terminal 64W2, and the short-circuiting member 65W are integral (a single member).

The external terminal 63U is connected to one-end portion of the short-circuiting member 65U. The external terminal 63U protrudes upward from the one-end portion of the short-circuiting member 65U. The coil terminal 64U2 is connected to the other-end portion of the short-circuiting member 65U. The coil terminal 64U2 protrudes downward from the other-end portion of the short-circuiting member 65U. The coil terminal 64U1 is connected to an intermediate portion between the one-end portion and the other-end portion of the short-circuiting member 65U. The coil terminal 64U1 protrudes downward from the intermediate portion between the one-end portion and the other-end portion of the short-circuiting member 65U.

The external terminal 63V is connected to an intermediate portion between one-end portion and the other-end portion of the short-circuiting member 65V. The external terminal 63V protrudes upward from the intermediate portion of the short-circuiting member 65V. The coil terminal 64V1 is connected to the one-end portion of the short-circuiting member 65V. The coil terminal 64V1 protrudes downward from the one-end portion of the short-circuiting member 65V. The coil terminal 64V2 is connected to the other-end portion of the short-circuiting member 65V. The coil terminal 64V2 protrudes downward from the other-end portion of the short-circuiting member 65V.

The external terminal 63W is connected to one-end portion of the short-circuiting member 65W. The external terminal 63W protrudes upward from the one-end portion of the short-circuiting member 65W. The coil terminal 64W2 is connected to the other-end portion of the short-circuiting member 65W. The coil terminal 64W2 protrudes downward from the other-end portion of the short-circuiting member 65W. The coil terminal 64W1 is connected to an intermediate portion between the one-end portion and the other-end portion of the short-circuiting member 65W. The coil terminal 64W1 protrudes downward from the intermediate portion between the one-end portion and the other-end portion of the short-circuiting member 65W.

The external terminal 63U, the coil terminal 64U1, the coil terminal 64U2, and the short-circuiting member 65U each are disposed more radially inward than the outer-circumferential surface of the stator core 33. In the radial direction, the distance between rotational axis AX and the external terminal 63U is shorter than the distance between rotational axis AX and the coil terminal 64U1 and shorter than the distance between rotational axis AX and the coil terminal 64U2. That is, the external terminal 63U is disposed more radially inward than the coil terminal 64U1 and the coil terminal 64U2.

The external terminal 63V, the coil terminal 64V1, the coil terminal 64V2, and the short-circuiting member 65V each are disposed more radially inward than the outer-circumferential surface of the stator core 33. In the radial direction, the distance between rotational axis AX and the external terminal 63V is shorter than the distance between rotational axis AX and the coil terminal 64V1 and shorter than the distance between rotational axis AX and the coil terminal 64V2. That is, the external terminal 63V is disposed more radially inward than the coil terminal 64V1 and the coil terminal 64V2.

The external terminal 63W, the coil terminal 64W1, the coil terminal 64W2, and the short-circuiting member 65W each are disposed more radially inward than the outer-circumferential surface of the stator core 33. In the radial direction, the distance between rotational axis AX and the external terminal 63W is shorter than the distance between rotational axis AX and the coil terminal 64W1 and shorter than the distance between rotational axis AX and the coil terminal 64W2. That is, the external terminal 63W is disposed more radially inward than the coil terminal 64W1 and the coil terminal 64W2.

When the position of the front-end portion in the circumferential direction is given as the 0° position, the position of the right-end portion in the circumferential direction is given as the 90° position, the position of the rear-end portion in the circumferential direction is given as the 180° position, and the position of the left-end portion in the circumferential direction is given as the 270° position, the external terminal 63U is disposed at the 180° position. The coil terminal 64U1 is disposed at the 210° position. The coil terminal 64U2 is disposed at the 30° position.

The external terminal 63V is disposed at the 180° position. The coil terminal 64V1 is disposed at the 270° position. The coil terminal 64V2 is disposed at the 90° position.

The external terminal 63W is disposed at the 180° position. The coil terminal 64W1 is disposed at the 150° position. The coil terminal 64W2 is disposed at the 330° position.

As shown in FIG. 23, the short-circuiting member 65U includes: a base portion 65U1, which is between the external terminal 63U and the coil terminal 64U1; and a tip portion 65U2, which is between the coil terminal 64U1 and the coil terminal 64U2. The length of the base portion 65U1 is shorter than the length of the tip portion 65U2.

As shown in FIG. 24, the short-circuiting member 65V includes: a left portion 65V1 (first portion), which is connected to the coil terminal 64V1; a right portion 65V2 (second portion), which is connected to the coil terminal 64V2; and a base portion 65V3 (third portion), which connects the external terminal 63V, the left portion 65V1, and the right portion 65V2 to each other. The length of the left portion 65V1 and the length of the right portion 65V2 are substantially equal to each other. The length of the base portion 65V3 is shorter than the length of the left portion 65V1 and is shorter than the length of the right portion 65V2.

As shown in FIG. 25, the short-circuiting member 65W includes: a base portion 65W1, which is between the external terminal 63W and the coil terminal 64W1; and a tip portion 65W2, which is between the coil terminal 64W1 and the coil terminal 64W2. The length of the base portion 65W1 is shorter than the length of the tip portion 65W2.

The width of the base portion 65U1 is larger than the width of the tip portion 65U2. As described above, in the present embodiment, the thickness of the short-circuiting member 65U is constant. The width of the short-circuiting member 65U may be considered to be the dimension of the short-circuiting member 65U in the radial direction. As shown in FIG. 23, dimension HU1 of the base portion 65U1 in the radial direction is larger than dimension HU2 of the tip portion 65U2 in the radial direction. Dimension HU1 includes the minimum value of the dimension of the base portion 65U1 in the radial direction, and dimension HU2 includes the maximum value of the dimension of the tip portion 65U2 in the radial direction.

The width of the base portion 65W1 is larger than the width of the tip portion 65W2. The width of the short-circuiting member 65W may be considered to be the dimension of the short-circuiting member 65W in the radial direction. As shown in FIG. 25, dimension HW1 of the base portion 65W1 in the radial direction is larger than dimension HW2 of the tip portion 65W2 in the radial direction. Dimension HW1 includes the minimum value of the dimension of the base portion 65W1 in the radial direction, and dimension HW2 includes the maximum value of the dimension of the tip portion 65W2 in the radial direction.

The width of the base portion 65V3 is larger than the width of the left portion 65V1 and larger than the width of the right portion 65V2. As shown in FIG. 24, dimension HV1 of the left portion 65V1 in the radial direction and dimension HV2 of the right portion 65V2 in the radial direction are substantially equal to each other. Dimension HV3 of the width of the base portion 65V3 is larger than dimension HV1 and larger than dimension HV2.

The widths of the short-circuiting members 65U, 65V, 65W may be regarded as (may be understood as being proportional to) the cross-sectional areas of the short-circuiting members 65U, 65V, 65W orthogonal to the direction in which electric current flows in the short-circuiting members 65U, 65V, 65W, because the thicknesses of the short-circuiting members 65U, 65V, 65W are preferably the same.

The cross-sectional area of the base portion 65U1 is larger than the cross-sectional area of the tip portion 65U2. The cross-sectional area of the base portion 65U1 includes the minimum value of the cross-sectional area orthogonal to the direction in which electric current flows in the base portion 65U1. The cross-sectional area of the tip portion 65U2 includes the maximum value of the cross-sectional area orthogonal to the direction in which electric current flows in the tip portion 65U2.

The cross-sectional area of the base portion 65W1 is larger than the cross-sectional area of the tip portion 65W2. The cross-sectional area of the base portion 65W1 includes the minimum value of the cross-sectional area orthogonal to the direction in which electric current flows in the base portion 65W1. The cross-sectional area of the tip portion 65W2 includes the maximum value of the cross-sectional area orthogonal to the direction in which electric current flows in the tip portion 65W2.

The cross-sectional area of the base portion 65V3 is larger than the cross-sectional area of the left portion 65V1 and larger than the cross-sectional area of the right portion 65V2. The cross-sectional area of the left portion 65V1 and the cross-sectional area of the right portion 65V2 are substantially equal to each other. The cross-sectional area of the base portion 65V3 includes the minimum value of the cross-sectional area orthogonal to the direction in which electric current flows in the base portion 65V3. The cross-sectional area of the left portion 65V1 includes the maximum value of the cross-sectional area orthogonal to the direction in which electric current flows in the left portion 65V1. The cross-sectional area of the right portion 65V2 includes the maximum value of the cross-sectional area orthogonal to the direction in which electric current flows in the right portion 65V2.

The six coils 35 are each respectively assigned to one phase from among the U (U-V) phase, the V (V-W) phase, and the W (W-U) phase.

More specifically, one pair of the coils 35 is assigned to each of the U phase, the V phase, and the W phase. Thus, the six coils 35 include: a pair of U-phase coils 35U (35U1, 35U2), which are assigned to the U phase; a pair of V-phase coils 35V (35V1, 35V2), which are assigned to the V phase; and a pair of W-phase coils 35W (35W1, 35W2), which are assigned to the W phase. That is, from among the six coils 35, two of the coils 35 are assigned to the U-phase coils 35U (35U1, 35U2), two of the coils 35 are assigned to the V-phase coils 35V (35V1, 35V2), and two of the coils 35 are assigned to the W-phase coils 35W (35W1, 35W2).

The two U-phase coils 35U (35U1, 35U2) are disposed opposing each other in the radial direction. The two V-phase coils 35V (35V1, 35V2) are disposed opposing each other in the radial direction. The two W-phase coils 35W (35W1, 35W2) are disposed opposing each other in the radial direction.

As shown in FIG. 19, in the circumferential direction, the V-phase coil 35V2 is disposed next to the U-phase coil 35U1, the W-phase coil 35W2 is disposed next to the V-phase coil 35V2, the U-phase coil 35U2 is disposed next to the W-phase coil 35W2, the V-phase coil 35V1 is disposed next to the U-phase coil 35U2, and the W-phase coil 35W2 is disposed next to the V-phase coil 35V1. The U-phase coil 35U1 and the U-phase coil 35U2 are disposed opposing each other in the radial direction. The V-phase coil 35V1 and the V-phase coil 35V2 are disposed opposing each other in the radial direction. The W-phase coil 35W1 and the W-phase coil 35W2 are disposed opposing each other in the radial direction.

The coil terminal 64U1 is connected to the connection wire 62 that connects the W-phase coil 35W1 and the U-phase coil 35U1, which are adjacent to each other in the circumferential direction. The coil terminal 64U2 is connected to the connection wire 62 that connects the W-phase coil 35W2 and the U-phase coil 35U2, which are adjacent to each other in the circumferential direction. The coil terminal 64V1 is connected to the connection wire 62 that connects the U-phase coil 35U1 and the V-phase coil 35V2, which are adjacent to each other in the circumferential direction. The coil terminal 64V2 is connected to the connection wire 62 that connects the U-phase coil 35U2 and the V-phase coil 35V1, which are adjacent to each other in the circumferential direction. The coil terminal 64W1 is connected to the connection wire 62 that connects the V-phase coil 35V1 and the W-phase coil 35W1, which are adjacent to each other in the circumferential direction. The coil terminal 64W2 is connected to the connection wire 62 that connects the V-phase coil 35V2 and the W-phase coil 35W2, which are adjacent to each other in the circumferential direction.

As shown in FIG. 20, one (a first) coil group comprising the one U-phase coil 35U1, the one V-phase coil 35V1, and the one W-phase coil 35W1 are delta-connected. One (another or a second) coil group comprising the one U-phase coil 35U2, the one V-phase coil 35V2, and the one W-phase coil 35W2 are delta-connected. The one (first) coil group and the other (second) coil group are connected in parallel.

When the U-phase drive current is input to the power-supply line 93U, the U-phase drive current is supplied to the pair of coil terminals 64U (64U1, 64U2) via the short-circuiting member 65U. A portion of the U-phase drive current supplied to the external terminal 63U is supplied to the coil terminal 64U1 via the base portion 65U1. A portion of the U-phase drive current supplied to the external terminal 63U is supplied to the coil terminal 64U2 via the base portion 65U1 and the tip portion 65U2. When the U-phase coil 35U1, from among the pair of U-phase coils 35U, is excited to the N pole, the U-phase coil 35U2 is excited to the S pole. The V-phase coil 35V1 next to the U-phase coil 35U1, which has been excited to the N pole, is excited to the S pole, and the V-phase coil 35V2 next to the U-phase coil 35U2, which has been excited to the S pole, is excited to the N pole.

When the V-phase drive current is input to the power-supply line 93V, the V-phase drive current is supplied to the pair of coil terminals 64V (64V1, 64V2) via the short-circuiting member 65V. A portion of the V-phase drive current supplied to the external terminal 63V is supplied to the coil terminal 64V1 via the base portion 65V3 and the left portion 65V1. A portion of the V-phase drive current supplied to the external terminal 63V is supplied to the coil terminal 64V2 via the base portion 65V3 and the right portion 65V2. When the V-phase coil 35V1, from among the pair of V-phase coils 35V, is excited to the N pole, the V-phase coil 35V2 is excited to the S pole. The W-phase coil 35W1 next to the V-phase coil 35V1, which has been excited to the N pole, is excited to the S pole, and the next to the W-phase coil 35W2 next to the V-phase coil 35V2, which has been excited to the S pole, is excited to the N pole.

When the W-phase drive current is input to the power-supply line 93W, the W-phase drive current is supplied to the pair of coil terminals 64W (64W1, 64W2) via the short-circuiting member 65W. A portion of the W-phase drive current supplied to the external terminal 63W is supplied to the coil terminal 64W1 via the base portion 65W1. A portion of the W-phase drive current supplied to the external terminal 63W is supplied to the coil terminal 64W2 via the base portion 65W1 and the tip portion 65W2. When the W-phase coil 35W1, from among the pair of W-phase coils 35W, is excited to the N pole, the W-phase coil 35W2 is excited to the S pole. The U-phase coil 35U1 next to W-phase coil 35W1, which has been excited to the N pole, is excited to the S pole, and the U-phase coil 35U2 next to the W-phase coil 35W2, which has been excited to the S pole, is excited to the N pole.

When the electric current that flows to the U-phase coils 35U (35U1, 35U2) is given as I, an electric current of $[\sqrt{3}\times I]$ flows to the coil terminals 64U (64U1, 64U2), and an electric current of $[2\times\sqrt{3}\times I]$ flows to the external terminal 63U. In the present embodiment, the width of the base portion 65U1 is larger than the width of the tip portion 65U2. Because the width of the base portion 65U1 is large and therefore the electrical resistance of the base portion 65U1 is small, even if a large electric current, such as $[2\times\sqrt{3}\times I]$, flows to the base portion 65U1, the generation of heat by the short-circuiting member 65U is curtailed. In the present embodiment, the width (cross-sectional area) of the base portion 65U1 and the width (cross-sectional area) of the tip portion 65U2 are adjusted such that the differences between the electric-current densities in the U-phase coils 35U, the electric-current density in the tip portion 65U2, and the electric-current density in the base portion 65U1 become small (so that the electric-current densities are made uniform). It is noted that the electric-current density $[A/mm^2]$ refers to the value of the electric current that flows through a unit cross-sectional area.

Likewise, the width of the base portion 65V3 is larger than the width of the left portion 65V1 and is larger than the width of the right portion 65V2. Because the electrical resistance of the base portion 65V3 is small, even if a large electric current, such as $[2\times\sqrt{3}\times I]$, flows to the base portion 65V3 so that current I flows to the V-phase coils 35V, the generation of heat by the short-circuiting member 65V is curtailed. In the present embodiment, the width (cross-sectional area) of the base portion 65V3, the width (cross-sectional area) of the left portion 65V1, and the width (cross-sectional area) of the right portion 65V2 are adjusted such that the differences between the electric-current densities in the V-phase coils 35V, the electric-current density in the left portion 65V1, the electric-current density in the right portion 65V2, and the electric-current density in the base portion 65V3 become small (so that the electric-current densities are made uniform).

Likewise, the width of the base portion 65W1 is larger than the width of the tip portion 65W2. Because the electrical resistance of the base portion 65W1 is small, even if a large electric current, such as $[2\times\sqrt{3}\times I]$, flows to the base portion 65W1 so that current I flows to the W-phase coils 35W, the generation of heat by the short-circuiting member 65W is curtailed. In the present embodiment, the width (cross-sectional area) of the base portion 65W1 and the width (cross-sectional area) of the tip portion 65W2 are adjusted such that the differences between the electric-current densities in the W-phase coils 35W, the electric-current density in the tip portion 65W2, and the electric-current density in the base portion 65W1 become small (so that the electric-current densities are made uniform).

It is noted that, in an embodiment in which the heat-resisting temperature of the short-circuiting member 65U is higher than the heat-resisting temperature of the U-phase coils 35U, the electric-current density in the U-phase coils 35U and the electric-current density in the base portion 65U1 do not have to be made uniform. The width (cross-sectional area) of the base portion 65U1 may be adjusted such that the electric-current density in the base portion 65U1 becomes, for example, 1.5 times or less the electric-current density in the U-phase coils 35U. The same applies likewise to the short-circuiting member 65V and the short-circuiting member 65W.

Method for Assembling the Motor Assembly

In the work of assembling the motor assembly 20, after the insulator 34 has been fixed to the stator core 33, the coils 35 are wound on the insulator 34. After the coils 35 have been wound on the insulator 34, the short-circuiting unit 36 is connected to the insulator 34.

When the insulating member 66 of the short-circuiting unit 36 and the insulator 34 are to be connected, the screw-boss parts 57 of the insulator 34 are disposed in the positioning, recessed portions 71 of the short-circuiting unit 36. The screw-boss parts 57 function as positioning, protruding parts disposed in the positioning, recessed portions 71. Thereby, the insulating member 66 of the short-circuiting unit 36 and the insulator 34 are positioned relative to each other.

The insulating member 66 of the short-circuiting unit 36 is fixed to the insulator 34. The motor assembly 20 has the screws 92, which fix the insulating member 66 of the short-circuiting unit 36 and the insulator 34 to each other. The screws 92 are coupled to the screw holes in the screw-boss parts 57 of the insulator 34 via the openings 74 in the screw-boss parts 69 of the insulating member 66. The insulating member 66 of the short-circuiting unit 36 and the insulator 34 are fixed to each other by the screws 92. At least a portion of the short-circuiting unit 36 is disposed more upward than the insulator 34.

As discussed above, the connection wires 62 and the coil terminals 64 are connected to each other. With regard to the coil terminals 64, each of the connection wires 62 is disposed on the inner side of the bent portion of the corresponding coil terminal 64. The connection wires 62 are fixed to the coil terminals 64 by fusing.

Effects

As explained above, in the present embodiment, the electric work machine 1 comprises: the motor 21 comprising the rotor 23, which rotates about rotational axis AX, and the stator 24, which is disposed around the rotor 23; and the tip cutting tool 25, which is the output portion that rotates when a rotational force is generated by the motor 21. The stator 24 comprises: the stator core 33; the insulator 34, which is fixed to the stator core 33; the plurality of coils 35, which is fixed to the insulator 34; external terminals 63, to which power-supply lines are respectively connected; coil terminals 64, which are respectively connected to the coils 35; short-circuiting members 65, which are integral with the external terminals 63 and the coil terminals 64 and electrically connect the external terminals 63 and the coil terminals 64 to each other; and the insulating member 66, which supports the external terminals 63 and the short-circuiting members 65. The insulating member 66 is disposed more radially inward than the outer-circumferential surface of the stator core 33.

According to the above-mentioned configuration, because the insulating member 66 is disposed more radially inward than the outer-circumferential surface of the stator core 33, the motor 21 can be made more compact. In particular, the motor 21 can be made more compact in the radial direction.

In the present embodiment, the insulating member 66 comprises the base part 67, which supports the short-circuiting members 65 and has a ring shape, and the support part 72, which protrudes in the axial direction from the base part 67 and supports the external terminals 63.

According to the above-mentioned configuration, because the support part 72, which supports the external terminals 63, protrudes in the axial direction from the base part 67, the motor 21 can be made more compact in the radial direction.

In the present embodiment, the support part 72 comprises three retaining parts 72U, 72V, 72W, which respectively retain the external terminals 63 and nuts 73. The power-supply lines 710 and the external terminals 63 are fixed to each other by the bolts 700, which are respectively coupled to the nuts 73.

According to the above-mentioned configuration, the power-supply lines 710, the external terminals 63, and the support part 72 of the insulating member 66 are fixed to each other by the bolts 700.

In the present embodiment, each of the external terminals 63 has the front surface 631, which is the first surface that faces radially inward, and the rear surface 632, which is the second surface that faces radially outward. Each of the nuts 73 has the opposing surface 731, which opposes the front surface 631. The nuts 73 are retained on the retaining parts 72U, 72V, 72W such that the opposing surfaces 731 and rotational axis AX are parallel to each other.

According to the above-mentioned configuration, the motor 21 can be made more compact in the radial direction.

In the present embodiment, the external terminals 63 are retained on the retaining parts 72U, 72V, 72W such that the front surfaces 631 and the rear surfaces 632 are each parallel to rotational axis AX.

According to the above-mentioned configuration, the motor 21 can be made more compact in the radial direction.

In the present embodiment, there is one support part 72. Three of the retaining parts 72U, 72V, 72W are provided on the one support part 72.

According to the above-mentioned configuration, three external terminals 63 are aggregated in the one support part 72.

In the present embodiment, the external terminals 63 are disposed more radially inward than the outer-circumferential surface of the stator core 33.

According to the above-mentioned configuration, the motor 21 can be made more compact in the radial direction.

In the present embodiment, the short-circuiting members 65 are disposed partially around rotational axis AX. The external terminals 63 protrude in the axial direction from the short-circuiting members 65.

According to the above-mentioned configuration, the motor 21 can be made more compact in the radial direction.

In the present embodiment, each of the external terminals 63 has the front surface 631, which faces radially inward, and the rear surface 632, which faces radially outward. The front surface 631 and the rear surface 632 each are parallel to rotational axis AX.

According to the above-mentioned configuration, the motor 21 can be made more compact in the radial direction.

In the present embodiment, the coil terminals 64 are disposed more radially inward than the outer-circumferential surface of the stator core 33.

According to the above-mentioned configuration, the motor 21 can be made more compact in the radial direction.

In the present embodiment, the short-circuiting members 65 are disposed partially around rotational axis AX. The coil terminals 64 protrude in the axial direction from the short-circuiting members 65.

According to the above-mentioned configuration, the motor 21 can be made more compact in the radial direction.

In the present embodiment, the external terminals 63 and the coil terminals 64 each are disposed more radially inward than the outer-circumferential surface of the stator core 33. In the radial direction, the distance between rotational axis AX and the external terminals 63 is shorter than the distance between rotational axis AX and the coil terminals 64.

According to the above-mentioned configuration, the motor 21 can be made more compact in the radial direction.

In the present embodiment, the short-circuiting members 65 are disposed partially around rotational axis AX. The external terminals 63 protrude toward one side in the axial direction from the short-circuiting members 65. The coil terminals 64 protrude toward the other side in the axial direction from the short-circuiting members 65.

According to the above-mentioned configuration, the motor 21 can be made more compact in the radial direction. In addition, the power-supply lines and the external terminals 63 can be electrically connected to each other without difficulty, and the coils 35 and the coil terminals 64 can be electrically connected to each other without difficulty.

In the present embodiment, the short-circuiting members 65 are disposed more radially inward than the outer-circumferential surface of the stator core 33.

According to the above-mentioned configuration, the motor 21 can be made more compact in the radial direction.

In the present embodiment, the short-circuiting members 65 are disposed in the interior of the base part 67.

According to the above-mentioned configuration, contact between the short-circuiting members 65 and the electrically conductive members around the short-circuiting members 65 is curtailed.

In the present embodiment, the insulating member 66 is fixed to the insulator 34.

According to the above-mentioned configuration, the location of the insulating member 66 is fixed.

In the present embodiment, the electric work machine 1 comprises: the motor 21 comprising the rotor 23, which rotates about rotational axis AX, and the stator 24, which is disposed around the rotor 23; and the tip cutting tool 25, which is the output portion that rotates when a rotational force is generated by the motor. The stator 24 comprises: the stator core 33; the insulator 34, which is fixed to the stator core 33; the plurality of coils 35, which is fixed to the insulator 34; external terminals 63, to which power-supply lines are respectively connected; coil terminals 64, which are respectively connected to the coils 35; short-circuiting members 65, which are integral with the external terminals 63 and the coil terminals 64 and electrically connect the external terminals 63 and the coil terminals 64 to each other; and the insulating member 66, which supports the external terminals 63 and the short-circuiting members 65. The external terminals 63, the coil terminals 64, and the short-circuiting members 65 each are disposed more radially inward than the outer-circumferential surface of the stator core 33. In the radial direction, the (first) distance between rotational axis AX and the external terminals 63 is shorter than the (second) distance between rotational axis AX and the coil terminals 64.

According to the above-mentioned configuration, because the external terminals 63, the coil terminals 64, and the short-circuiting members 65 are each disposed more radially inward than the outer-circumferential surface of the stator core 33, the motor 21 can be made more compact. In particular, the motor 21 can be made more compact in the radial direction. In addition, because the distance between rotational axis AX and the external terminals 63 is shorter than the distance between rotational axis AX and the coil terminals 64, the motor 21 can be made more compact in the radial direction.

In the present embodiment, the short-circuiting members 65 are disposed partially around rotational axis AX. The external terminals 63 protrude toward one side in the axial direction from the short-circuiting members 65. The coil terminals 64 protrude toward the other side in the axial direction from the short-circuiting members 65.

According to the above-mentioned configuration, the motor 21 can be made more compact in the radial direction. In addition, the power-supply lines and the external terminals 63 are connected to each other without difficulty, and the coils 35 and the coil terminals 64 are connected to each other without difficulty.

In the present embodiment, the insulating member 66 is disposed more radially inward than the outer-circumferential surface of the stator core 33.

According to the above-mentioned configuration, the motor 21 can be made more compact in the radial direction.

Second Embodiment

A second embodiment will now be explained. In the explanation below, structural elements identical or equivalent to those in the embodiment described above are assigned the same symbols, and explanations of those structural elements are abbreviated or omitted.

Figure 26:
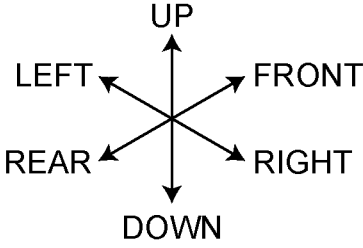
FIG. 26 is an oblique view, viewed from the upper-right rear, that shows the stator according to a second representative, non-limiting embodiment of the present teachings.
Figure 27:
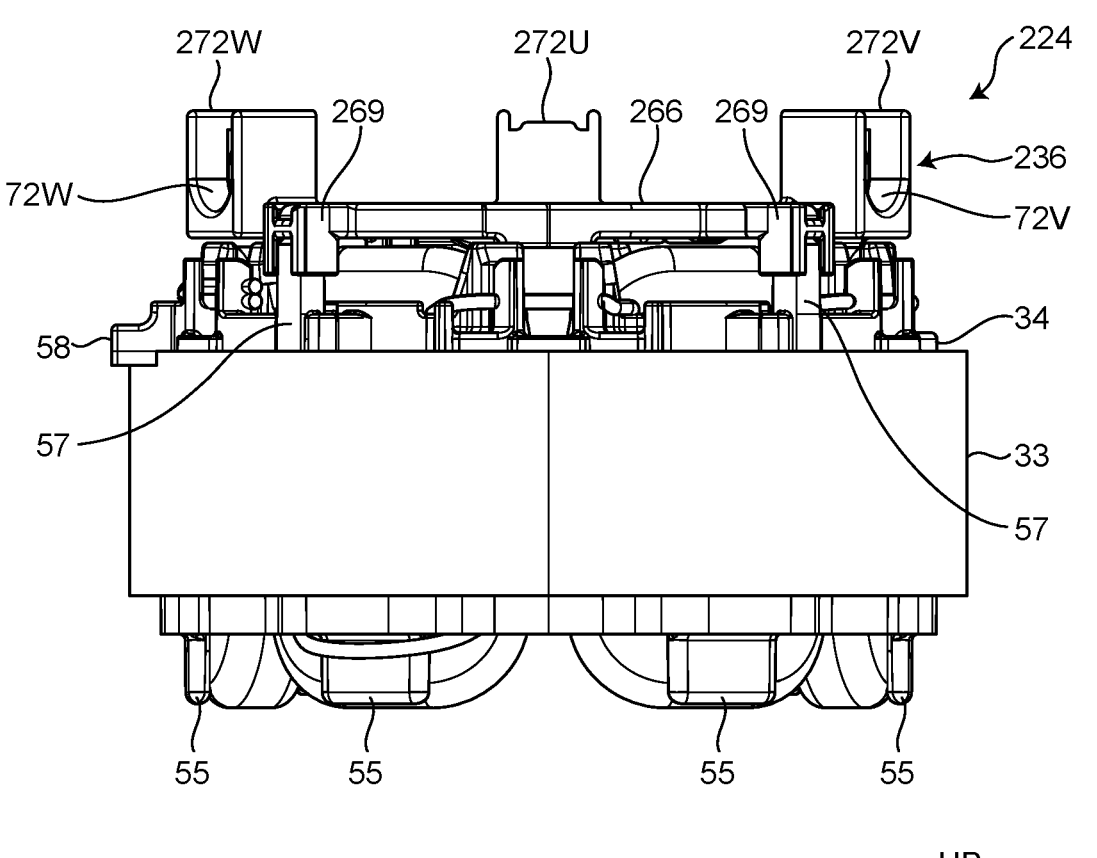
FIG. 27 is a drawing, viewed from the right, of the stator according to the second embodiment.
Figure 27:
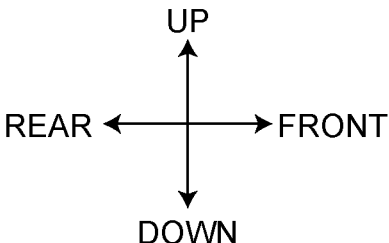
Figure 28:
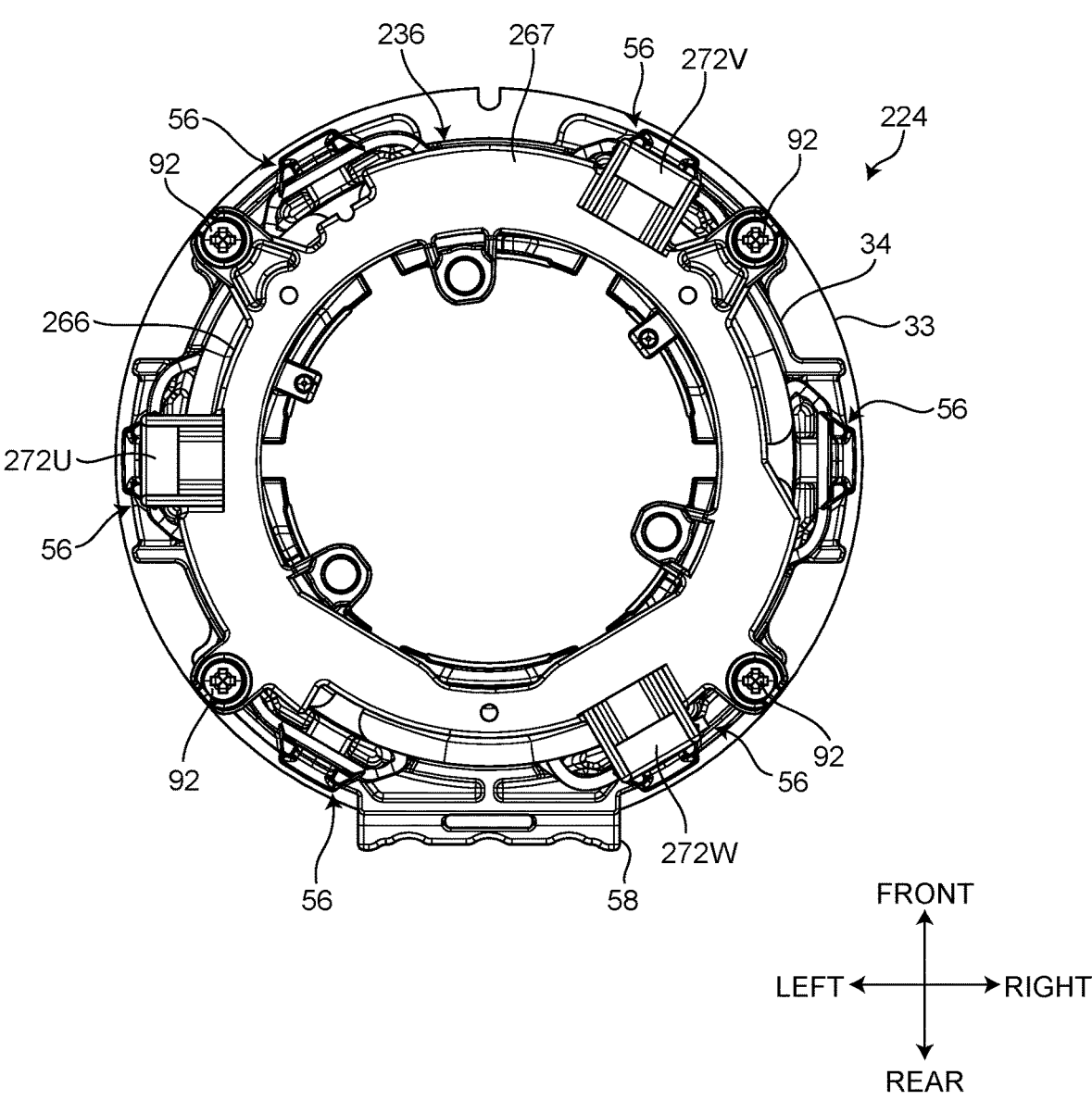
FIG. 28 is a drawing, viewed from above, of the stator according to the second embodiment.

FIG. 26 is an oblique view, viewed from the upper-right rear, that shows a stator 224 according to the present embodiment. FIG. 27 is a drawing, viewed from the right, of the stator 224 according to the present embodiment. FIG. 28 is a drawing, viewed from above, of the stator 224 according to the present embodiment.

The stator 224 comprises a short-circuiting (bus bar) unit 236. An insulating member 266 of the short-circuiting unit 236 comprises a base part 267, screw-boss parts 269, and three support parts 272U, 272V, 272W. The support part 272U, the support part 272V, and the support part 272W are disposed spaced apart in the circumferential direction. One of the retaining parts (72U, 72V, 72W) is provided on each one of the support parts (272U, 272V, 272W). The support part 272U comprises the retaining part 72U, which retains the external terminal 63U. The support part 272V comprises the retaining part 72V, which retains the external terminal 63V. The support part 272W comprises the retaining part 72W, which retains the external terminal 63W. The nuts 73 are disposed on the support parts 272U, 272V, 272W, respectively. The opposing surfaces 731 of the nuts 73 face radially outward.

The support part 272U is disposed at the 270° position. The support part 272U is disposed upward of the fifth wire-support part 56 from among the six wire-support parts 56. In the circumferential direction, the location of the support part 272U and the location of at least a portion of the fifth wire-support part 56 coincide with each other.

The support part 272V is disposed at the 30° position. The support part 272V is disposed upward of the first wire-support part 56 from among the six wire-support parts 56. In the circumferential direction, the location of the support part 272V and the location of at least a portion of the first wire-support part 56 coincide with each other.

The support part 272W is disposed at the 150° position. The support part 272W is disposed upward of the third wire-support part 56 from among the six wire-support parts 56. In the circumferential direction, the location of the support part 272W and the location of at least a portion of the third wire-support part 56 coincide with each other.

As explained above, in the present embodiment, there are three of the support parts 272U, 272V, 272W. One of the retaining parts (72U, 72V, 72W) is provided on each one of the support parts (272U, 272V, 272W). The three support parts 272U, 272V, 272W are disposed spaced apart in the circumferential direction. As can be seen in FIGS. 26 and 28, at least one screw-boss part 269 and at least one screw 92, which fixes the insulating member 236 of the short-circuiting unit 236 and the insulator 34 to each other, are disposed between each pair of circumferentially-adjacent support parts 272U, 272V, 272W.

According to the above-mentioned configuration, the three external terminals 63U, 63V, 63W are distributed in the circumferential direction of rotational axis AX.

Third Embodiment

A third embodiment will now be explained. In the explanation below, structural elements that are identical or equivalent to those in the embodiments described above are assigned the same symbols, and explanations of those structural elements are abbreviated or omitted.

Figure 29:
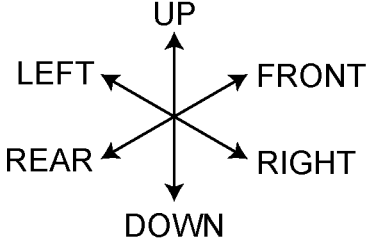
FIG. 29 is an oblique view, viewed from the upper-right rear, that shows the stator according to a third representative, non-limiting embodiment of the present teachings.

FIG. 29 is an oblique view, viewed from the upper-right rear, that shows a stator 324 according to the present embodiment. The stator 324 comprises a short-circuiting (bus bar) unit 336. The short-circuiting unit 336 comprises a board 366, screw-boss parts 369, and a support part 372. The support part 372 is disposed at the 180° position. The support part 372 comprises: the retaining part 72U, which retains the external terminal 63U; the retaining part 72V, which retains the external terminal 63V; and the retaining part 72W, which retains the external terminal 63W.

The board 366 is a glass-cloth-base-material, epoxy-resin board (FR-4 board). It is noted that the board 366 may be a composite-base-material, epoxy-resin board (CEM-3 board).

Figure 30:
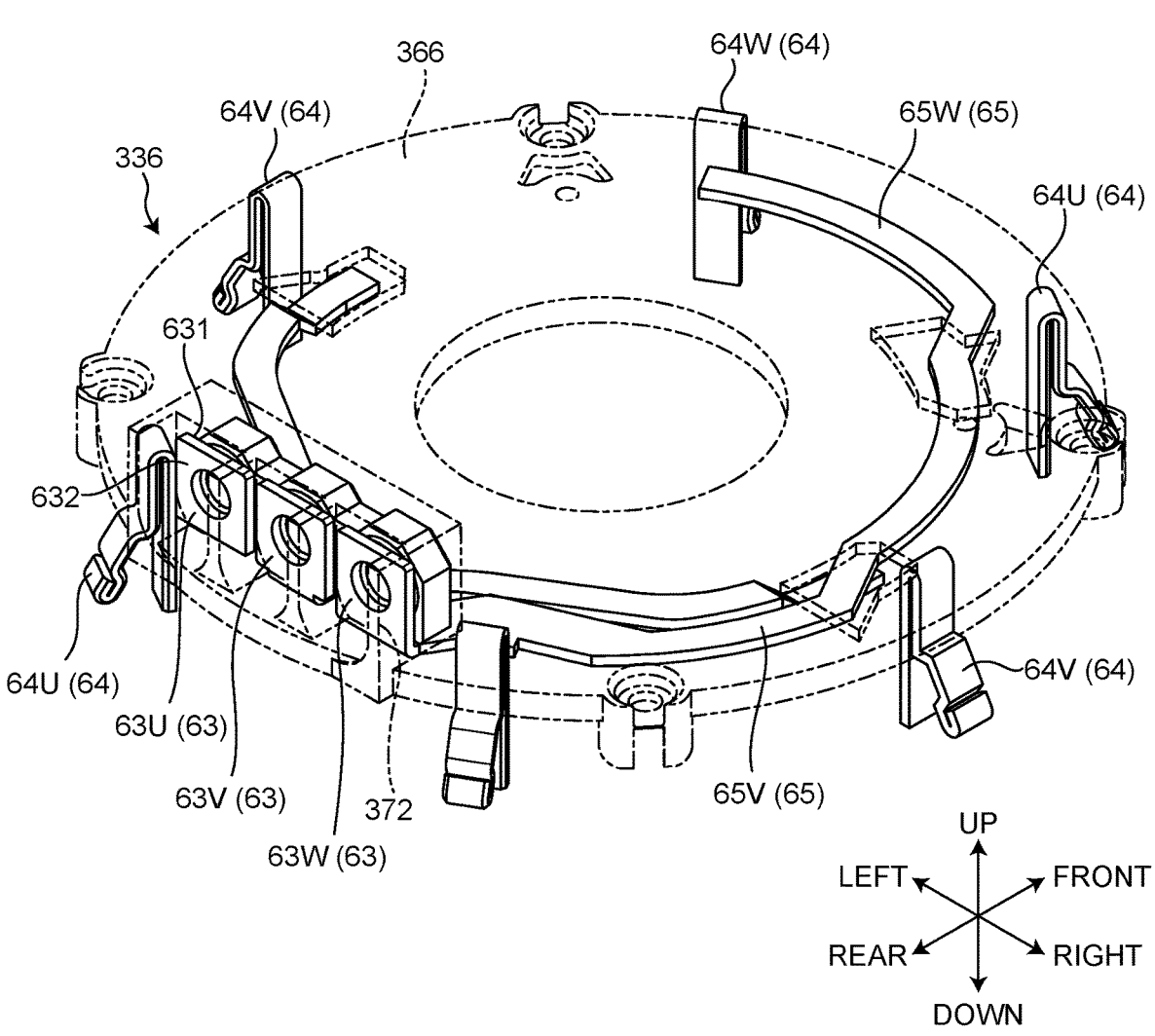
FIG. 30 is an oblique view, viewed from the upper-right rear, that shows the short-circuiting unit according to the third embodiment.

FIG. 30 is an oblique view, viewed from the upper-right rear, that shows the short-circuiting unit 336 according to the present embodiment. In FIG. 30, the board 366 is illustrated with virtual lines. As shown in FIG. 30, the board 366 supports the short-circuiting members 65. The short-circuiting members 65 may be mounted on a surface (lower surface) of the board 366 or may be embedded in the interior of the board 366.

Fourth Embodiment

A fourth embodiment will now be explained. In the explanation below, structural elements that are identical or equivalent to those in the embodiments described above are assigned the same symbols, and explanations of those structural elements are abbreviated or omitted.

Figure 31:
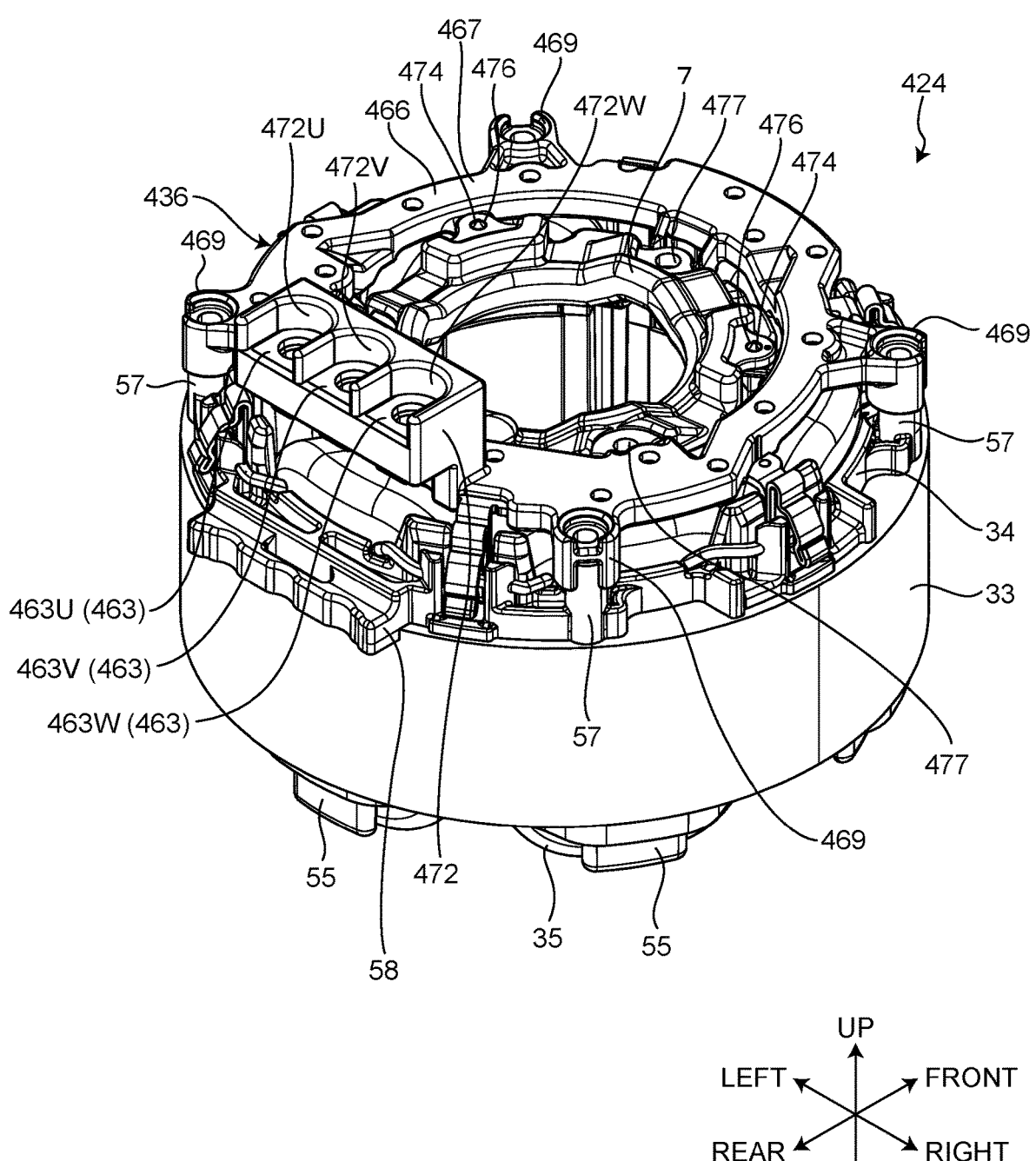
FIG. 31 is an oblique view, viewed from the upper-right rear, that shows the stator according to a fourth representative, non-limiting embodiment of the present teachings.
Figure 32:
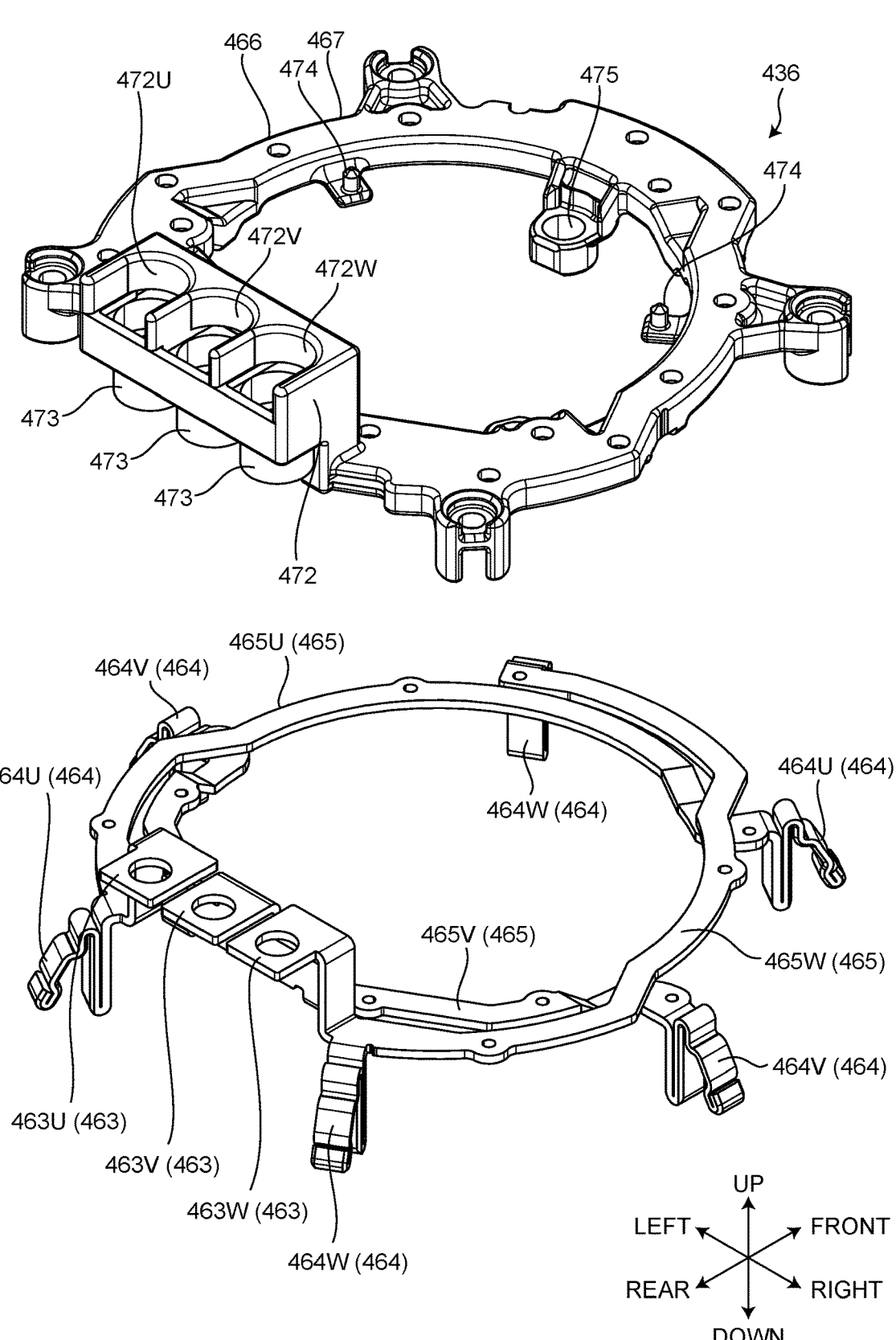
FIG. 32 is an exploded, oblique view, viewed from the upper-right rear, that shows the short-circuiting unit according to the fourth embodiment.
Figure 33:
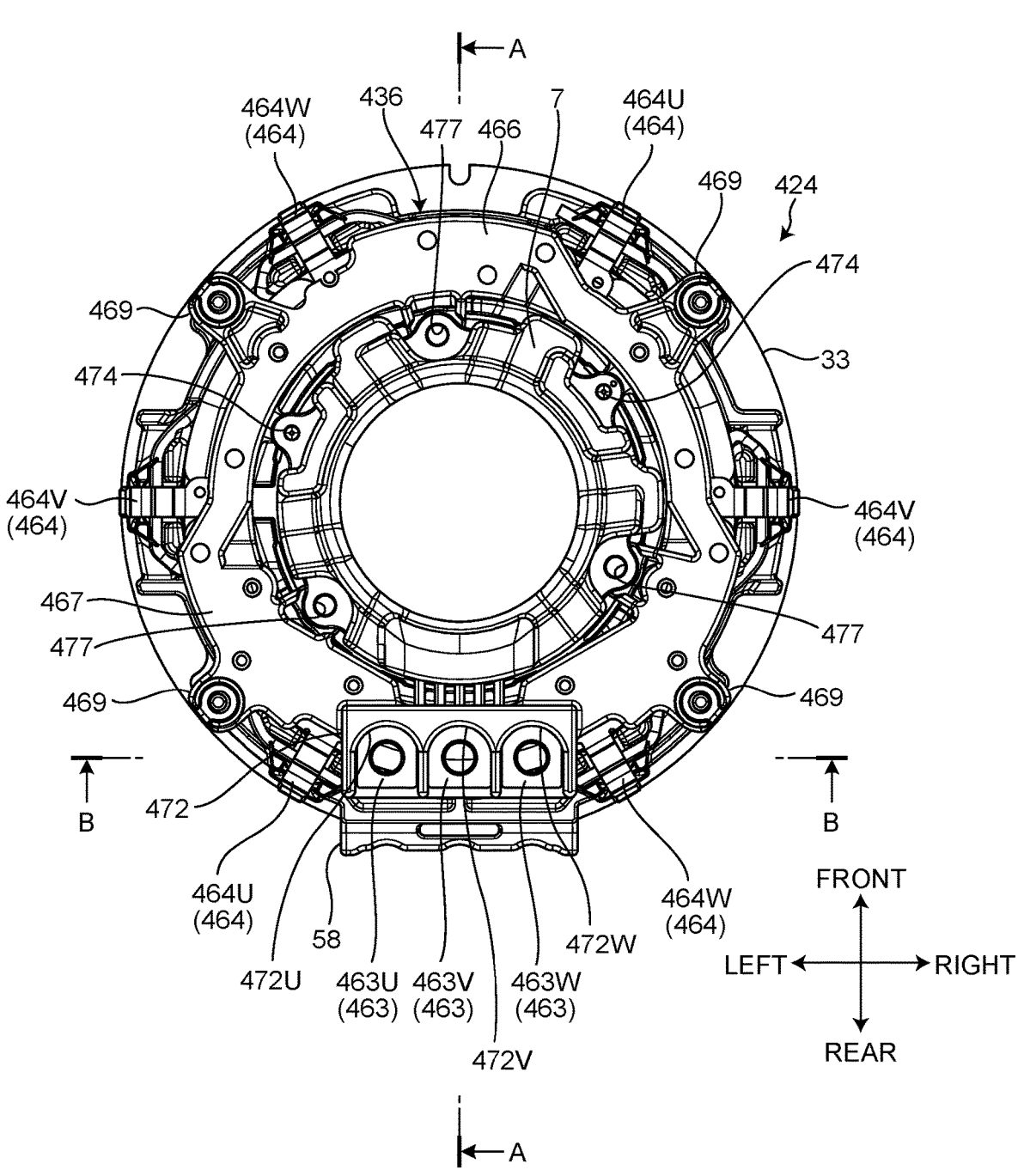
FIG. 33 is a drawing, viewed from above, of the stator according to the fourth embodiment.
Figure 34:
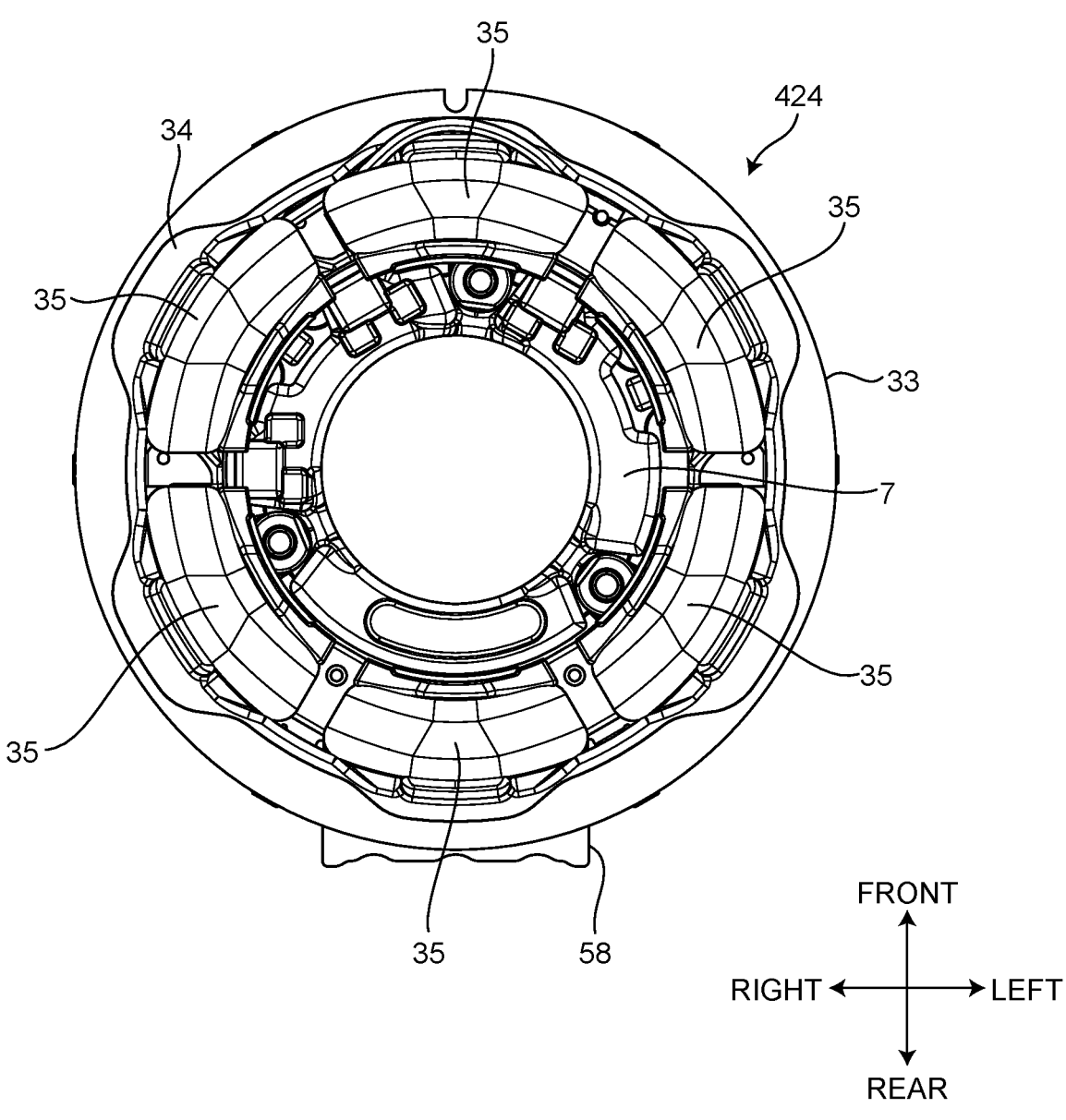
FIG. 34 is a drawing, viewed from below, of the stator according to the fourth embodiment.
Figure 35:
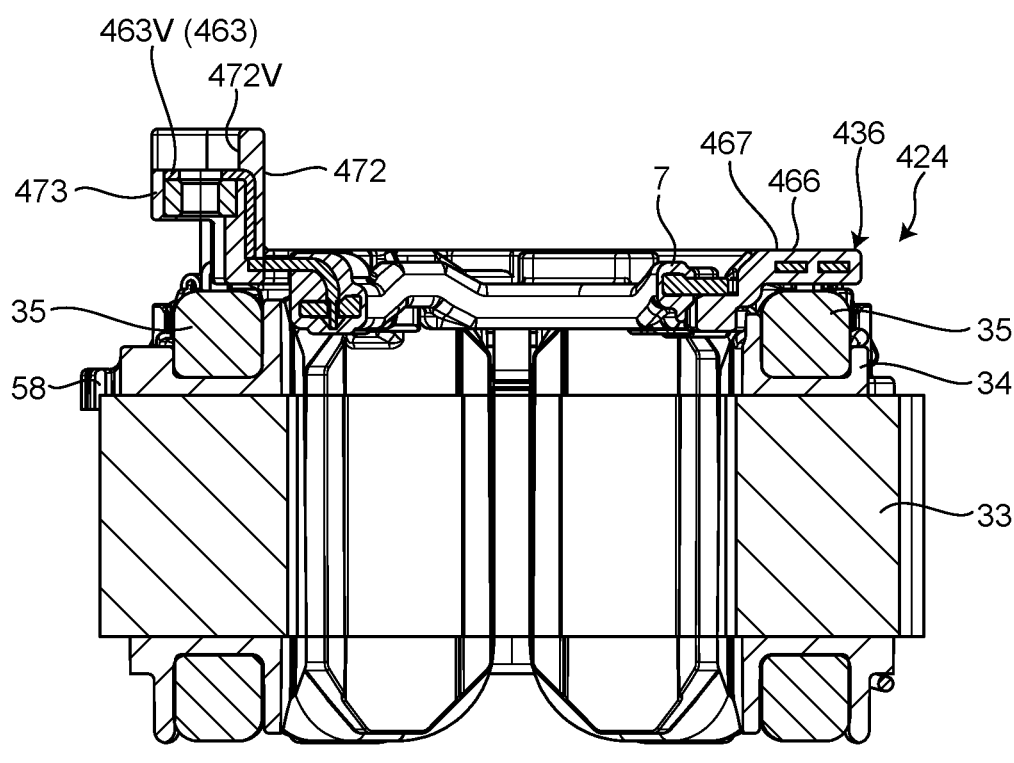
FIG. 35 is a cross-sectional view that shows the stator according to the fourth embodiment.
Figure 35:
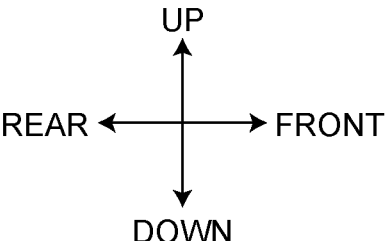
Figure 36:
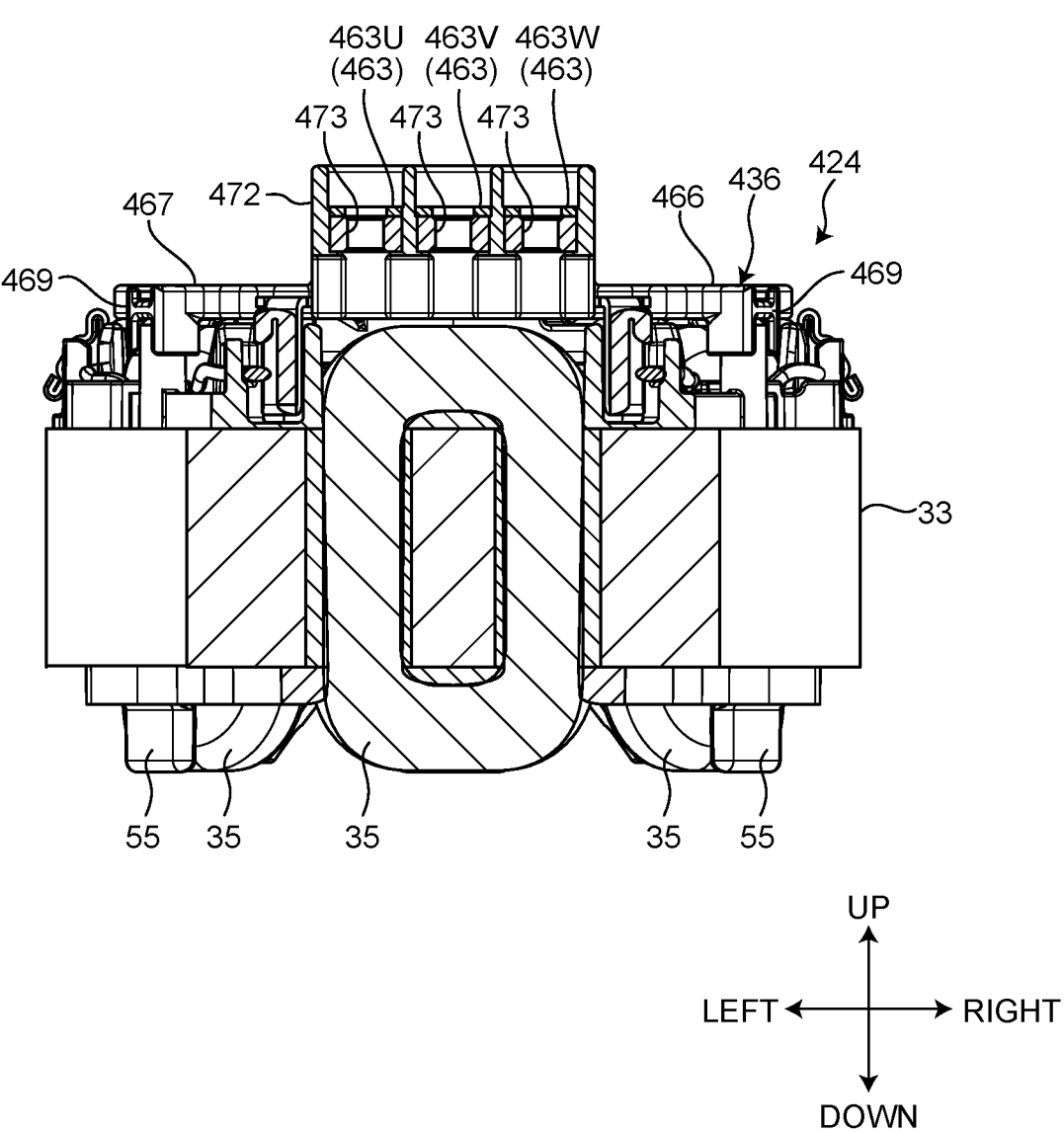
FIG. 36 is a cross-sectional view that shows the stator according to the fourth embodiment.

FIG. 31 is an oblique view, viewed from the upper-right rear, that shows a stator 424 according to the present embodiment. FIG. 32 is an exploded, oblique view, viewed from the upper-right rear, that shows a short-circuiting unit 436 according to the present embodiment. FIG. 33 is a drawing, viewed from above, of the stator 424 according to the present embodiment. FIG. 34 is a drawing, viewed from below, of the stator 424 according to the present embodiment. FIG. 35 is a cross-sectional view that shows the stator 424 according to the present embodiment and corresponds to a cross-sectional auxiliary view taken along line A-A in FIG. 33. FIG. 36 is a cross-sectional view that shows the stator 424 according to the present embodiment and corresponds to a cross-sectional auxiliary view taken along line B-B in FIG. 33.

The stator 424 comprises the short-circuiting (bus bar) unit 436. The short-circuiting unit 436 comprises external terminals 463, coil terminals 464, short-circuiting members 465, and an insulating member 466.

The external terminals 463 include: an external terminal 463U, which is assigned to the U phase; an external terminal 463V, which is assigned to the V phase; and an external terminal 463W, which is assigned to the W phase. The coil terminals 464 include: coil terminals 464U, which are assigned to the U phase; coil terminals 464V, which are assigned to the V phase; and coil terminals 464W, which are assigned to the W phase. The short-circuiting members 465 include: a short-circuiting member 465U, which is assigned to the U phase; a short-circuiting member 465V, which is assigned to the V phase; and a short-circuiting member 465W, which is assigned to the W phase.

The insulating member 466 comprises a base part 467, screw-boss parts 469, and a support part 472. The support part 472 protrudes in the axial direction from the base part 467. The support part 472 comprises: a retaining part 472U, which retains the external terminal 463U and a nut 473; a retaining part 472V, which retains the external terminal 463V and a (another) nut 473; and a retaining part 472W, which retains the external terminal 463W and a (yet another) nut 473. The nuts 473 are fixed to the support part 472. Similar to the configuration shown in FIG. 14, the power-supply lines and the external terminals 463 are fixed by bolts, which are coupled to the nuts 473.

As shown in FIG. 33 and FIG. 34, the insulating member 466 is disposed more radially inward than the outer-circumferential surface of the stator core 33. That is, the insulating member 466 is provided such that it does not protrude more radially outward than the stator core 33.

Similar to the insulating member 466, it is noted that the external terminals 463, the coil terminals 464, and the short-circuiting members 465 are each (all) disposed more radially inward than the outer-circumferential surface of the stator core 33. In the radial direction, the (first) distance between rotational axis AX and the external terminals 463 is shorter than the (second) distance between rotational axis AX and the coil terminals 464. That is, the external terminals 463 are disposed more radially inward than the coil terminals 464.

As shown in FIG. 33 and FIG. 34, in the present embodiment, all members that constitute the short-circuiting unit 436 are disposed more radially inward than the outer-circumferential surface of the stator core 33. All members that constitute the short-circuiting unit 436 are provided such that they do not protrude more radially outward than the stator core 33.

The external terminals 463 protrude in the axial direction from the short-circuiting members 465. The coil terminals 464 protrude in the axial direction from the short-circuiting members 465. The external terminals 463 protrude upward from the short-circuiting members 465. The coil terminals 464 protrude downward from the short-circuiting members 465.

Each of the external terminals 463 has a plate shape. Each of the external terminals 463 has an upper surface and a lower surface. The upper surface faces upward (one side in the axial direction). The lower surface faces downward (other side in the axial direction). The upper surface and the lower surface are parallel to each other. The upper surface and the lower surface each is a flat surface. The upper surface and the lower surface are both orthogonal to an axis parallel to rotational axis AX. The external terminals 463 are retained on the retaining parts 472U, 472V, 472W of the support part 472 such that the upper and lower surfaces and the axis parallel to rotational axis AX are orthogonal to each other.

Each of the nuts 473 has an opposing surface, which opposes the lower surface of the corresponding external terminal 463. The opposing surface faces upward and is a flat surface. The opposing surface is orthogonal to an axis parallel to rotational axis AX. The nuts 473 are retained on the retaining parts 472U, 472V, 472W of the support part 472 such that the opposing surfaces and the axis parallel to rotational axis AX are orthogonal to each other.

As shown in FIG. 35 and FIG. 36, the support part 472 is disposed directly above one of the coils 35 from among the six coils 35. The external terminals 463 and the nuts 473 are disposed directly above the one coil 35. In the radial direction, the location of the coil 35 and the location of at least a portion of the support part 472 are the same. In the radial direction, the location of the coil 35 and the location of at least a portion of the external terminals 463 are the same. In the radial direction, the location of the coil 35 and the location of at least a portion of the nuts 473 are the same. Thereby, the dimension of the stator 424 in the radial direction can be made more compact.

The most radially inward portion of the support part 472 is disposed more radially inward than the one coil 35. The most radially inward portion of the external terminals 463 is disposed more radially inward than the most radially outward portion of the one coil 35. The most radially inward portion of the nuts 473 is disposed more radially inward than the most radially outward portion of the one coil 35.

The coil 35 is disposed more radially inward than the outer-circumferential surface of the stator core 33. The most radially outward portion of the support part 472 is disposed between the outer-circumferential surface of the stator core 33 and the coil 35 in the radial direction. The most radially outward portion of the external terminals 463 is disposed between the outer-circumferential surface of the stator core 33 and the coil 35 in the radial direction. The most radially outward portion of the nuts 473 is disposed between the outer-circumferential surface of the stator core 33 and the coil 35 in the radial direction.

In addition, as shown in FIG. 36, one of the coils 35 and the three external terminals 463 (463U, 463V, 463W) are disposed within the same plane. The one coil 35 and the three nuts 473 are disposed within the same plane. The one coil 35 and the three retaining parts 472U, 472V, 472W are disposed within the same plane. Thereby, the dimension of the stator 424 in the radial direction can be made more compact.

When the power-supply lines and the external terminals 463 are to be fixed to each other, in the state in which the power-supply lines have been connected to at least portions of the external terminals 463, bolts for fixing the external terminals are inserted, from upward of the external terminals

463, into openings provided in the external terminals 463. The bolts that are for fixing the external terminals and that are inserted into the openings in the external terminals 463 are inserted into screw holes in the nuts 473. By coupling the bolts that are for fixing the external terminals and that are inserted in the openings in the external terminals 463 to (in) the screw holes in the nuts 473, the power-supply lines and the external terminals 463 are fixed by the bolts that are for fixing the external terminals and that are coupled to the nuts 473. The central axes of the bolts for fixing the external terminals are parallel to rotational axis AX.

A sensor board 7, which detects the rotation of the rotor 23, is connected to the short-circuiting unit 436. The sensor board 7 comprises magnetic sensors, which detect the permanent magnets 29 supported on the rotor core 27. By detecting the positions of the permanent magnets 29 supported on the rotor core 27, the sensor board 7 detects the position of the rotor 23 in the rotational direction. The magnetic sensors comprise Hall-effect devices. Three of the magnetic sensors are provided. The magnetic sensors are disposed more radially inward than the coils 35. The magnetic sensors are disposed so as to oppose the upper-end surface of the rotor core 27. Detection signals generated by the sensor board 7 are output to the controller 9. Based on the detection signals from the sensor board 7, the controller 9 controls the drive current supplied from the battery pack 19 to the motor 21.

At least a portion of the sensor board 7 is disposed more radially inward than the base part 467 of the insulating member 66. The insulating member 66 comprises: positioning pins 474, which are disposed more radially inward than the base part 467; and screw-boss parts 475, which are disposed more radially inward than the base part 467. The sensor board 7 has: positioning holes 476, into which the positioning pins 474 are inserted; and screw-boss parts 477, which are aligned with the screw-boss parts 475.

When the sensor board 7 is to be fixed to the short-circuiting unit 436, in the state in which the positioning holes 476 have been inserted onto the positioning pins 474 (i.e. the pins 474 have been inserted into the respective holes 476), bolts for fixing the sensor board are inserted, from upward of the screw-boss parts 477, into the openings provided in the screw-boss parts 477. The bolts that are for fixing the sensor board and that have been inserted into the openings in the screw-boss parts 477 are inserted into the screw holes in the wire-support parts 56. By coupling the bolts that are for fixing the sensor board and that have been inserted into the openings in the screw-boss parts 477 to (in) the screw holes in the screw-boss parts 475, the sensor board 7 and the short-circuiting unit 436 are fixed to each other by the bolts for fixing the sensor board. The central axes of the bolts for fixing the sensor board are parallel to rotational axis AX.

In the present embodiment, bolts for fixing the external terminals are inserted, from upward of the external terminals 463, into the openings provided in the external terminals 463. The bolts for fixing the sensor board are inserted, from upward of the screw-boss parts 477, into the openings provided in the screw-boss parts 477. Thereby, without changing the orientation of the stator 424, the user who assembles the motor 21 can continuously perform: the work of inserting, from upward of the external terminals 463, the external-terminal fixing bolts into the openings provided in the external terminals 463; and the work of inserting, from upward of the screw-boss parts 477, the sensor-board fixing bolts into the openings provided in the screw-boss parts 477.

Thereby, the work of assembling the motor 21 can be performed with good efficiency.

Other Embodiments

In the embodiments described above, it is given that six of the coil 35 are provided and that one coil group, which comprises three of the coils 35 that are delta-connected, and another coil group, which comprises three of the coils 35 that are delta-connected, are connected in parallel. The number of coils 35 may be multiples of 3. That is, the number of the coils 35 may be any one of, for example, 9, 12, 15, 18, 21, and 24. Among the total number of the coils 35, $\frac{1}{3}^{rd}$ of the coils 35 may be assigned to the U-phase coils 35U, $\frac{1}{3}^{rd}$ of the coils 35 may be assigned to the V-phase coils 35V, $\frac{1}{3}^{rd}$ of the coils 35 may be assigned to the W-phase coils 35W, one coil group, which is constituted from at least one U-phase coil 35U, at least one V-phase coil 35V, and at least one W-phase coil 35W, may be delta-connected by the short-circuiting members 65U, 65V, 65W, and the plurality of coil groups may be connected in parallel. For example, in an embodiment in which four coil groups are connected in parallel, because an electric current of $[4 \times \sqrt{3} \times I]$ is supplied to the external terminals 63 in order to supply current I to the coils 35, the width (cross-sectional area) of each of the short-circuiting members 65U, 65V, 65W is adjusted such that the generation of heat is curtailed even if an electric current of $[4 \times \sqrt{3} \times I]$ is supplied.

In the embodiments described above, it is given that the electric work machine 1 is a router. The electric work machine 1 is not limited to a router. A driver-drill, an angle drill, an impact driver, a grinder, a hammer, a hammer drill, a circular saw, and a reciprocating saw, which are power tools, can be given as illustrative examples of an electric work machine. In addition, the electric work machine 1 may be a horticultural tool (outdoor power equipment). A chain saw, a hedge trimmer, a lawn mower, a mowing machine, and a blower can be given as illustrative examples of a horticultural tool.

In the embodiments described above, it is given that the battery pack 19 mounted on the battery-mounting part 15 is used as the power supply of the electric work machine 1. A commercial power supply (AC power supply) may be used as the power supply of the electric work machine 1.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved electric work machines, such as power tools and outdoor power equipment having electric motors.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Electric work machine
2 Base
2A Through hole
2B Through hole
3 Main-body support part
3A Base-coupling part
3B Circular-tube part
3C Window part
3D Grip-support part
3E Window part
4 Lock lever
5 Height-adjusting dial
5A Helical protruding part
6 Grip
6A Arm part
6B Grip part
7 Sensor board
9 Controller
10 Tool main body
11 Main-body housing
12 Motor housing
12A Left-half part
12B Right-half part
12C Air-suction hole
12I Circular-tube part
12J Flared part
13 Switch panel
13A Standby switch
13B Lock-on switch
14 Speed-changing dial
15 Battery-mounting part
16 Bracket
16A Through hole
16B Air-exhaust hole
16D Helical recessed portion
17 Flange
19 Battery pack
20 Motor assembly
21 Motor
22 Fan
23 Rotor
24 Stator
25 Tip cutting tool
26A Upper bearing
26B Lower bearing
27 Rotor core
28 Rotor shaft
29 Permanent magnet
30 Magnet hole
32 Recessed portion
33 Stator core
34 Insulator
35 Coil
35E Winding-end portion 35S Winding-start portion
35U U-phase coil
35U1 U-phase coil
35U2 U-phase coil
35V V-phase coil
35V1 V-phase coil
35V2 V-phase coil
35 W W-phase coil
35W1 W-phase coil
35W2 W-phase coil
36 Short-circuiting unit
37 Outer-tube part
38 Tooth part
39 Inner-wall part
40 Projecting part
41 Inner surface
42 Outer-circumferential surface
43 Upper-end surface
44 Lower-end surface
45 Opposing surface
46 Opposing surface
47 Side surface
48 Side surface
49 Covering part
50 Covering part
51 Covering part
53 Coil-stop part
54 Coil-stop part
55 Coil-stop part
56 Wire-support part
57 Screw-boss part
58 Protruding part
59 Projecting part
60 Projecting part
62 Connection wire
63 External terminal
63U External terminal
63V External terminal
63 W External terminal
64 Coil terminal
64U Coil terminal
64U1 Coil terminal (first coil terminal)
64U2 Coil terminal (second coil terminal)
64V Coil terminal
64V1 Coil terminal
64V2 Coil terminal
64 W Coil terminal
64W1 Coil terminal (first coil terminal)
64W2 Coil terminal (second coil terminal)
65 Short-circuiting member
65U Short-circuiting member
65U1 Base portion
65U2 Tip portion
65V Short-circuiting member
65V1 Left portion (first portion)
65V2 Right portion (second portion)
65V3 Base portion (third portion)
65W Short-circuiting member
65W1 Base portion
65W2 Tip portion
66 Insulating member
67 Base part
67A Upper surface
69 Screw-boss part
71 Positioning, recessed portion
72 Support part
72U Retaining part 72V Retaining part
72W Retaining part
73 Nut
74 Opening
92 Screw
93U Power-supply line
93V Power-supply line
93W Power-supply line
110 Rib
111 Rib
112 Rib
113 Rib
114 Rib
224 Stator
236 Short-circuiting unit
266 Insulating member
267 Base part
269 Screw-boss part
272U Support part
272V Support part
272W Support part
324 Stator
336 Short-circuiting unit
366 Board
369 Screw-boss part
372 Support part
424 Stator
436 Short-circuiting unit
463 External terminal
463U External terminal
463V External terminal
463W External terminal
464 Coil terminal
464U Coil terminal
464V Coil terminal
464W Coil terminal
465 Short-circuiting member
465U Short-circuiting member
465V Short-circuiting member
465W Short-circuiting member
466 Insulating member
467 Base part
469 Screw-boss part
472 Support part
472U Retaining part
472V Retaining part
472W Retaining part
473 Nut
474 Positioning pin
475 Screw-boss part
476 Positioning hole
477 Screw-boss part
491 Covering region
492 Covering region
493 Covering region
494 Covering region
495 Covering region
501 Covering region
502 Covering region
503 Covering region
504 Covering region
505 Covering region
506 Covering region
620 Wire
631 Front surface (first surface)
632 Rear surface (second surface)
651 Upper surface (one surface)

652 Lower surface (other surface)
700 Bolt (screw)
710 Power-supply line
731 Opposing surface
AX Rotational axis
S Workpiece
VC Virtual circle

The invention claimed is:

1. An electric work machine comprising:
a motor comprising a rotor configured to rotate about a rotational axis, and a stator disposed around the rotor; and
an output portion configured to be rotated when a rotational force is generated by the motor;
wherein:
the stator comprises: a stator core; an insulator, which is fixed to the stator core; a plurality of coils, which is fixed to the insulator; external terminals, to which power-supply lines are respectively connected; coil terminals, which are respectively connected to the coils; short-circuiting members, which are integral with the external terminals and the coil terminals and electrically connect the external terminals and the coil terminals to each other; and an insulating member, which supports the external terminals and the short-circuiting members;
the insulating member is disposed more radially inward than an outer-circumferential surface of the stator core;
the insulating member comprises a base part, which supports the short-circuiting members and has a ring shape, and a plurality of support parts, which protrude in an axial direction from the base part and respectively support the external terminals; and
the support parts are disposed spaced apart in a circumferential direction of the insulating member.

2. The electric work machine according to claim 1, wherein:
the support parts respectively comprise retaining parts, which respectively retain the external terminals and nuts; and
the power-supply lines and the external terminals are fixed to each other by bolts, which are respectively coupled to the nuts.

3. The electric work machine according to claim 2, wherein:
each of the external terminals has a first surface, which faces radially inward, and a second surface, which faces radially outward;
each of the nuts has an opposing surface, which opposes the first surface; and
the nuts are retained on the retaining parts such that the opposing surfaces and the rotational axis are parallel to each other.

4. The electric work machine according to claim 3, wherein the external terminals are respectively retained on the retaining parts such that the first surfaces and the second surfaces are each parallel to the rotational axis.

5. The electric work machine according to claim 2, wherein:
there are three of the support parts;
one of the retaining parts is provided on each one of the support parts; and
the three support parts are disposed spaced apart in the circumferential direction of the insulating member.

6. The electric work machine according to claim 1, wherein the external terminals are disposed more radially inward than the outer-circumferential surface of the stator core.

7. The electric work machine according to claim 6, wherein:
the short-circuiting members are disposed partially around the rotational axis; and
the external terminals protrude in an axial direction from the short-circuiting members, the axial direction being parallel or coincident with the rotational axis.

8. The electric work machine according to claim 7, wherein:
each of the external terminals has a first surface, which faces radially inward, and a second surface, which faces radially outward; and
each of the first surface and the second surface is parallel to the rotational axis.

9. The electric work machine according to claim 1, wherein the coil terminals are disposed more radially inward than the outer-circumferential surface of the stator core.

10. The electric work machine according to claim 9, wherein:
the short-circuiting members are disposed partially around the rotational axis; and
the coil terminals protrude in an axial direction from the short-circuiting members, the axial direction being parallel or coincident with the rotational axis.

11. The electric work machine according to claim 1, wherein:
each of the external terminals and the coil terminals is disposed more radially inward than the outer-circumferential surface of the stator core; and
in a radial direction that is perpendicular to the rotational axis, a first distance between the rotational axis and the external terminals is shorter than a second distance between the rotational axis and the coil terminals.

12. The electric work machine according to claim 11, wherein:
the short-circuiting members are disposed partially around the rotational axis;
the external terminals protrude toward one side in an axial direction from the short-circuiting members; and
the coil terminals protrude toward the other side in the axial direction from the short-circuiting members.

13. The electric work machine according to claim 1, wherein the short-circuiting members are disposed more radially inward than the outer-circumferential surface of the stator core.

14. The electric work machine according to claim 1, wherein the short-circuiting members are disposed in the interior of the base part.

15. The electric work machine according to claim 1, wherein the insulating member is fixed to the insulator.

16. The electric work machine according to claim 1, wherein:
the insulating member further comprises a plurality of screw-boss parts and screws that respectively fix the screw-boss parts to the insulator; and
at least one of the screw-boss parts and at least one of the screws are disposed between each pair of circumferentially-adjacent ones of the support parts.

17. An electric work machine comprising:
a motor comprising a rotor configured to rotate about a rotational axis, and a stator disposed around the rotor; and an output portion configured to be rotated when a rotational force is generated by the motor;

wherein:

the stator comprises: a stator core; an insulator, which is fixed to the stator core; a plurality of coils, which is fixed to the insulator; external terminals, to which power-supply lines are respectively connected; coil terminals, which are respectively connected to the coils; short-circuiting members, which are integral with the external terminals and the coil terminals and electrically connect the external terminals and the coil terminals to each other; and an insulating member, which supports the external terminals and the short-circuiting members;

the external terminals, the coil terminals, and the short-circuiting members each are disposed more radially inward than the outer-circumferential surface of the stator core;

in a radial direction that is perpendicular to the rotational axis, a first distance between the rotational axis and the external terminals is shorter than a second distance between the rotational axis and the coil terminals;

the insulating member comprises a base part, which supports the short-circuiting members and has a ring shape, and a plurality of support parts, which protrude in an axial direction from the base part and respectively support the external terminals; and the support parts are disposed spaced apart in a circumferential direction of the insulating member.

18. The electric work machine according to claim 17, wherein:

the short-circuiting members are disposed partially around the rotational axis;

the external terminals protrude toward one side in an axial direction from the short-circuiting members, the axial direction being parallel or coincident with the rotational axis; and the coil terminals protrude toward the other side in the axial direction from the short-circuiting members.

19. The electric work machine according to claim 17, wherein the insulating member is disposed more radially inward than the outer-circumferential surface of the stator core.

20. An electric work machine comprising:

a motor comprising a rotor configured to rotate about a rotational axis, and a stator disposed around the rotor; and an output portion configured to be rotated when a rotational force is generated by the motor;

wherein:

the stator comprises: a stator core; an insulator, which is fixed to the stator core; a plurality of coils, which is fixed to the insulator; external terminals, to which power-supply lines are respectively connected; coil terminals, which are respectively connected to the coils; short-circuiting members, which are integral with the external terminals and the coil terminals and electrically connect the external terminals and the coil terminals to each other; and an insulating member, which supports the external terminals and the short-circuiting members;

the insulating member is disposed more radially inward than an outer-circumferential surface of the stator core; and the insulating member comprises:

a base part, which supports the short-circuiting members and has a ring shape;

three support parts, which protrude in an axial direction from the base part, are disposed spaced apart in a circumferential direction of the insulating member and respectively support the external terminals; and one retaining part provided on each one of the support parts, the retaining parts respectively retaining the external terminals.

* * * * *